(12) United States Patent
Nakamura et al.

(10) Patent No.: US 6,507,365 B1
(45) Date of Patent: Jan. 14, 2003

(54) SOLID-STATE IMAGING DEVICE

(75) Inventors: Nobuo Nakamura, Yokohama (JP);
Yoshitaka Egawa, Yokohama (JP);
Shinji Ohsawa, Ebina (JP); Yukio Endo, Yokohama (JP); Yoshiyuki Matsunaga, Kamakura (JP); Yoriko Tanaka, Nagoya (JP); Fumio Izawa, Yokohama (JP); Hiroki Miura, Yokohama (JP); Ryohei Miyagawa, Sagamihara (JP); Ikuko Inoue, Yokohama (JP); Tsuyoshi Arakawa, Tokyo (JP); Yoshiyuki Tomizawa, Yokohama (JP); Makoto Hoshino, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/450,749

(22) Filed: Nov. 30, 1999

(30) Foreign Application Priority Data

| Nov. 30, 1998 | (JP) | .......... 10-338936 |
| Jan. 29, 1999 | (JP) | .......... 11-021311 |
| Mar. 31, 1999 | (JP) | .......... 11-091720 |
| Mar. 31, 1999 | (JP) | .......... 11-092964 |

(51) Int. Cl.$^7$ ................................. H04N 3/14
(52) U.S. Cl. ........................... 348/296; 348/302
(58) Field of Search ................. 348/296, 302, 348/308, 281, 294

(56) References Cited

U.S. PATENT DOCUMENTS

| 5,420,631 A | * | 5/1995 | Hamasaki ............. 348/229 |
| 5,894,325 A | * | 4/1999 | Yonemoto ............. 348/302 |
| 6,091,449 A | * | 7/2000 | Matsunaga et al. ...... 348/308 |
| 6,215,113 B1 | * | 4/2001 | Chen et al. ........... 348/308 |

* cited by examiner

Primary Examiner—Wendy R. Garber
Assistant Examiner—Rashawn N. Tillery
(74) Attorney, Agent, or Firm—Oblon, Spivak, McClelland, Maier & Neustadt, P.C.

(57) ABSTRACT

A solid-state imaging device with a variable (continuous) electronic shutter function comprises an imaging area where unit cells with photodiodes acting as pixels are arranged two-dimensionally, read lines for driving the read transistors in each pixel row, vertical selection lines for driving the vertical selection transistors in each pixel row, a vertical driving circuit for selectively driving vertical selection lines, vertical signal lines for outputting the signal from each unit cell in the pixel rows driven sequentially, and a row selection circuit for controlling the vertical driving circuit in such a manner that the vertical driving circuit drives the read transistors in each pixel row with the desired signal storage timing and signal read timing twice in that order and thereby drives the vertical selection transistors in the pixel row in synchronization with the signal read timing.

18 Claims, 36 Drawing Sheets

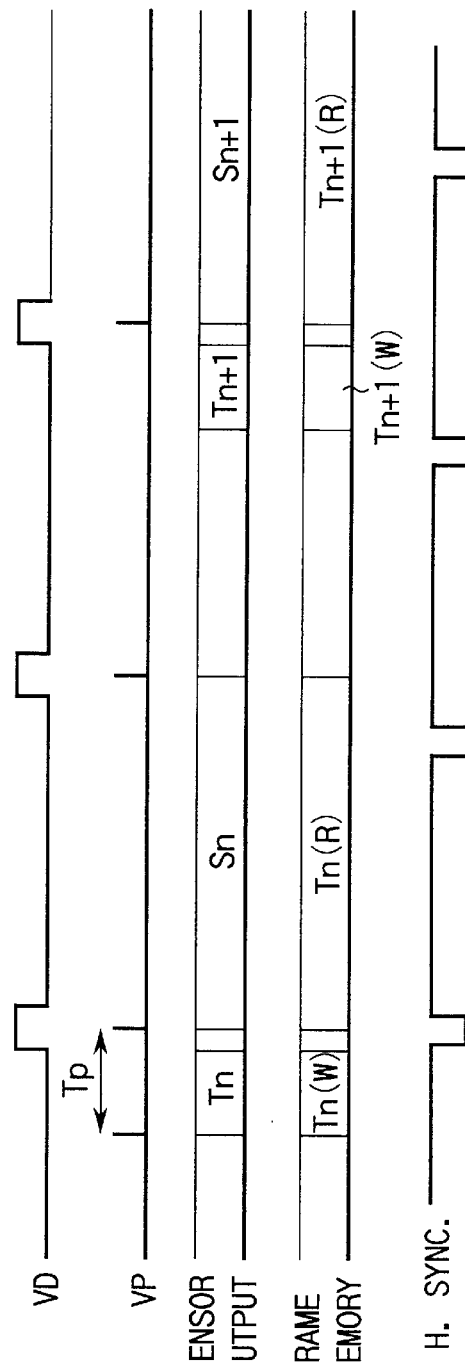
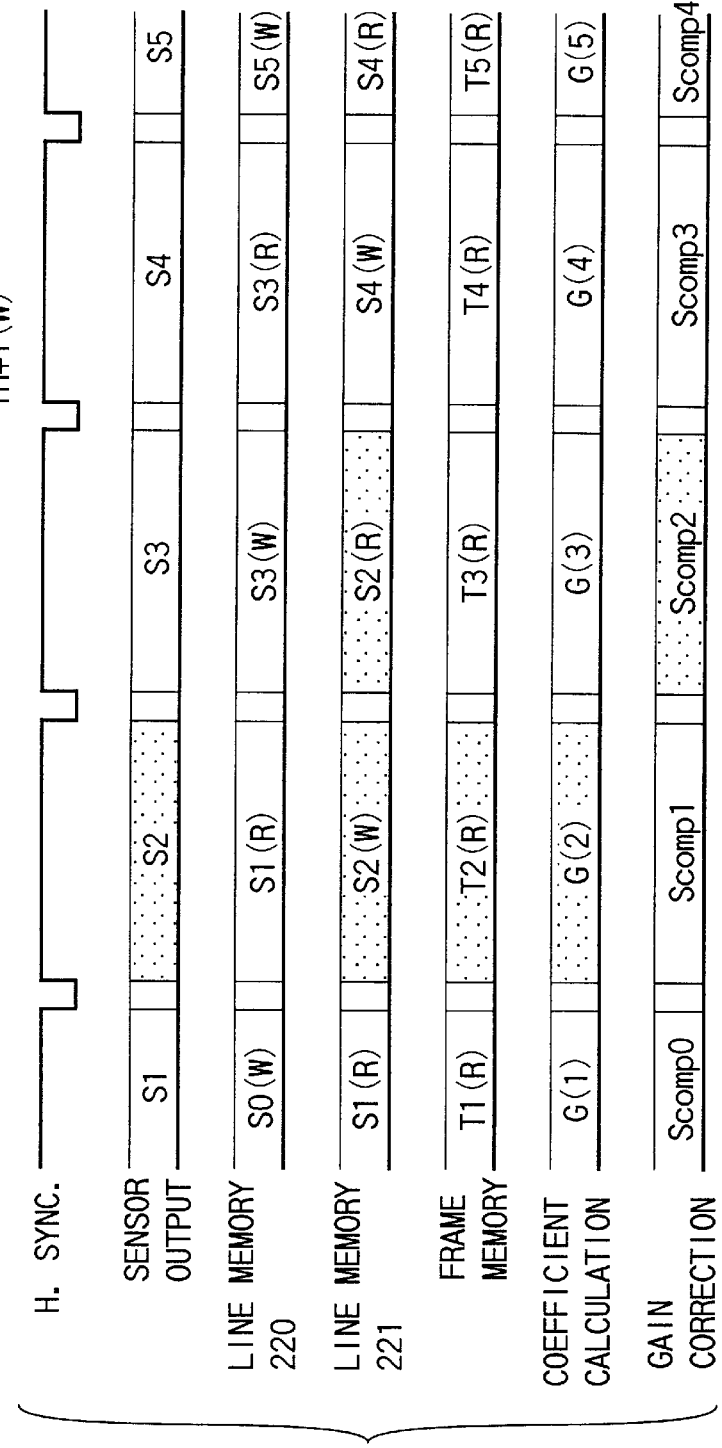
FIG. 36
FIG. 37

SOLID-STATE IMAGING DEVICE

BACKGROUND OF THE INVENTION

The present invention relates to a solid-state imaging device, and more particularly to the technique for improving the picture quality of an amplification type solid-state image pick-up device.

This application is based on Japanese Patent Applications No. 10-338936, filed Nov. 30, 1998, No. 11-021311, filed Jan. 29, 1999, No. 11-091720, filed Mar. 31, 1999, and No. 11-092964, filed Mar. 31, 1999, the entire content of which is incorporated herein by reference.

In recent years, a new market for image sensors, including digital still cameras, cameras built in personal computers, cellular phones, or the like, and TV conference cameras, has been getting wider. CCDs have been used as image sensors for TV cameras. CCDs, however, are unsuitable for a battery-powered portable apparatus with a camera, because they consume a lot of power. With this backdrop, solid-state image pick-up devices (CMOS image sensors) of the less-power-consumption amplification type (often called MOS type, CMOS type, or APS type) have been developed and commercialized as less-power-consumption solid-state image pick-up devices for mobile gears.

FIG. 1 shows an equivalent circuit of a first conventional amplification-type CMOS image sensor with a read circuit capable of reading a pixel signal pixel by pixel. In FIG. 1, unit cells 1 with one pixel/unit are arranged in a two-dimensional matrix in the cell area (imaging area). Each unit cell 1 is composed of, for example, four transistors Ta, Tb, Tc, Td and one photodiode PD. The ground potential is applied to the anode of the photodiode PD. To the cathode of the photodiode, one end of the read transistor (shutter gate transistor) Td is connected. The gate of the amplification transistor Tb is connected to the other end of the read transistor Td. One end of the vertical selection transistor (row selection transistor) Ta is connected to one end of the amplification transistor Tb. To the gate of the amplification transistor Tb, one end of the reset transistor Tc is connected.

In the cell area, a read line 4 connected in common to the gates of the read transistors Td of the unit cells in the same row, a vertical selection line 6 connected in common to the gates of the individual vertical selection transistors Ta of the unit cells in the same row, and a reset line 7 connected in common to the gates of the individual reset transistors Tc of the unit cells in the same row are formed in such a manner that they correspond to each row. Additionally, in the cell area, a vertical signal line VLIN connected in common to the other end of each amplification transistor Tb in the unit cells in the same column and a power supply line 9 connected in common to the other end of each reset transistor Tc and the other end of each vertical selection transistor Ta in the unit cells in the same column.

Furthermore, outside one end of the cell area, load transistors TL are arranged in the horizontal direction. They are connected between one end of each vertical signal line VLIN and the ground node. In addition, outside the other end of the cell area, noise canceler circuits are arranged in the horizontal direction. Each noise canceler circuit is composed of, for example, two transistors TSH, TCLP, and two capacitors Cc, Ct.

Horizontal selection transistors TH, which are connected to the other end of the corresponding vertical signal line via the corresponding noise canceler circuit, are arranged in the horizontal direction.

A horizontal signal line HLIN is connected in common to the other end of each horizontal selection transistor TH. To the horizontal signal line HLIN, a horizontal reset transistor (not shown) and an output amplification circuit AMP are connected.

Each noise canceler circuit is composed of a sample hold transistor TSH one end of which is connected to the other end of the vertical signal line VLIN, a coupling capacitor Cc one end of which is connected to the other end of the sample hold transistor TSH, a charge storage capacitor Ct connected between the other end of the coupling capacitor Cc and the ground node, and a potential clamp transistor TCLP connected to the junction node of the capacitors Cc and Ct. One end of the horizontal transistor TH is connected to the junction node of the capacitors Cc, Ct.

Furthermore, outside the cell area, there are provided a vertical shift register 2 for selecting the vertical selection lines in the cell area in a scanning manner, a horizontal shift register 3 for driving the horizontal selection transistors TH in a scanning manner, a timing generator 10 for generating various timing signals supplied to the noise canceler circuits, a bias generator 11 for generating specific bias potentials at one end of the potential clamp transistor TCLP of the noise canceler circuit, etc., and a pulse selector 2a for selectively controlling the output pulses of the vertical shift register 2 and thereby driving the vertical selection lines 6 in each row in the cell area in a scanning manner.

FIG. 2 is a timing waveform diagram to help explain an example of the operation of the CMOS image sensor shown in FIG. 1. The operation of the CMOS image sensor of FIG. 1 will be described by reference to FIG. 2.

The incident light on each photodiode PD is photoelectrically converted into signal charge, which are stored in the photodiodes PD.

In a horizontal blanking period, when the signal charge in the photodiodes PD is read out from a row of unit cells, the signal ($\phi$ADDR pulse) on the vertical selection line 6 for the line to be selected is turned on to select each vertical signal line VLIN, thereby turning on one row of row selection transistors Ta. This causes a source follower circuit to operate in one row of unit cells. The source follower circuit is composed of a load transistor TL and an amplification transistor Tb to which a power supply potential VDD (e.g., 3.3V) is supplied via a row selection transistor Ta.

Then, the signal ($\phi$RESET pulse) on the reset line 7 is turned on in one row of unit cells, resetting the gate voltage of the amplification transistor Tb to a reference voltage for a specific period of time, which then outputs the reference voltage to the vertical signal line VLIN.

There are variations in the gate potential of the amplification transistor Tb that has been reset, which permits the reset potential of the vertical signal line VLIN at the other end to vary. To reset variations in the reset potential of each vertical signal line VLIN, the driving signal ($\phi$SH pulse) of the sample hold transistor TSH in the noise canceler circuit is turned on in advance (e.g., at the same time when the $\phi$ADDR pulse is turned on) and the driving signal ($\phi$CLP pulse) of the potential clamping transistor TCLP is kept on for a specific period of time after the reference voltage is outputted onto the vertical signal line VLIN, which thereby sets the voltage on the junction node of the capacitors Cc, Ct of the noise canceler circuit to the reference voltage VCC.

Next, after the $\phi$RESET pulse has been turned off, the read line 4 for a specific row is selected and the signal ($\phi$READ pulse) is turned on, turning on the read transistor Td to read the stored charge in the photodiode PD into the gate of the amplification transistor Tb, which varies the gate potential. The amplification transistor Tb outputs the voltage signal corresponding to the amount of change of the gate potential to the corresponding vertical signal line VLIN and noise canceler circuit.

Thereafter, the φSH pulse in the noise canceler circuit is turned off, which enables the signal component (the signal voltage from which noise has been removed) equivalent to the difference between the reference voltage read as described above and the signal voltage to be stored in the charge storage capacitor Ct even during the effective horizontal scanning period. Specifically, noise, such as variations in the reset potential of each vertical signal line VLIN originating in the cell area, applied to the stage in front of the noise canceler is removed.

Then, the turning off of the φADDR pulse turns off the vertical selection transistor Ta, bringing the unit cell into the unselected state, which electrically separates the cell area from each noise canceler circuit.

Thereafter, the driving signals (φH pulses) of the horizontal selection transistors TH are turned on in sequence during the effective horizontal scanning period, turning on the horizontal selection transistors TH sequentially, which causes the signal voltages on the junction nodes (signal storage nodes) of the capacitors Cc, Ct to be read onto the horizontal signal lines HLIN sequentially. The signal voltages are then amplified by the output amplification circuit AMP and outputted.

In the above operation, the voltage VVLIN of the vertical signal line VLIN is the operating voltage Vm (about 1.5V) of the source follower circuit in the horizontal blanking period. The aforementioned noise canceling operation is performed each time reading is done for one horizontal line.

FIG. 3 is a timing waveform diagram to help explain an example of the operation of the timing generator 10, vertical shift register 2, and pulse selector 2a in FIG. 2. FIG. 3 shows a case where the CMOS sensor of FIG. 1 is used for a system with one field=(1/30) Hz (images with 30 frames/second using one field as one frame).

The timing generator 10 shapes external input pulse signals φVR and φHP at a buffer circuit (not shown) and outputs a field-period pulse signal φVRR and a horizontal-period pulse signal φHPV to the vertical shift register 2.

The vertical shift register 2 clears all the register outputs to the low (L) level during the period that the pulse signal φVRR input is at the low (L) level, and then performs a shift operation using pulse signal φHPV, thereby bringing the output pulse signal $RO_i$ (i=1, ..., n, n+1, ...) at the high (H) level in sequence, and inputting the high signals to the pulse selector 2a.

The pulse selector 2a activates the signal (φADDR pulse) of the vertical selection line 6, the signal (φRESET pulse) of the reset line 7, and the signal (φREAD pulse) of the read line 4 for each line to be selected as shown in FIG. 2, and scans the row to be selected.

As described above, the CMOS image sensor of FIG. 1 outputs, only once in one field period, each output pulse signal $RO_i$ of the vertical shift register 2 for selectively controlling a specific row to be selected. Specifically, since the photodiode PD reads the signal only once in one field, it is impossible to perform the electronic shutter operation of controlling the charge storage time of the photodiode PD to control the receiving-light time equivalently.

FIG. 4 schematically shows the configuration of a second conventional CMOS image sensor capable of an electronic shutter operation. The CMOS image sensor comprises, for example, an imaging area (photoelectric conversion section) 14 where unit cells 13 constructed as shown in FIG. 1 are arranged in a two-dimensional matrix, vertical signal lines VLIN formed in the direction of pixel column in the imaging area 14, read-out control vertical selection lines 6 which are formed in the direction of pixel row in the imaging area 14 and performs control in such a manner that it reads the photoelectric conversion signal of each unit cell 13 onto the vertical signal lines VLIN on a pixel row basis, a first vertical selection circuit (read-out vertical shift register) 2 for selectively controlling the read-out control vertical selection lines 6 with read timing in a scanning manner, a horizontal selection transistor TH for selecting the vertical signal line VLIN, a horizontal selection circuit (horizontal selection shift register) 3 for selectively controlling the horizontal selection transistor, a horizontal signal line HLIN for reading the vertical signal line VLIN selected by the horizontal selection shift register 3, and an output amplification circuit AMP for outputting the signal read onto the horizontal signal line HLIN. Although not shown in particular, the second conventional CMOS image sensor is the same as the first one in that the load transistors and noise canceler circuits shown in FIG. 1 are provided in the vicinity of the imaging area 14.

Furthermore, unlike the first conventional CMOS image sensor, the second conventional CMOS image sensor comprises a second vertical selection circuit (electronic shutter vertical shift register) 15 for selectively controlling the read-out control vertical selection lines 6 in a scanning manner with signal storage timing.

Specifically, the electronic shutter vertical shift register 15 is provided separately from the read-out vertical shift register 2 and is designed to scan the row to be selected with specific timing as is the read-out vertical shift register 2. This enables the read-out vertical shift register 2 and electronic shutter vertical shift register 15 to selectively control, twice in one field period, a specific row to be selected. Before the read-out vertical shift register 2 selectively controls the row to be selected and reads the pixel signal onto the vertical signal line VLIN, the electronic shutter shift register 15 selectively controls the row to be selected and starts to store the signal charge. This enables the electronic shutter operation of controlling the light-receiving time equivalently.

The CMOS image sensor of FIG. 4 including a read-out vertical shift register 2 and an electronic shutter vertical shift register 15 as described above has the following problem: when the image sensor performs the variable electronic shutter operation of changing the charge storage time automatically according to, for example, the output level of the light-receiving sensor, a difference in charge storage time occurs between pixel rows in the same frame (or filed) image according to the control of the charge storage time, and the loads on the two vertical shift registers 2, 15 vary.

This problem will be explained below.

FIG. 5 shows an example of the read operation when the row selection timing of the two vertical shift registers 2, 15 in FIG. 4 is fixed. The timing that the electronic shutter vertical shift register 15 selects a row is earlier than the timing that the read-out vertical shift register 2 selects the row. The time by which the former is earlier than the latter is fixed. That is, the difference in the time required to select a row between the two vertical shift registers 2, 15 is always constant. When the row selection timings of the two vertical shift registers 2, 15 are fixed, the read-out vertical shift register 2 and electronic shutter vertical shift register 15 return to the first stage after they have begun to select a certain frame (here, frame=field) and completed the shifting from the first to last stages (that is, the number of pixels in the vertical direction). Then, they start to select the next frame.

Consequently, when the solid-state imaging device of FIG. 4 performs the variable shutter operation of changing the signal (charge) storage time automatically according to, for example, the output level of the light-receiving sensor, thereby changing the light-receiving time equivalently, it cannot start to store the next signal (charge) unless the electronic shutter vertical shift register 15 has finished shifting to the last stage. This puts a limit on the long storage time. If the storage time is not limited, this causes the difference in the charge storage time between pixel rows in one frame or permits the loads on the two vertical shift registers to vary.

In a case where a concrete approach for changing the charge storage time is to change the timing (the timing of the electronic shutter) that the electronic shutter vertical shift register 15 selects a row earlier than the read-out vertical shift register 2, thereby changing the length of the time required to store the signal charge, the problems will be described in detail by reference to FIG. 6.

In FIG. 6, the read control pulse is a signal for staring the shift operation of the read-out vertical shift register 2 and the variable electronic shutter control pulse is a signal for starting the shift operation of the electronic shutter vertical shift register 15.

It is assumed that, when a first frame is selected, an electronic shutter pulse is generated to select a second frame with timing t3 after the shift operation of the electronic shutter vertical shift register 15 is started by an electronic shutter control pulse generated with timing t1 but before the shift operation of the last stage has been completed (or before all of the pixel rows have been selected). The electronic shutter vertical shift register 15 is reset with timing t3 and the shift operation (row selection) is started from the first stage again.

As a result, when the shift operation of the read-out vertical shift register 2 is started by a read control pulse generated with timing t2 and the first frame is read, there arises a difference in the charge storage time between the pixel rows selected and those not selected by the electronic shutter vertical shift register 15 that has started the shift operation with timing t1.

Once the difference in the charge storage time has arisen, the read output level varies, depending on the position of a pixel row, which contributes to the cause of the occurrence of image noise, such as horizontal stripes, when the output signal of the solid-state imaging device is displayed on the screen of the image display device.

At timing t4, a total of two pixel rows are selected: one is the selected row at the electronic shutter vertical shift register 15 that has started the shift operation at timing t3 and the other is the selected row at the read-out vertical shift register 2 that started the shift operation with timing t2. These two pixel rows make the loads on the two vertical shift registers 2, 15.

In contrast, at timing t6, the selection of row at the electronic shutter vertical shift register 15 that has started the shift operation with timing t3 has been completed already and only one pixel row is selected by the read-out vertical shift register 2 that has started the shift operation with timing t5. As a result, the single pixel row makes the load on the two vertical shift registers 2, 15.

When the loads on the two vertical shift registers 2, 15 varies, depending on the electronic shutter timing, this causes fluctuations in the voltage of the power supply line of the solid-state imaging device. When the output of the solid-state imaging device is displayed on the screen of the image display device, horizontal stripes appear, which contributes to serious degradation of picture quality.

The problems of the occurrence of a difference in charge storage time between pixel rows according to the length of the charge storage time and the variation of the loads on the two vertical shift register 2, 15 are encountered when the variable electronic shutter operation is performed by not only the CMOS solid-state imaging device but also the CCD solid-state imaging device.

It is important for the image pick-up device not to degrade the image quality due to hand shake. An example of a hand shake correction of the conventional CMOS image sensor is described in the Japanese Patent Disclosure No. 2-231873. Only part of the whole light receiving area is used as an imaging area and the hand shake correction is performed by shifting the imaging area based on the amount of hand shaking. However, the brightness of the image of one field (or frame) varies due to the variation of the signal charge storage time of each horizontal line in one field (or frame) if the imaging area is shifted. This drawback is solved by a technique disclosed in U.S. Pat. No. 5,894,325(Yonemoto). In this reference, a second vertical shift register for an electric shutter operation is provided in addition to a first vertical shift register for reading out the signal. The signal charge storage time is controlled by adjusting the operation timings of the first and the second vertical shift registers. However, it is not possible to start storing the signal charge for the next field before the read-out of the current field is completed so that the signal charge storage time cannot be freely controlled.

BRIEF SUMMARY OF THE INVENTION

Accordingly, it is an object of the present invention to overcome the above problems by providing a solid-state imaging device which prevents a difference in charge storage time between pixel rows in the same field (or frame) from arising according to the length of charge storage time when the charge storage time is varied field by field (or frame by frame) to perform a variable electronic shutter operation.

Another object of the present invention is to provide a solid-state imaging device which prevents the loads on the read-out vertical shift register and electronic shutter shift register from fluctuating when the variable electronic shutter operation is performed.

Further object of the present invention is to provide a solid-state imaging device which suppresses the occurrence of image noise, such as lateral stripes, on the display screen for the output signal when the variable electronic shutter operation is performed.

Still another object of the present invention is to provide a solid-state imaging device capable of preventing noise from coming in from the wiring around the pixels through capacitive coupling, when the signal photoelectrically converted and stored in the pixels is read.

Still further object of the present invention is to provide a solid-state imaging device capable of preventing the degradation of the image quality due to hand shake.

According to the present invention, there is provided a solid-state imaging device comprising:

an image pickup section with a light-receiving surface whose area is greater than an imaging area for outputting an image signal;

a vertical register circuit for driving pixel rows in the image pickup section;

a horizontal register circuit for driving pixel columns in the image pickup section; and a timing generator for supplying a signal charge time control signal to the vertical register circuit, wherein the vertical register circuit is capable of simultaneously selecting three or more pixel rows during a horizontal blanking period.

According to the present invention, there is provided another solid-state imaging device comprising:

an imaging area including unit cells arranged on a semiconductor substrate two-dimensionally to form pixel rows, each of the unit cells being composed of a photoelectric converting element for photoelectrically converting incident light on a pixel and storing charge, a read section for reading the stored charge to a sense node, an amplification section for amplifying the read-out charge, and a vertical selection element for causing the amplification section to output a signal;

read lines, which are provided in a horizontal direction so as to correspond to the pixel rows respectively in the imaging area, for transferring a read driving signal for driving the read sections of the unit cells in the corresponding pixel rows;

vertical selection lines, which are provided in a horizontal direction so as to correspond to the respective pixel rows in the imaging area, for transferring a row selection driving signal for driving the vertical selection elements of the unit cells in the corresponding pixel rows;

a vertical driving circuit for selectively supplying the read driving signal to the read lines to drive the read sections and for selectively supplying the row selection driving signal to the vertical selection lines to drive the vertical selection elements;

a row selection circuit for controlling the vertical driving circuit in such a manner that the read sections in each pixel row in the imaging area are driven with desired signal storage timing and with signal read timing in that order, the row selection circuit including a first row selector for causing the vertical driving circuit to drive the read sections in each pixel row with the signal read timing and at least two second row selectors for causing the vertical driving circuit to drive the read sections in each pixel row with the signal storage timing; and vertical signal lines, which are provided so as to correspond to the pixel rows respectively in the imaging area, for transferring in a vertical direction an signal outputted from each unit cell in the pixel rows sequentially driven by the vertical driving circuit.

According to the present invention, there is provided a further solid-state imaging device which performs an electronic shutter operation by sequentially driving a read control wire with a desired signal storage timing and a desired signal read timing and outputting a signal read with the desired signal read timing when a stored charge is read out from a photoelectric converting element in unit cells two-dimensionally arranged in an imaging area on a semiconductor substrate, wherein a voltage of another wire adjacent to the read control wire in the vicinity of the photoelectric converting element at the desired signal storage timing is substantially the same as that at the desired signal read timing.

According to the present invention, there is provided a still another solid-state imaging device including an imaging area formed of unit cells each having two pixels and two-dimensionally arranged on a semiconductor substrate, wherein charges stored in two pixels are sequentially read out and a voltage of another wire adjacent to the read control wire in the vicinity of the unit cells when the charge stored in one pixel is read out is substantially the same as that when the charge stored in the other pixel is read out.

According to the present invention, there is provided a still further solid-state imaging device comprising:

an imaging area including unit cells arranged on a semiconductor substrate two-dimensionally to form pixel rows, each of the unit cells being composed of a photoelectric converting element for photoelectrically converting incident light on a pixel and storing charge, a read section for reading the stored charge to a sense node, an amplification section for amplifying the read-out charge, and a vertical selection element for causing the amplification section to output a signal, the imaging area including plural pixel rows for reading signals and at least two dummy pixel rows;

read lines, which are provided in a horizontal direction so as to correspond to the pixel rows respectively in the imaging area, for transferring a read driving signal for driving the read sections of the unit cells in the corresponding pixel rows;

vertical selection lines, which are provided in a horizontal direction so as to correspond to the respective pixel rows in the imaging area, for transferring a row selection driving signal for driving the vertical selection elements of the unit cells in the corresponding pixel rows;

a vertical driving circuit for selectively supplying the read driving signal to the read lines to drive the read sections and for selectively supplying the row selection driving signal to the vertical selection lines to drive the vertical selection elements;

a row selection circuit for controlling the vertical driving circuit in such a manner that the read sections in each pixel row in the imaging area are driven with desired signal storage timing and with signal read timing in that order; and vertical signal lines, which are provided so as to correspond to the pixel rows respectively in the imaging area, for transferring in a vertical direction an signal outputted from each unit cell in the pixel rows sequentially driven by the vertical driving circuit, wherein the row selection circuit controls the vertical driving circuit such that the stored charge is read out from the unit cells of the plural pixel rows, one of the at least two dummy pixel rows is driven, charge is stored in the unit cells of the plural pixel rows, and then the other of the at least two dummy pixel rows is driven.

According to the present invention, there is provided a still further solid-state imaging device including unit cells which are two-dimensionally arranged in directions of row and column and generate an electric signal according to the amount of incident light, vertical signal lines for reading an electric signal from the unit cells column by column, a vertical control section for controlling a reading of the electric signal generated at the unit cells onto the vertical signal lines, and a horizontal control section for controlling a transfer in the horizontal direction of the electric signal read by the vertical control section onto the vertical signal lines, the solid-state imaging device comprising:

a gain correction factor calculator for calculating a gain correction factor for fluctuations in luminance in the amount of incident light to the unit cells for each row from reading of a first signal from the unit cells and reading of a second signal from the unit cells time Δt later than the reading time of the first electric signal; and an arithmetic operating circuit for correcting the second signal on the basis of the calculated gain correction factor.

According to the present invention, there is provided a still further solid-state imaging device including unit cells which are two-dimensionally arranged in directions of row and column and generate an electric signal according to the amount of incident light, vertical signal lines for reading an electric signal from the unit cells column by column, a vertical control section for controlling a reading of the electric signal generated at the unit cells onto the vertical signal lines, and a horizontal control section for controlling a transfer in the horizontal direction of the electric signal read by the vertical control section onto the vertical signal lines, the solid-state imaging device comprising;

a calculation element for calculating more than one difference ΔS between a first signal S read from the unit cells and a second signal S" read from the unit cells from which the first signal S has been read at time Δt' later than the reading time of the first signal S, while changing the time Δt', and a determination element for determining the period of fluctuations in luminance by comparing more than one ΔS obtained by changing the time Δt'.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 36 is a timing chart to help explain the flicker correction operation of the CMOS image sensor according to the eighth embodiment;

FIG. 37 is a timing chart to help explain the flicker correction operation of the CMOS image sensor according to the eighth embodiment;

DETAILED DESCRIPTION OF THE INVENTION

A preferred embodiment of a solid-state imaging device according to the present invention will now be described with reference to the accompanying drawings.

First Embodiment

Figure 7:
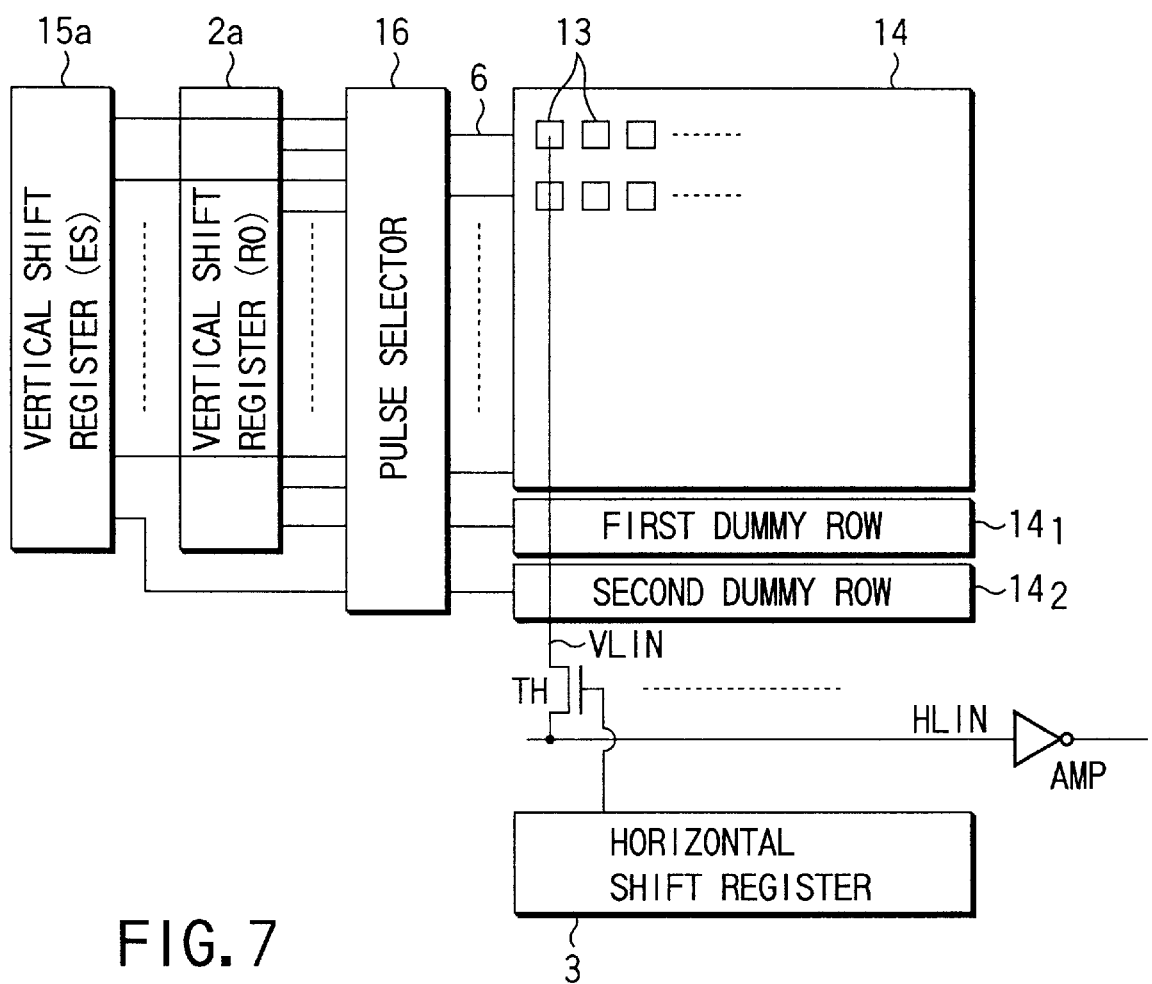
FIG. 7 shows an equivalent circuit of a CMOS image sensor according to a first embodiment of the present invention.

FIG. 7 shows an equivalent circuit of an amplification-type CMOS image sensor according to a first embodiment of the present invention.

Figure 4:
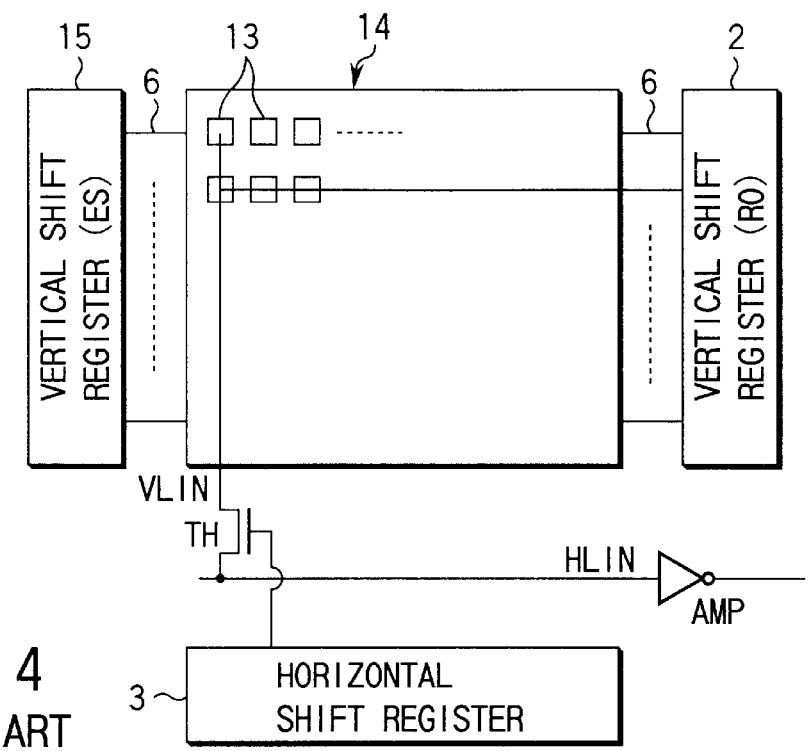
FIG. 4 shows an equivalent circuit of a second conventional CMOS image sensor.
Figure 5:
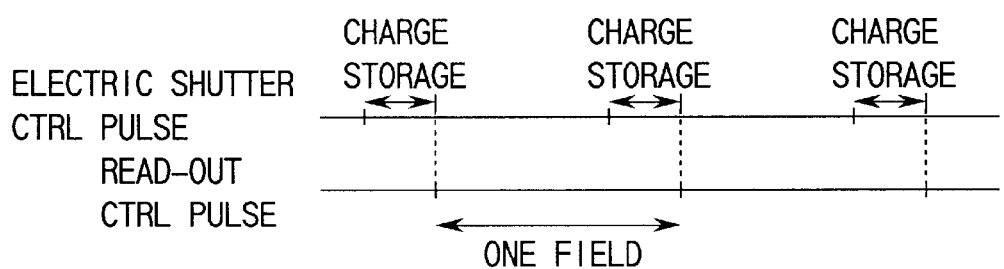
FIG. 5 shows an example of the row selection timing for the two vertical shift registers of FIG. 4.
Figure 6:
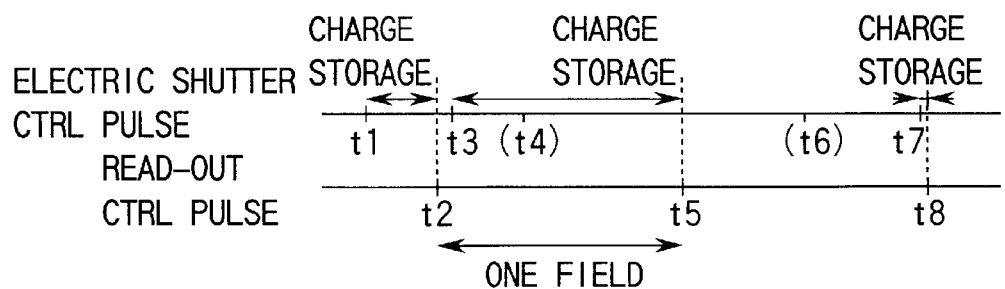
FIG. 6 is a timing diagram to help explain problems in a case where the pixel signal is stored by changing the timing at which the electronic shutter vertical shift register selects a row earlier than the read-out vertical shift register in order to change the charge storage time in the CMOS image sensor of FIG. 4.

The CMOS image sensor of FIG. 7 is almost the same as the second conventional CMOS image sensor of FIG. 4 except for a read-out vertical shift register 2a, an electronic shutter vertical shift register 15a and others. Therefore, in FIG. 7, the same parts as those in FIG. 4 are indicated by the same reference symbols.

Figure 1:
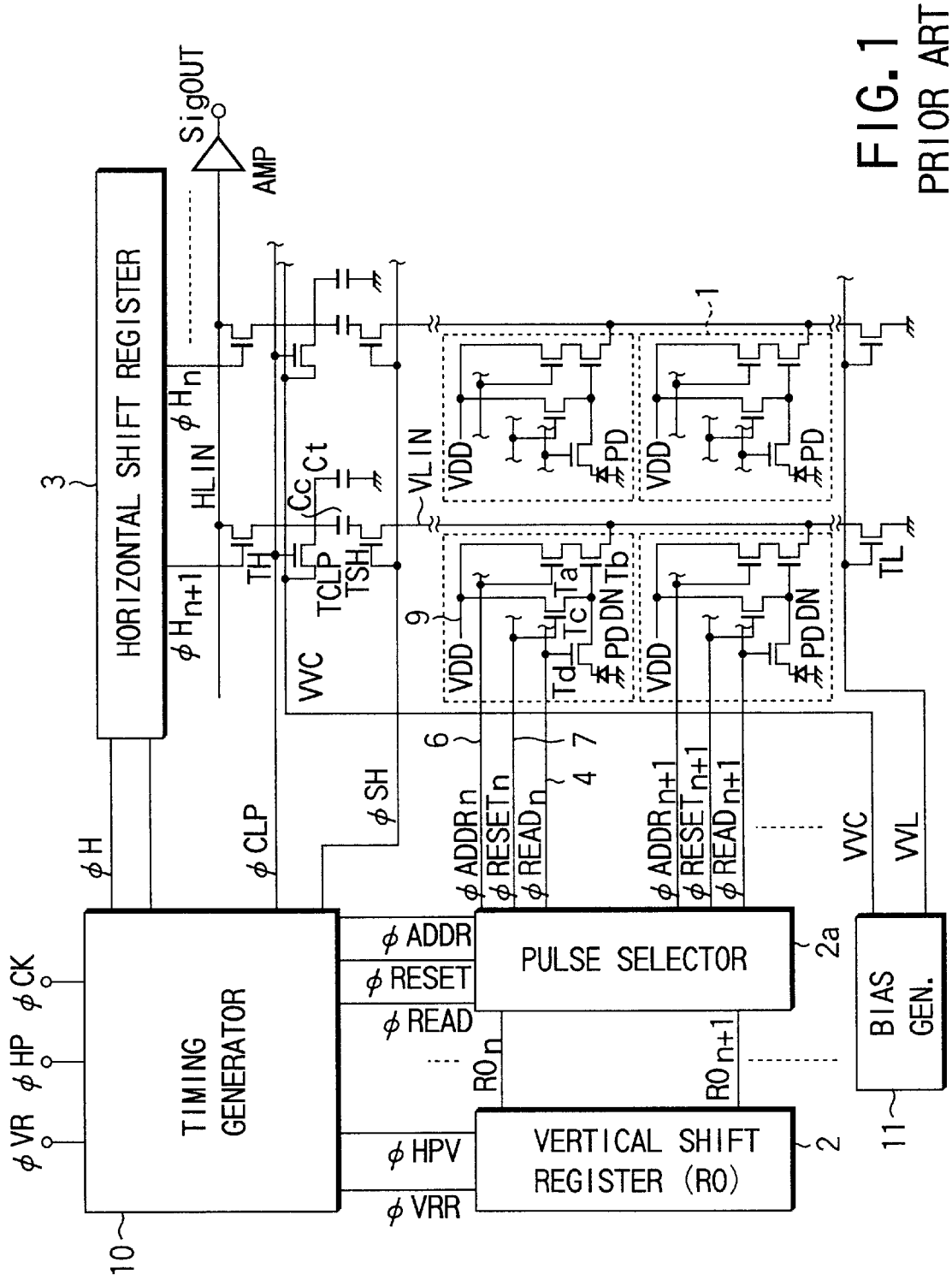
FIG. 1 shows an equivalent circuit of a first conventional CMOS image sensor.

The CMOS image sensor of the first embodiment comprises an imaging area (photoelectric conversion section) 14 where unit cells 13 constructed as described, for example, in the first conventional equivalent of FIG. 1, are arranged in a two-dimensional matrix, vertical signal lines VLIN formed in the direction of pixel column of the imaging area 14, read-out control vertical selection lines 6 which are formed in the direction of pixel row of the imaging area 14 and used to read the photoelectric conversion signals of the individual unit cells 13 onto the vertical signal lines VLIN on a pixel row basis, a first vertical selection circuit (read-out vertical shift register) 2a for selectively controlling the read-out control vertical selection lines 6 with reading timing in a scanning manner, a second vertical selection circuit (electronic shutter vertical shift register) 15a for selectively controlling the read-out control vertical selection lines 6 with signal storage timing in a scanning manner, a vertical driving circuit (pulse selector) 16 for generating a driving signal to selectively drive the read-out control vertical selection lines 6 on the basis of the output of the read-out vertical shift register 2a and the output of the electronic shutter vertical shift register 15a, horizontal selection transistors TH for selecting the vertical signal lines VLIN, a horizontal selection circuit (horizontal selection shift register) 3 for selectively controlling the horizontal selection transistors TH, a horizontal signal line HLIN for reading the signal from the vertical signal line VLIN selected by the horizontal selection shift register 3, and an output amplifier circuit AMP for outputting the signal read onto the horizontal signal line HLIN.

Figure 10:
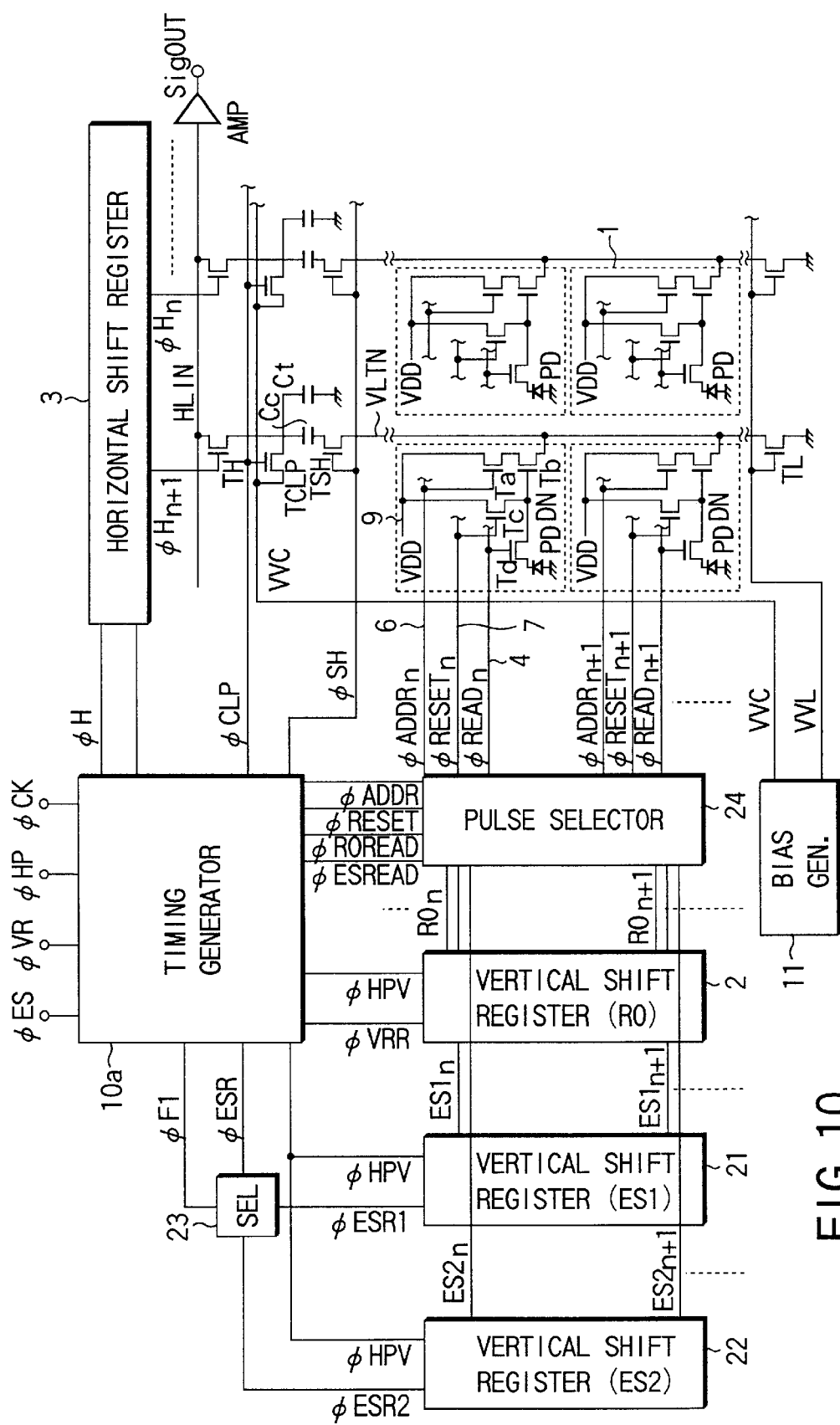
FIG. 10 shows an equivalent circuit of a CMOS image sensor according to a third embodiment of the present invention.

FIG. 7 shows only the read-out control vertical selection lines 6 for control lines of the imaging area. However, the control lines are not limited to the read-out control vertical selection lines 6. It is possible to provide three control lines, such as φADDR 6, φRESET 7, or φREAD 4, as shown in FIG. 10. The number of necessary control lines varies depending on the structure of the unit cell.

Although not shown in particular as in the second CMOS image sensor of FIG. 4, the load transistors and noise canceler circuits as shown in FIG. 1 are provided in the vicinity of the imaging area 14.

Furthermore, the first embodiment differs from the second conventional CMOS image sensor in the following three points:

(1) Two dummy pixel rows (a first dummy pixel row $14_1$ and a second dummy pixel row $14_2$) are added to the imaging area 14 separately from the original pixel rows.

(2) The read-out vertical shift register (first vertical shift register) 2a has as many shift stages as (the number of the original pixel rows in the imaging area 14 plus one) and the electronic shutter vertical shift register (second vertical shift register) 15a also has as many shift stages as (the number of the original pixel rows in the imaging area 14 plus one).

(3) The pulse selector 16 is so constructed that it selects the output signal of the last stage of the read-out vertical shift register 2a and supplies the selected signal to the first dummy pixel row $14_1$ and further selects the output signal of the last stage of the electronic shutter vertical shift register 15a and supplies the selected signal to the second dummy pixel row $14_2$.

The two dummy pixel rows $14_1$, $14_2$ have the same configuration as that of the original pixel rows. They are added for the purpose of functioning as loads when they are selected by the pulse selector 16.

With the solid-state imaging device of FIG. 7, use of the electronic shutter vertical shift register 15a and read-out vertical shift register 2a enables the same vertical selection line to be selectively controlled twice in one field period, which enables the shutter operation of controlling the charge storage time of pixels (photodiodes).

The electronic shutter vertical shift register 15a performs a shift operation on the basis of the shift clock signal for controlling the start timing of charge storage. The shift register 15a selectively controls each corresponding pixel row during the shutter operation period in such a manner that it causes the pixels to store the signal charge (not to read the signal charge) and that it continues selectively controlling the second dummy pixel row $14_2$ in the period (the period from when the pixel row has been selected until the next selection has been started) excluding the shutter operation period. The charge of the second dummy pixel row $14_2$ are discarded.

The read-out vertical shift register 2a performs a shift operation on the basis of the shift clock signal for controlling the start timing of signal reading.

The shift register 2a selectively controls each corresponding pixel row during each horizontal period in the effective vertical scanning period within the vertical scanning period. In the vertical blanking period, the shift register 2a continues selectively controlling the first dummy pixel row $14_1$. The charge of the first dummy pixel row $14_1$ are discarded.

As described above, with the solid-state imaging device of the first embodiment, the pulse selector 16 always selectively controls a total of two pixel rows, one corresponding to the output of the read-out vertical shift register 2a and one corresponding to the output of the electronic shutter vertical shift register 15a, and equalizes the selection loads constantly, which prevents the occurrence of lateral stripes on the display screen caused by fluctuations in the reading level due to whether the selection loads are light or heavy.

Next, other embodiments of the present invention will be explained. In the embodiments explained below, the same parts as those in the first embodiment are indicated by the same reference symbols and a detail explanation of them will not be given.

Second Embodiment

Figure 8:
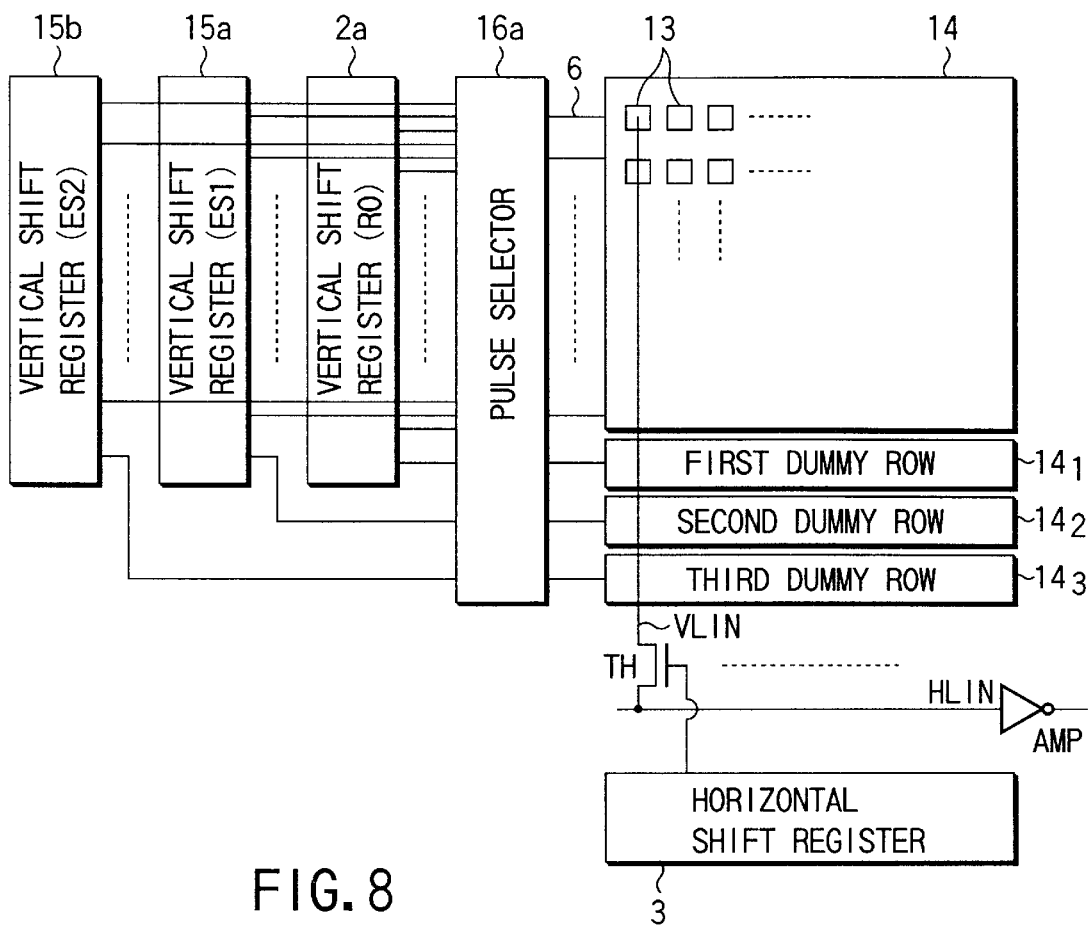
FIG. 8 shows an equivalent circuit of a CMOS image sensor according to a second embodiment of the present invention.

FIG. 8 shows an equivalent circuit of an amplification-type CMOS image sensor according to a second embodiment of the present invention.

The CMOS image sensor of FIG. 8 differs from the CMOS image sensor of the first embodiment shown in FIG. 7 in the following points:

(1) Another dummy pixel row (a third dummy pixel row $14_3$) is added to the imaging area 14.

(2) A second electronic shutter vertical shift register 15b having the same number of stages as that of the first electronic shutter vertical shift register 15a is added. The output of each stage of the shift register 15b is selectively substituted for the output of each stage of the electronic shutter vertical shift register 15a on a field basis and the selected output is used at a pulse selector 16a.

(3) The pulse selector 16a generates a driving signal for selectively driving the read-out control vertical selection lines 6 on the basis of the outputs of the three vertical shift registers 2a, 15a, 15b.

(4) The pulse selector 16a selects the last stage output signal of the added second electronic shutter vertical shift register 15b and supplies it to the third dummy pixel row 143.

Figure 9:
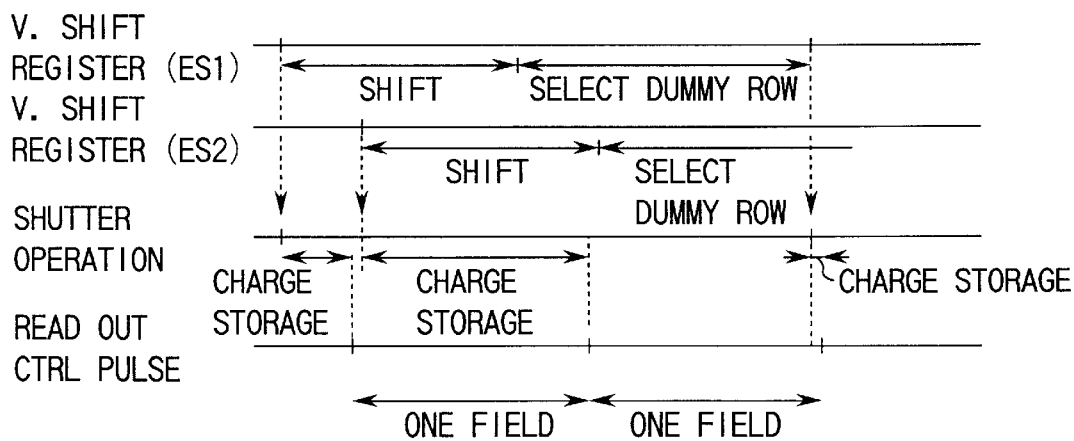
FIG. 9 is a timing chart to help explain how the two electronic shutter vertical shift registers control the electronic shutter operation alternately at intervals of a field in the CMOS image sensor of the second embodiment.

FIG. 9 is a timing chart to help explain how the two electronic shutter vertical shift registers 15a, 15b in the solid-state imaging device of the second embodiment shown in FIG. 8 control the electronic shutter operation alternately at intervals of a field.

As seen from the timing chart of FIG. 9, in the solid-state imaging device of FIG. 8, the shift operation of the two electronic shutter vertical shift registers 15a, 15b is started alternately at intervals of a field, thereby selecting each of the outputs alternately at intervals of a field, which allows the two electronic shutter vertical shift registers 15a, 15b to perform the electronic shutter operation alternately at intervals of a field.

The selected electronic shutter vertical shift registers 15a, 15b select rows earlier than the read-out vertical shift register 2a does. The length of the time that the pixel signal is stored can be changed by changing the timing at which the vertical shift registers 15a, 15b select rows.

As a result, the electronic shutter vertical shift registers 15a, 15b and read-out vertical shift register 2 select the same vertical line twice during one field period, which enables a variable electronic shutter operation of controlling the charge storage time of the selected pixels.

Even when the electronic shutter control signal is inputted at intervals of time shorter than the field period, either the electronic shutter vertical shift register 15a or 15b that has already started a shift operation can select the pixel rows one by one until it has selected the last pixel row, thereby controlling the charge storage time for the selected pixels without being reset in the middle before the shift operation of the register has reached the last stage (or before all the read pixel rows have been selected). This prevents the charge storage time from differing from one pixel row to another in one field.

Then, the shift register continues selectively controlling either the second dummy pixel row $14_2$ or third dummy pixel row $14_3$ during the period from when the last pixel row in the imaging area 14 has been selected until the first pixel row in the field period after next has been selected.

The read-out vertical shift register 2a selectively controls each corresponding pixel row during each horizontal period in the effective vertical scanning period. In the vertical blanking period, it continues selectively controlling the first dummy pixel row $14_1$.

Namely, the vertical shift registers 2a, 15a, 15b continue selecting the dummy pixel rows $14_1$, $14_2$, $14_3$ even after they have selected all the pixel rows in the imaging area 14, and wait for the start of selection in a subsequent field period.

As described above, with the solid-state imaging device according to the second embodiment, the charge storage time can be changed on a field basis by allocating the electronic shutter operation to the two electronic shutter vertical shift registers 15a, 15b on a field basis alternately.

It is possible to realize the electronic shutter function of changing the charge storage time continuously on a field basis, with the read scanning time remaining unchanged. In the same field, any selected pixel row has the same charge storage time.

When the charge storage time is changed field by field to perform a variable electronic shutter operation as described above, a difference in charge storage time between pixel rows is prevented from arising according to the length of the charge storage time, which suppresses the occurrence of image noise, such as lateral stripes, on the display screen for the output signal.

Furthermore, the pulse selector 16a always selectively controls a total of three pixel rows, one corresponding to the output of the read-out vertical shift register 2a and two corresponding to the outputs of the two electronic shutter vertical shift registers 15a, 15b, which makes the selection loads always equal. This prevents the occurrence of lateral stripes on the display screen caused by fluctuations in the reading level due to whether the selection loads are light or heavy.

The solid-state imaging device shown in FIGS. 7 and 8 may be applied to not only the CMOS solid-state imaging device including a read circuit capable of reading a pixel signal pixel by pixel but also the CCD (charge-coupled device) solid-state imaging device which effects reading on a horizontal signal line basis.

Third Embodiment

FIG. 10 shows an equivalent circuit of a CMOS image sensor according to a third embodiment of the present invention.

The CMOS image sensor of FIG. 10 is obtained by improving the first conventional CMOS image sensor explained in FIG. 1 so that it can change the variable electronic shutter operation, continuously on a field basis, of changing the light-receiving time equivalently by changing the charge storage time automatically according to, for example, the output level of the light-receiving sensor.

Specifically, most of the CMOS image sensor of FIG. 10 is the same as that of the first conventional CMOS image sensor explained in FIG. 1 except for the following points:

(1) Two electronic shutter vertical shift registers 21, 22 are provided separately from the read-out vertical shift register 2.

(2) A register selector (SEL) 23 is added which switches between the operations of the two electronic shutter vertical shift registers 21, 22 (the operations of outputting the charge storage time control pulses) alternately at intervals of a field.

(3) The configuration of the timing generator 10a and pulse selector 24 differs from those of the first conventional CMOS image sensor. Since the rest are the same as those in the first CMOS image sensor, the same parts as those in FIG. 1 are indicated by the same reference symbols.

In FIG. 10, in the cell area (imaging area), unit cells with one pixel/unit are arranged in a two-dimensional matrix. A unit cell is composed of, for example, four transistors Ta, Tb, Tc, Td and a single photodiode PD. The ground potential is applied to the anode of the photodiode PD. One end of the read transistor (shutter gate transistor) Td is connected to the cathode of the photodiode PD. The gate of the amplification transistor Tb is connected to the other end of the read transistor Td. One end of the vertical selection transistor (row selection transistor) Ta is connected to one end of the amplification transistor Tb. One end of the reset transistor Tc is connected to the gate of the amplification transistor Tb.

In the cell area, a read line 4 connected in common to the gates of the read transistors Td of the unit cells in the same row, a vertical selection line 6 connected in common to the gates of the vertical selection transistors Ta of the unit cells in the same row, and a reset line 7 connected in common to the gates of the reset transistors Tc of the unit cells in the same row are formed in such a manner that they correspond to each row. Additionally, in the cell area, a vertical signal line VLIN connected in common to the other end of each of the amplification transistors Tb of the unit cells in the same column and a power supply line (VCC) 9 connected in common to the other end of each of the reset transistors Tc and the other end of each of the vertical selection transistors Ta of the unit cells in the same column are formed in such a manner that they correspond to each column.

Furthermore, outside one end of the cell area, load transistors TL are arranged in the horizontal direction. They are connected between one end of each of the vertical signal lines VLIN and the ground node. In addition, outside the other end of the cell area, noise canceler circuits are arranged in the horizontal direction. Each noise canceler circuit is composed of, for example, two transistors TSH, TCLP, and two capacitors Cc, Ct.

Horizontal selection transistors TH, which are connected to the other end of each of the vertical signal lines VLIN via the individual noise canceler circuits, are connected in the horizontal direction.

A horizontal signal line HLIN is connected in common to the other end of each horizontal selection transistor TH in one row. To the horizontal signal line HLIN, a horizontal reset transistor (not shown) and an output amplifier circuit AMP are connected.

Each noise canceler circuit is composed of a sample hold transistor TSH one end of which is connected to the other end of the vertical signal line VLIN, a coupling capacitor Cc one end of which is connected to the other end of the sample hold transistor TSH, a charge storage capacitor Ct connected between the other end of the coupling capacitor Cc and the ground node, and a potential clamping transistor TCLP connected to the junction node of the capacitors Cc, Ct. One end of the horizontal transistor TH is connected to the junction node of the capacitors Cc, Ct.

Furthermore, outside the cell area, there are provided the read-out vertical shift register 2 for selectively controlling the vertical selection lines 6 in the cell area in a scanning manner, the horizontal shift register 3 for driving the horizontal selection transistors TH in a scanning manner, a timing generator 10a for generating various timing signals supplied to the noise canceler circuits, the bias generator 11 for generating a specific bias potential at one end of the potential clamping transistor TCLP of the noise canceler circuit, and a pulse selector 24 for selectively controlling the output pulse of the read-out vertical shift register 2 and thereby driving the vertical selection lines 6 in each row in the cell area in a scanning manner.

Inputted to the timing generator 10a are a field period timing signal $\phi$VR, a storage (start) time control timing signal $\phi$ES set variably in a field period, a pulse signal $\phi$HP corresponding to a horizontal blanking period, and a clock pulse signal $\phi$CK.

Then, the timing generator 10a subjects the inputted timing signal $\phi$VRR to buffer shaping, thereby producing a timing signal $\phi$VRR to be supplied to the read-out vertical shift register 2. It also subjects the inputted timing signal $\phi$HP to buffer shaping, thereby producing a timing signal φHPV to be supplied to the read-out vertical shift register 2 and two electronic shutter vertical shift registers 21, 22.

The timing generator 10a further generates timing signals φROREAD, φESREAD, φRESET, and φADDR to be supplied to the pulse selector 24 and pulse signals φCLP and φSH to be supplied to the noise canceler circuit. It also produces a pulse signal φH to be supplied to the horizontal shift register 3.

Additionally, the timing generator 10a produces a field switching pulse signal φFI on the basis of the field period timing signal φVR and supplies it together with the charge storage time control timing signal φESR to the register selector 23.

The register selector 23 switches the supply destination of the storage time control timing signal φESR between the electronic shutter vertical shift registers 21, 22 alternately at intervals of a field on the basis of the field switching pulse signal φFI input. Here, the charge storage time control timing signal supplied to the electronic shutter vertical shift register 21 is represented by φESR1 and the charge storage time control timing signal supplied to the electronic shutter vertical shift register 22 is represented by φESR2.

Figure 11:
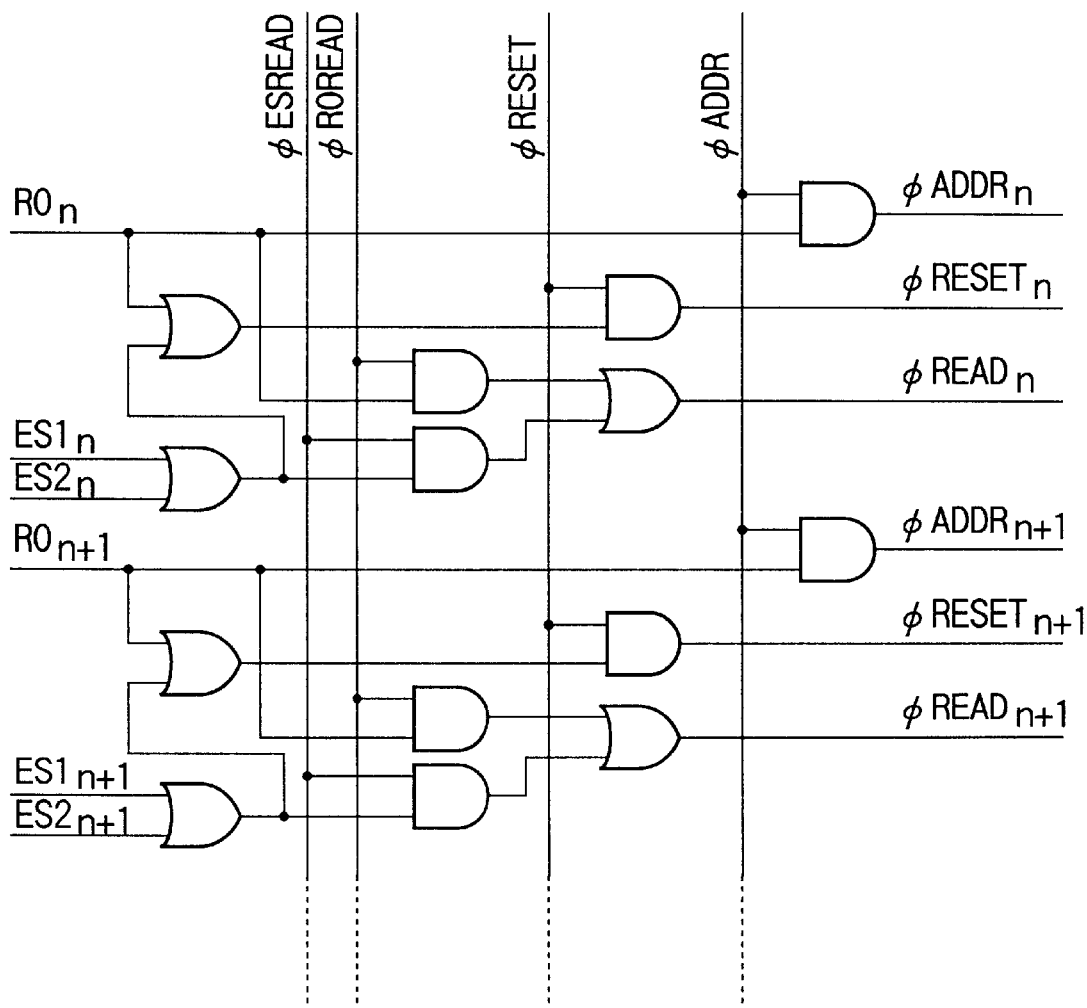
FIG. 11 is a circuit diagram showing an example of the pulse selector in FIG. 10.

FIG. 11 is a circuit diagram of an example of the pulse selector 24 in FIG. 10.

The pulse selector 24 of FIG. 11 is composed of logic gates in such a manner that not only the output signal ROn of the read-out vertical shift register 2 and the output signals φES1n, ES2n of the two electronic shutter vertical shift registers 21, 22 but also the timing signals φROREAD, φESREAD, φRESET, φADDR supplied from the timing generator 10a are inputted to the pulse selector 24 and that the pulse selector subjects these input signals to logical processing to output various driving signals φREADn, φRESETn, φADDRn, and supplies these signals to the cell area.

Specifically, when the output signal ROn of the read-out vertical shift register 2 is active, the pulse selector 24 selects the timing signal φROREAD and outputs it as a read line driving signal φREADn. When at least one of the outputs ES1n and ES2n of the two electronic shutter vertical shift registers 21, 22 is active, the pulse selector 24 selects the timing signal φESREAD and outputs it as a read line driving signal φREADn.

Furthermore, when at least one of the output signal ROn of the read-out vertical shift register 2 and the output signals ES1n, ES2n of the two electronic shutter vertical shift registers 21, 22 is active, the pulse selector 24 selects the timing signal φRESET and outputs it as a reset line driving signal φRESETn.

Additionally, when at least one of the output signal ROn of the read-out vertical shift register is active, the pulse selector 24 selects the timing signal φADDR and outputs it as a vertical selection line driving signal φADDRn.

Figure 12:
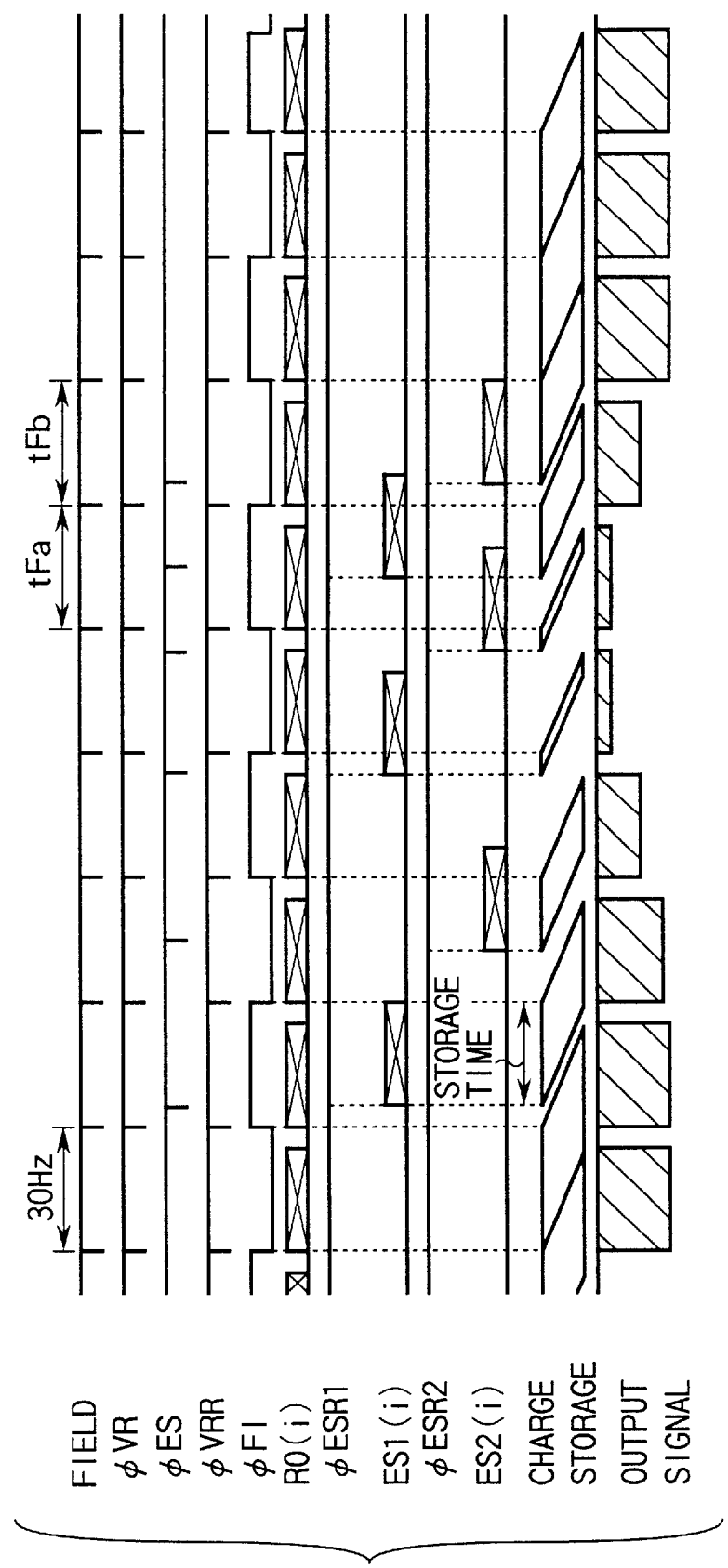
FIG. 12 is a timing waveform diagram to help explain an example of the operation of the timing generator, first to third vertical shift registers, and pulse selector in FIG. 10.

FIG. 12 is a timing waveform diagram for an example of the operation of the timing generator 10a, three vertical shift registers 2, 21, 22, and pulse selector 24 to help explain the variable electronic shutter operation capable of changing continuously on a field basis in the solid-state imaging device of FIG. 10.

FIG. 12 shows a case where the solid-state imaging device of FIG. 10 is applied to an image pickup system with one field=1/30 Hz (images with 30 frames/second using one field as one frame).

In FIG. 12, φVR is a field-period timing signal input, φES is a storage time control timing signal set variably in a field period, φVRR is a field-period timing signal supplied to the read-out vertical shift register 2, φFI is a field switching pulse signal, φESR1 is a storage time control timing signal supplied every other period to the electronic shutter vertical shift register 21, φESR2 is a storage time control timing signal supplied every other period to the electronic shutter vertical shift register 22, RO(i) is the output of the read-out vertical shift register 2, ES1(i) is the output of the electronic shutter vertical shift register 21, and ES2(i) is the output of the electronic shutter vertical shift register 22.

Figure 13:
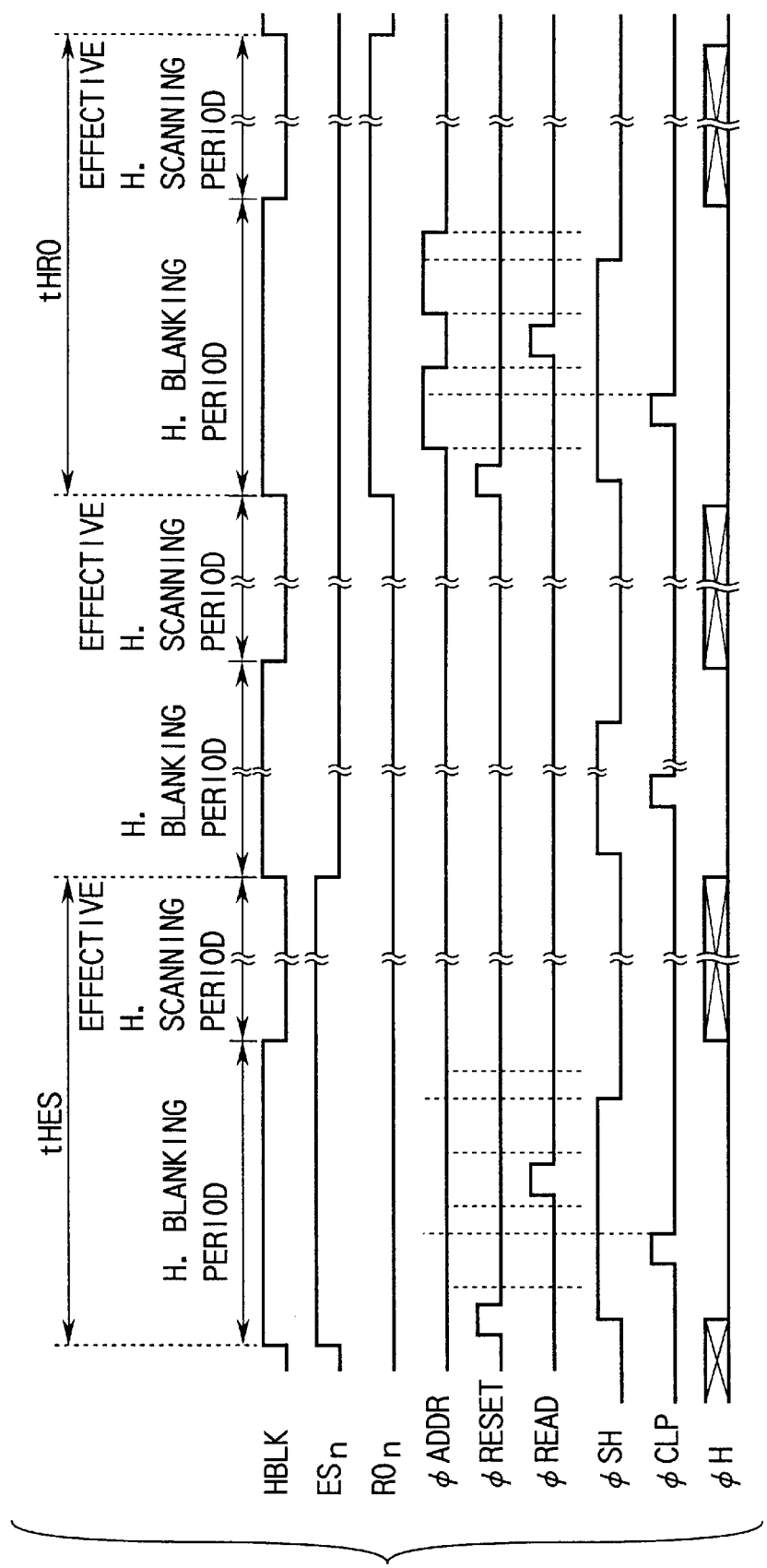
FIG. 13 is a timing waveform diagram to help explain an example of the electronic shutter operation during one field period in FIG. 12.

FIG. 13 is a timing waveform diagram to help explain an example of the operation of the electronic shutter operation in one field period in FIG. 12.

In FIG. 13, Esn is the output signal of the n-th stage of either the electronic shutter vertical shift register 21 or 22, and ROn is the output signal of the n-th stage of the read-out vertical shift register 2.

Symbol tHES indicates one horizontal period during which the output signal ESn of the n-th stage of either the electronic shutter vertical shift register 21 or 22 is active (at the high level).

Symbol tHRO indicates one horizontal period during which the output signal ROn of the n-th stage of the read-out vertical shift register 2 is active (at the high level).

Symbol HBLK represents a control pulse signal for dividing one horizontal period into a horizontal blanking period and an effective horizontal scanning period.

Symbols φCLP and φSH represent pulse signals supplied to the noise canceler circuit and are each generated every horizontal blanking period.

Symbol φH indicates a pulse signal supplied to the horizontal selection transistor TH and is generated so that the horizontal selection transistors TH arranged in the horizontal direction may be turned on sequentially in the effective horizontal scanning line period.

Symbols φADDR, φRESET, and φREAD represent the pulse signals supplied from the pulse selector 24 to the selected pixel row. The φRESET and φREAD are each activated during the horizontal blanking period in the charge storing operation and signal reading operation, respectively. The φADDR, however, is not generated during the charge storing operation and is activated during the horizontal blanking period in the signal reading operation.

For the reason described later, the pulse signal φADDR is so generated that it is activated twice intermittently so as to selectively control the vertical selection line 6 in the same row during the horizontal period in the signal reading operation.

The operation of the solid-state imaging device of FIG. 10 will be described by reference to FIGS. 12 and 13.

Figure 2:
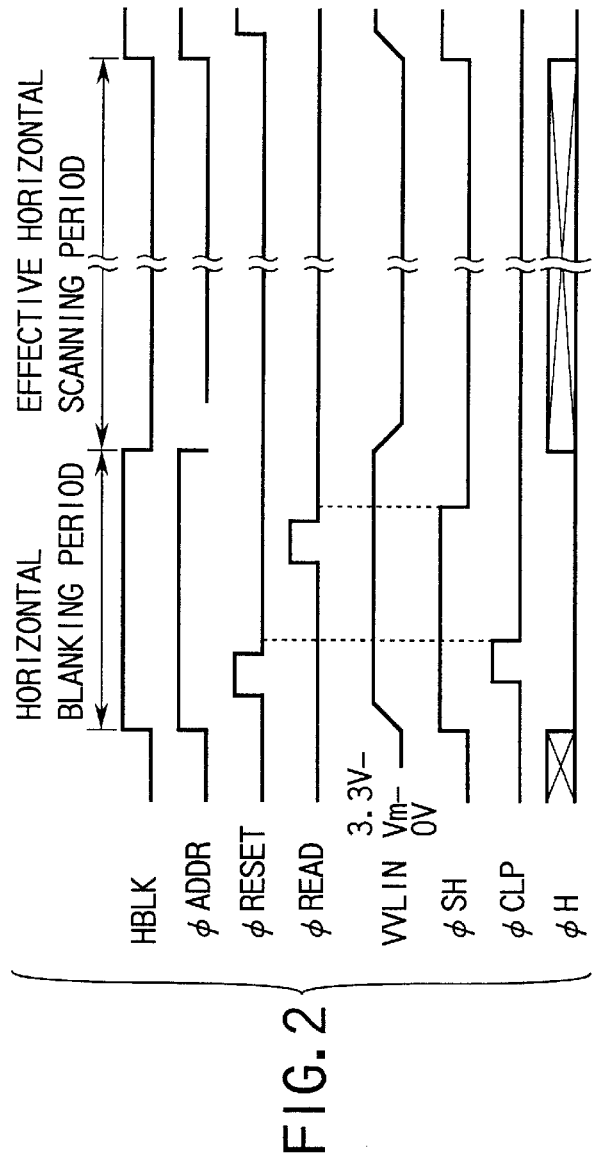
FIG. 2 is a timing waveform diagram to help explain the operation of the CMOS image sensor of FIG. 1.
Figure 3:
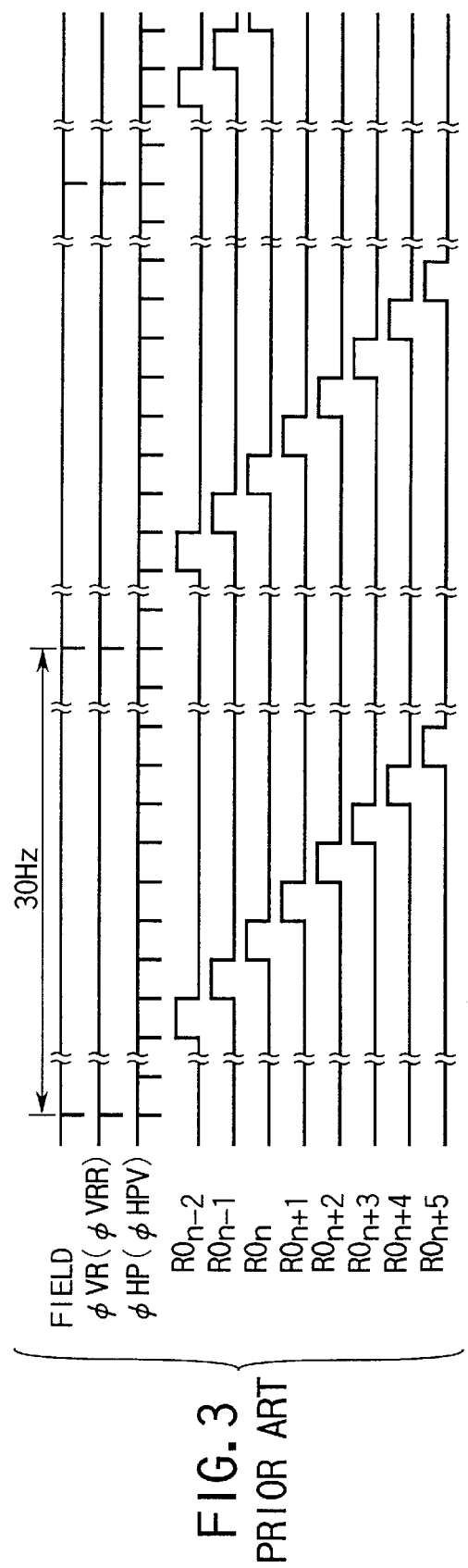
FIG. 3 is a timing waveform diagram to help explain an example of the operation of the timing generator, vertical shift register, and pulse selector in the timing waveform diagram of FIG. 2.

Since the operation of the solid-state imaging device of FIG. 10 is basically the same as the operation (FIG. 2) of the first conventional solid-state imaging device (FIG. 1), an explanation of the same operation will be omitted. What differs from the first conventional one will be mainly explained.

In the solid-state imaging device, when the electronic shutter operation is performed, the register selector 23 starts the shift operation of the two electronic shutter vertical shift registers 21, 22 alternately at intervals of a field and selects the outputs of the resisters 21, 22 alternately at intervals of a field, thereby causing the electronic shutter operation to be carried out by the two electronic shutter vertical shift registers 21, 22 alternately at intervals of a field.

This enables the electronic shutter vertical shift registers 21 and 22 to operate simultaneously, even when the charge storage time control timing signal φES is inputted at intervals of time shorter than the field period.

It is possible to control the charge storage time of the selected pixel, while selecting the pixel rows of the imaging area sequentially until the last row has been reached, without the resetting of the shift operation of either the electronic shutter vertical shift register 21 or 22 already in a shift operation by the first generated timing signal φESR1 or φESR2 before all the pixel rows of the imaging area have been selectively controlled.

In other words, it is possible to realize the electronic shutter function (the continues electronic shutter function) of changing the charge storage (start) time continuously on a field basis, with the read start scanning time remaining unchanged. In the same field, any selected pixel row has the same charge storage time.

As shown in FIG. 13, the pulse signals φRESET and φREAD are supplied to the n-th pixel row selectively controlled by the output signal ESn at the n-th shift stage of the electronic shutter vertical shift register during the horizontal period tHES. The photodiode PD in the n-th pixel row reads the signal charge stored until then into the gate of the amplification transistor Tb, thereby reducing the signal charge in the photodiode PD to zero.

Because the pulse signal φADDR remains low and the vertical selection transistor remains off, the signal charge read into the gate of the amplification transistor is not outputted to the vertical signal line VLIN.

Thereafter, when the signal charge is read out from the pixel row, the φRESET is activated temporarily in the horizontal blanking period during the horizontal period tHRO, and then the φADDR is activated and further the φREAD is activated temporarily.

To prevent the interference of noise due to the effect of the capacitive coupling between the photodiode PD and its peripheral wires (in this case, the φADDR wires explained later) when the φREAD is active (at the high level), the φADDR pulse is deactivated (placed at the low level) temporarily so that it may be in the same state as in the charge storing operation, thereby activating the φREAD temporarily in the period when the φADDR is in the inactive state.

The operation when the signal is read in the horizontal blanking period during the horizontal period tHRO will be explained. After the gate electrode of the amplification transistor Tb is reset to a reference potential by the φRESET, the φADDR is activated (the first time), thereby turning on the vertical selection transistors Ta in the n-th pixel row, which activates the pulse signal φCLP supplied to the noise canceler circuit during the active period to clamp the black level.

Then, the φREAD is activated in the period during which the φADDR is in the inactive state, thereby causing the photodiode PD to read the signal charge stored until then into the gate of the amplification transistor Tb.

Then, the φADDR is activated again (the second time), thereby turning on the vertical selection transistors Ta in the n-th pixel row again, which outputs the signal charge read into the gate of the amplification transistor Tb onto the vertical signal line VLIN.

As a result of the above operation, the time from when the active state (the high level) of the read line driving signal φREAD during the horizontal period tHES has ended until the read line driving signal φREAD has been activated during the horizontal period tHRO is the charge storage time.

Figure 14A:
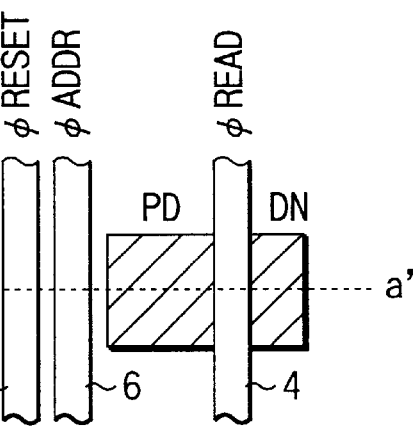
FIG. 14A is a plan view of part of the unit cells in the imaging area to help explain the operation of suppressing the interference of noise in the electronic shutter operation of FIG. 13.

FIG. 14A is a plan view showing part of the unit cells in the imaging area to help explain the interference of noise.

Figure 14B:
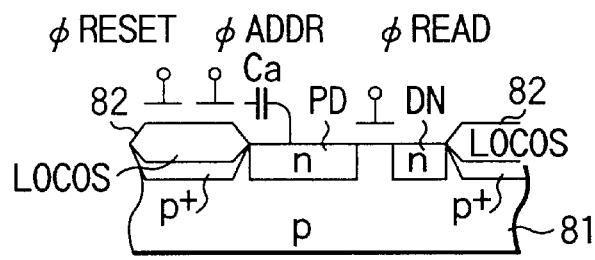
FIG. 14B is a sectional view of part of the unit cells in the imaging area to help explain the operation of suppressing the interference of noise in the electronic shutter operation of FIG. 13.

FIG. 14B is a sectional view taken along line XIVa–XIVa' of FIG. 14A.

Figure 14C:
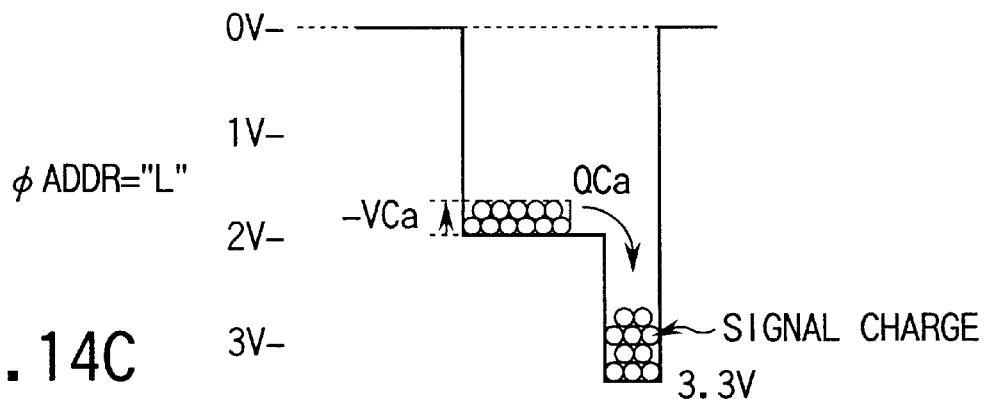
FIG. 14C shows the potential in the substrate for part of the unit cells in the imaging area to help explain the operation of suppressing the interference of noise in the electronic shutter operation of FIG. 13.
Figure 14D:
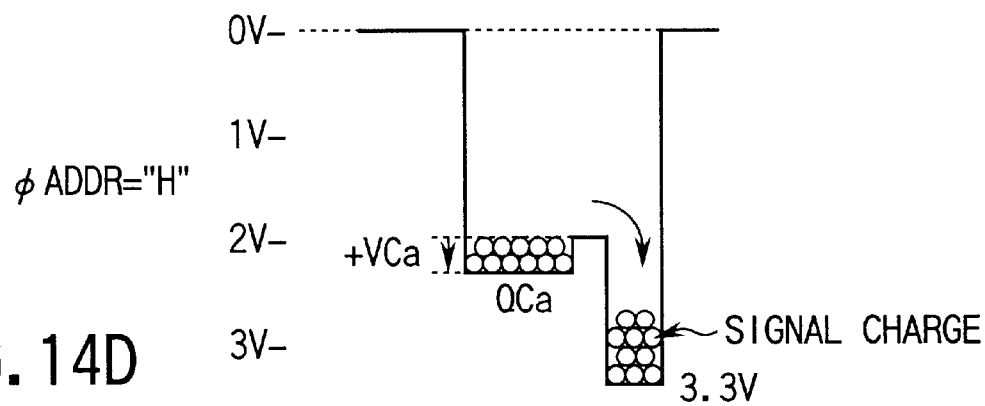
FIG. 14D shows the potential in the substrate for part of the unit cells in the imaging area to help explain the operation of suppressing the interference of noise in the electronic shutter operation of FIG. 13.

FIGS. 14C and 14D show a potential in the substrate when the φREAD is activated with the φADDR at the low level and high level in FIG. 14A respectively, thereby reading the signal charge. Here, the power supply potential is, for example, at 3.3V.

In FIGS. 14A and 14B, numeral 81 indicates a p-well formed at the surface of the silicon substrate and 82 indicates an element isolating region (for example, a LOCOS area) selectively formed at the surface of the substrate. In the element region at the surface of the substrate, an n-type region serving as both the cathode region of the photodiode and the source region of the read transistor Td and an n-type region (sense node DN) serving as the drain region of the read transistor Td are selectively formed.

On the channel region of the read transistor Td, a gate electrode (part of the read line 4) made of a polysilicon wire is formed via an insulating gate film. On the element isolating region 82 near the n-type region of the photodiode PD, a vertical selection line 5 and a rest line 7, both made of a polysilicon wire, are formed almost in parallel with each other.

In a read operation in the third embodiment, as shown in FIG. 14C, the φREAD is activated when the φADDR wire adjacent to the photodiode PD is at the low level, thereby reading the signal charge. As a result, the potential in the substrate under the photodiode PD is lowered by −V×Ca by the coupling capacitance Ca present between the photodiode PD and the φADDR wire, thereby reading the stored charge Q×Ca of the photodiode PD.

In contrast, as shown in FIG. 14D, when the φADDR wire adjacent to the photodiode PD is at the high level, the φREAD is activated, thereby reading the signal charge. This raises the potential in the substrate under the photodiode PD by+V×Ca (resulting in the interference of noise) by the coupling capacitance Ca present between the photodiode PD and the φADDR wire. As a result, the stored charge Q×Ca in the photodiode PD is not read, which allows the black signal to collapse when the output signal of the solid-state imaging device is displayed on the screen of the image display unit.

As described above, with the third embodiment, the variable electronic shutter operation can be changed continuously on a field basis.

As the solid-state imaging device of the second embodiment, the solid-state imaging device of the third embodiment may be so constructed that (1) first to third dummy pixel rows are added to the imaging area, (2) the number of shift stages of the three vertical shift registers 2, 21, 22 is set at the number of the original image pickup rows plus one, and (3) when the pulse selector 24 generates driving signals for selectively driving the horizontal-direction control line groups 4, 6, 7 on the basis of the outputs of the vertical shift registers 2, 21, 22, the first dummy pixel row is selected and driven in the activating period of the last stage output signal of the vertical shift register 2, the second dummy pixel row is selected and driven in the activating period of the last stage output signal of the second vertical shift register 21, and the third dummy pixel row is selected and driven in the activating period of the last stage output signal of the third vertical shift register 22.

With this configuration, the pulse selector 24 always selects and drives a total of three pixel rows in such a manner that the three pixel rows correspond to the read-out vertical shift register 2 and two electronic shutter vertical shift registers 21, 22 in a one-to-one ratio. This makes the selection loads always equal, which prevents the occurrence of lateral stripes on the display screen due to fluctuations in the read level caused by whether the selection loads are light or heavy.

In the third embodiment, it has been explained that the φADDR wire is present as the peripheral wire causing the problem of black collapse due to the capacitive coupling with the photodiode PD. Since the collapse of the black signal (black collapse) due to the capacitive coupling between peripheral wires and the photodiode PD can take place even if the φRESET and the like are present as the peripheral wire, the level should be controlled for those wires as for the φADDR wire in the third embodiment.

Specifically, as the voltage applied to the peripheral wires of the photodiode PD except for the read gate wires adjacent to the photodiode PD, the same voltage is applied in both of the activating period of the signal read pulse φREAD in a signal read-out operation and the activating period of the signal read pulse φREAD in an electronic shutter operation. This prevents extra charge from being read out from the photodiode PD through the capacitive coupling between the photodiode PD and the peripheral wires, which provides a reproduced image without black collapse.

The first to third embodiments are related to an image sensor having unit cells (as shown in FIG. 10) with one pixel/unit. The configuration of a unit cell is not limited to this. Another configuration of a unit cell may be used. As an example, an embodiment of a solid-state imaging device having unit cells with two pixels/unit will be explained.

Fourth Embodiment

Figure 15:
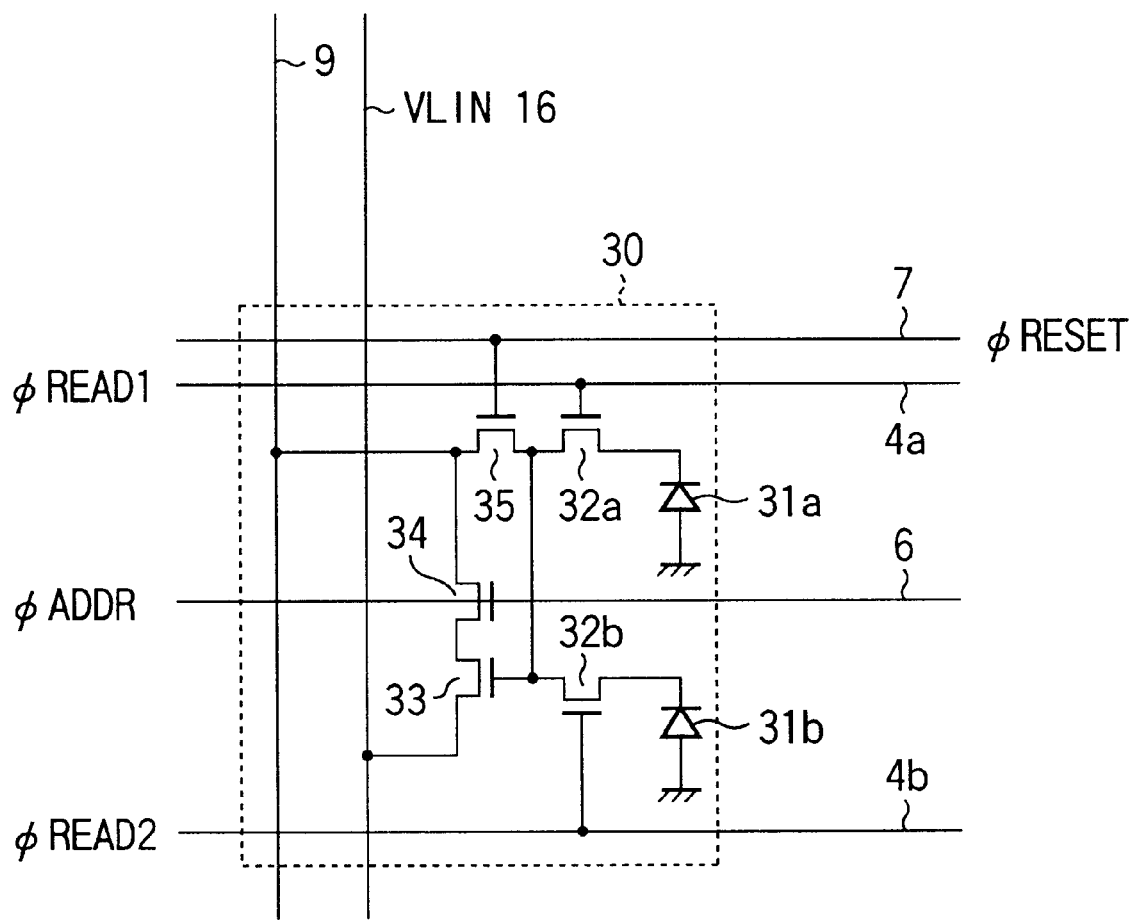
FIG. 15 shows an equivalent circuit of a unit cell with two pixels/unit in a CMOS image sensor according to a fourth embodiment of the present invention.

FIG. 15 shows an equivalent circuit of a unit cell with two pixel/unit in an amplification-type CMOS image sensor according to a fourth embodiment of the present invention. This image sensor can be constructed in the same manner as each of the above embodiments except for the configuration of the unit cell. Explanation will be given, centering around the configuration of a unit cell with two pixels/unit.

A unit cell 30 shown in FIG. 15 has two photodiodes 31a, 31b. The ground potential is applied to the anodes of the two photodiodes 31a, 31b. The cathodes of the photodiodes 31a, 31b are connected in common to the gate of an amplification transistor 33 via read transistors (shutter gate transistors) 32a, 32b, respectively. Read lines 4a, 4b are connected to the gates of the two read transistors 32a, 32b, respectively.

The amplification transistor 33 has one end connected to a vertical signal line (VLIN) 16 and the other end connected to a power-supply line 9 via a vertical selection transistor 34 (that is, the amplification transistor 33 is in source follower connection). An address select line (address line φADDR) 6 is connected to the gate of the vertical selection transistor 34.

Furthermore, a reset transistor 35 is connected between the gate of the amplification transistor 33 and the power-supply line 9. A reset line 7 is connected to the gate of the reset transistor 35.

The unit cell 30 with two pixels/unit constructed as described above is arranged in a two-dimensional matrix in the imaging area. Two read lines φREAD1, φREAD2 (a first read line 4a and a second read line 4b), the vertical selection line φADDR (address line) 6, and the reset line 7 are formed in the horizontal direction on the imaging area. The vertical signal line VLIN and the power-supply line 9 are formed in the vertical direction on the imaging area.

Figure 16A:
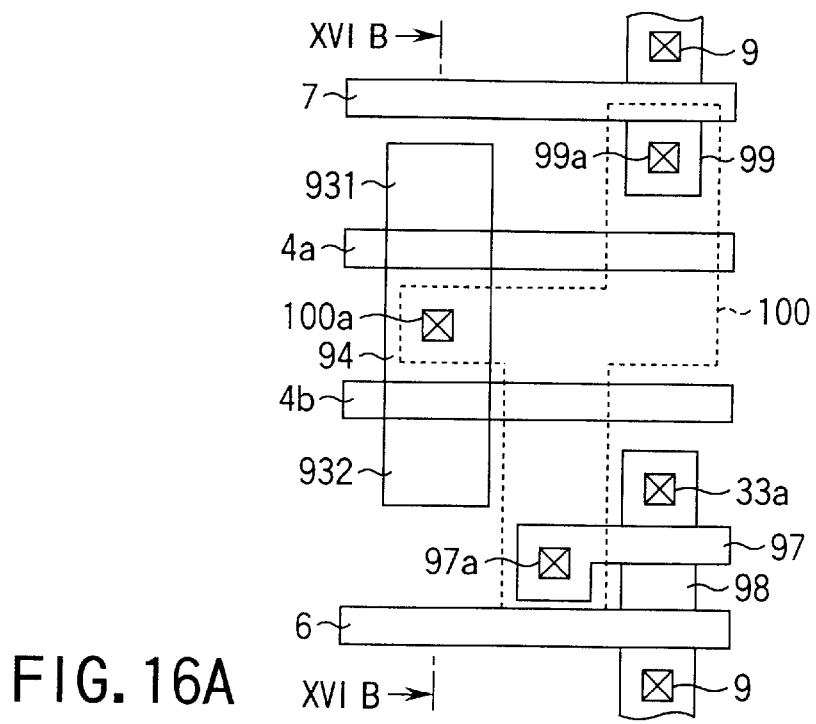
FIG. 16A schematically shows an example of a plane pattern of a unit cell with two pixels/unit of FIG. 15.
Figure 16B:
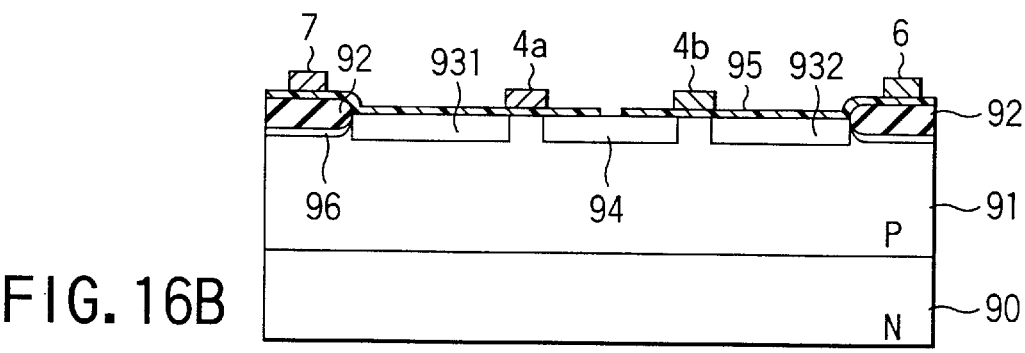
FIG. 16B schematically shows an example of a sectional view of the unit cell with two pixels/unit of FIG. 15.

FIG. 16A shows an example of a plane pattern of the unit cell with two pixels/unit of FIG. 15. FIG. 16B schematically shows its sectional structure taken along line XVIB—XVIB'.

In FIGS. 16A and 16B, a p-type well 91 is formed in the surface region of an n-type silicon substrate 90. At the surface of the p-type well 91, an element isolating region (for example, a LOCOS region) 92, an n-type impurity region 931 serving as both the cathode region of one photodiode 31a and the source region of one read transistor 32a, an n-type impurity region 932 serving as both the cathode region of the other photodiode 31b and the source region of the other read transistor 32b, and the source, drain, and gate regions (in the figure, only an n-type impurity region 94 acting as the common drain of the read transistors 32a, 32b is shown) of an NMOS transistor are selectively formed.

Then, on the substrate surface, a silicon oxide film (gate insulating film) 95 is formed. Under the bottom surface of the LOCOS region 92, a field ion implantation region 96 is formed.

Further formed on the substrate surface are a polysilicon gate wire a part of which is the gate of the amplification transistor 3, an n-type impurity region 98 serving as both the drain region of the amplification transistor 33 and the source region of the vertical selection transistor 34, and a wire 100 connecting the source region of the reset transistor 35, the gate wire 97 of the amplification transistor 33, and the common drain region of the two read transistors 32a, 32b.

The read line 4a is made of a polysilicon gate wire a part of which is the gate electrode of the read transistor 32a. The read line 4b is made of a polysilicon gate wire a part of which is the gate electrode of the read transistor 32b.

The vertical selection line (address line) 6 is made of a polysilicon gate wire a part of which is the gate electrode of the vertical selection transistor 34. The reset line 7 is made of a polysilicon gate wire a part of which is the gate electrode of the reset transistor 35.

There are provided a contact section 33a for the source region of the amplification transistor 33 and the vertical signal line VLIN, a contact section 34a for the drain region of the vertical selection transistor 34 and the power-supply line 9, a contact section 97a for the gate wire 97 of the amplification transistor 33 and the wire 100, a contact section 99a for the source region 99 of the reset transistor 35 and the wire 100, a contact section 99b for the drain region of the reset transistor 35 and the power-supply line 9, and a contact section 100 for the wire 100 and the common drain region of the two read transistors 32a, 32b.

The operation of the unit cell with two pixels/unit is the same as that of the unit cell with one pixel/unit in the basic operation of activating five transistors in a specific sequence to read the signal charge from the photodiode 31a, 31b, but differs from the latter in that the signal charge is read out from the two photodiodes 31a, 31b with different timing. Specifically, when the signal charge is read out from one photodiode 31a, the high (H) read signal is supplied to the first read line 4a and the low (L) read signal is kept supplied to the second read line 4b. When the signal charge is read out from the other photodiode 31b, the high (H) read signal is supplied to the second read line 4b and the low (L) read signal is kept supplied to the first read line 4a.

In the CMOS image sensor having an array of unit cells with two pixels/unit as described above, even when the aforementioned shutter function is not used, it is possible to prevent the occurrence of lateral stripes on the display screen when the output signal is displayed on the image display unit, by driving the address line driving signal intermittently twice when the signal charges are read out from the two photodiodes 31a, 31b with different timing.

Figure 17:
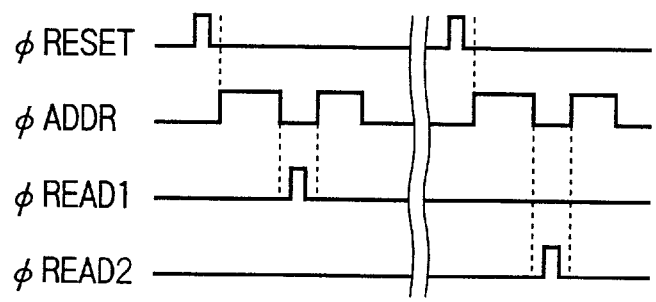
FIG. 17 is a timing waveform diagram to help explain an example of the operation of reading signals during one field period in the fourth embodiment.

FIG. 17 is a timing waveform diagram to help explain an example of the operation of reading the signal in part of one field period in the CMOS image sensor of the fourth embodiment.

In FIG. 17, the φRESET, φADDR, φREAD1 or φREAD2 is a pulse signal supplied from the pulse selector 24 to the selected pixel row. Each of the pulse signals is activated during a horizontal blanking period in a signal reading operation. The φREAD1 and φREAD2 are supplied in different blanking periods.

If the distance between the second read line 4b to which φREAD2 is supplied and the address line 6 is shorter or longer than the distance between the first read line 4a to which φREAD1 is supplied and the address line 6, the coupling capacitance between the second read line 4b and the address line 6 is greater or smaller than the coupling capacitance between the first read line 4a and the address line 6. This has different effects on the signal charge read out from the two photodiodes 31a, 31b, which can permits lateral stripes to occur on the display screen when the output signal is displayed on the image display unit.

However, because the φADDR is generated so as to get active intermittently twice in order to selectively control the address lines 6 in the same row during the horizontal blanking period in the signal read operation and because the φADDR is at the low level when the signal charge is read out from each of the two photodiodes 31a, 31b, the effects in the signal charge reading are almost equal, which prevents the occurrence of lateral stripes on the display screen.

The above-described embodiments are not restricted to the aforementioned type solid-state imaging device and may be applied to the stacked type solid-state imaging device where the imaging area is stacked on another circuit section.

With the first to fourth embodiments, the loads on the read-out vertical shift register and electronic shutter vertical shift register are prevented from fluctuating when the electronic shutter operation is carried out, image noise of lateral stripes occurred on the display screen of the output signal is suppressed, and clear images with a high signal-to-noise ratio are obtainable.

Furthermore, the electronic shutter operation is allocated to the two electronic shutter shift registers alternately at intervals of a field, thereby realizing the variable electronic shutter operation (continuous electronic shutter operation) of changing the charge storage time on a field basis.

Thus, a difference in the charge storage time between pixel rows is prevented from occurring according to the length of charge storage time. In addition, image noise, such as lateral stripes, on the display screen of the output signal is prevented from developing.

Furthermore, two dummy pixel rows are so provided that they correspond to the two electronic shutter vertical shift registers and the three pixel rows selectively controlled by the read-out vertical shift register and two electronic shutter shift registers are always selectively driven, which eliminates fluctuations in the loads due to the selection of pixel rows and prevents lateral stripes on the display screen from occurring.

In addition, the voltage applied to the peripheral wires excluding the read gates adjacent to the photodiodes is made equal during both the activating period of the read pulse signal in the signal read operation and the activating period of the read pulse signal in the electronic shutter operation and the reading of extra charge from the photodiodes through the capacitive coupling with the wires is suppressed, which provides a reproduced image without black collapse.

Furthermore, when the stored charge is read out from the photoelectric conversion elements of two pixels in a unit cell with two pixels/unit in the imaging area, the voltage of the other wires adjacent to the wires for controlling the reading and located in the vicinity of the photoelectric conversion elements are made basically equal in reading each pixel, which makes the effects of the voltages of the other wires almost equal when the signal charge is read out from the photoelectric conversion element of each of the two pixels. As a result, the occurrence of lateral stripes on the display screen is prevented from occurring.

Fifth Embodiment

When the above-described CMOS image sensor is applied to an NTSC/PAL camera or a DV camera, it performs an interlace operation where addition of outputs from two pixel rows is done inside the sensor. In the interlace operation, a read operation is started from an odd-numbered row in the first field, whereas a read operation is started from an even-numbered row in the second field.

Figure 18:
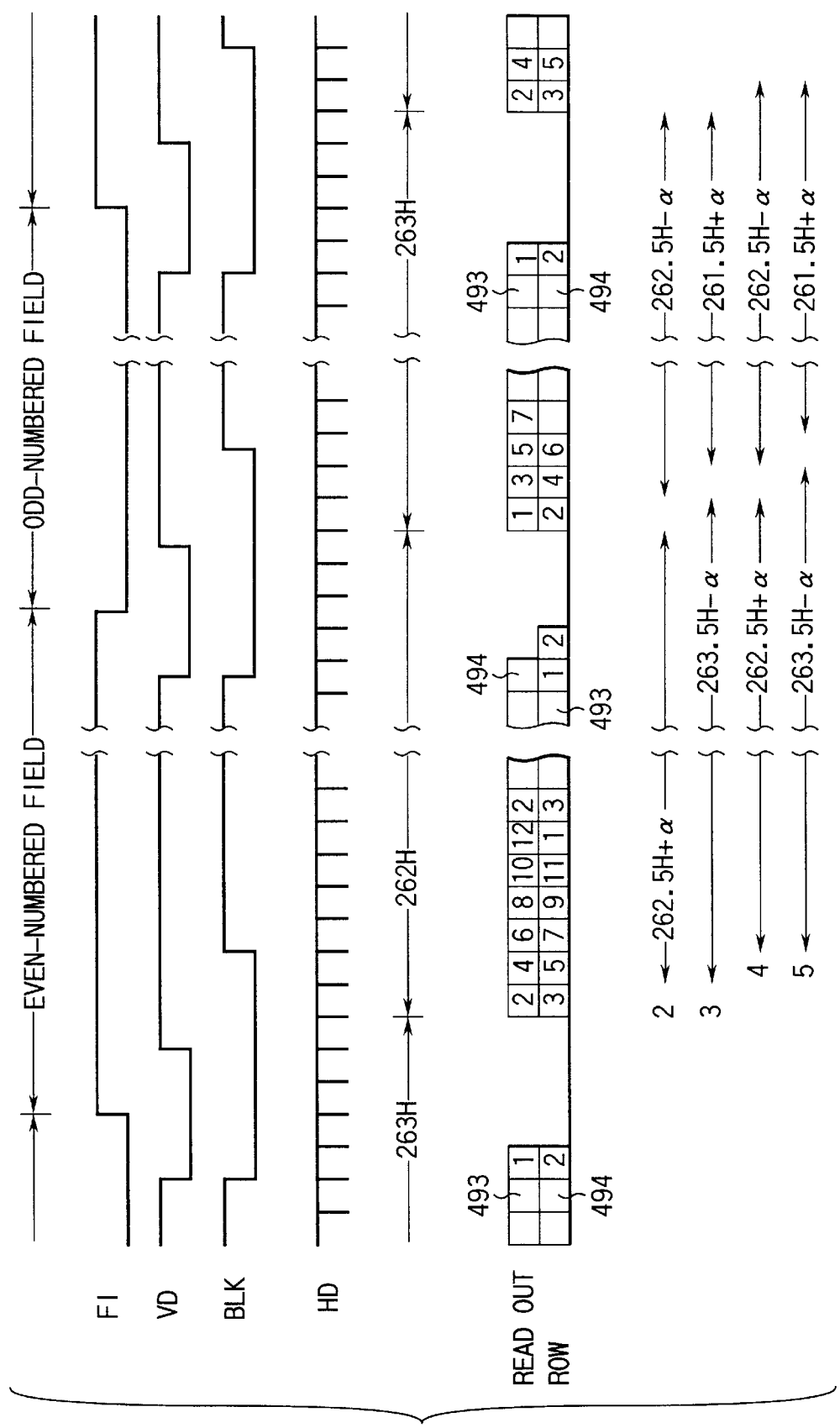
FIG. 18 is a timing chart to help explain an example of the interlace operation of a conventional CMOS image sensor.
Figure 21:
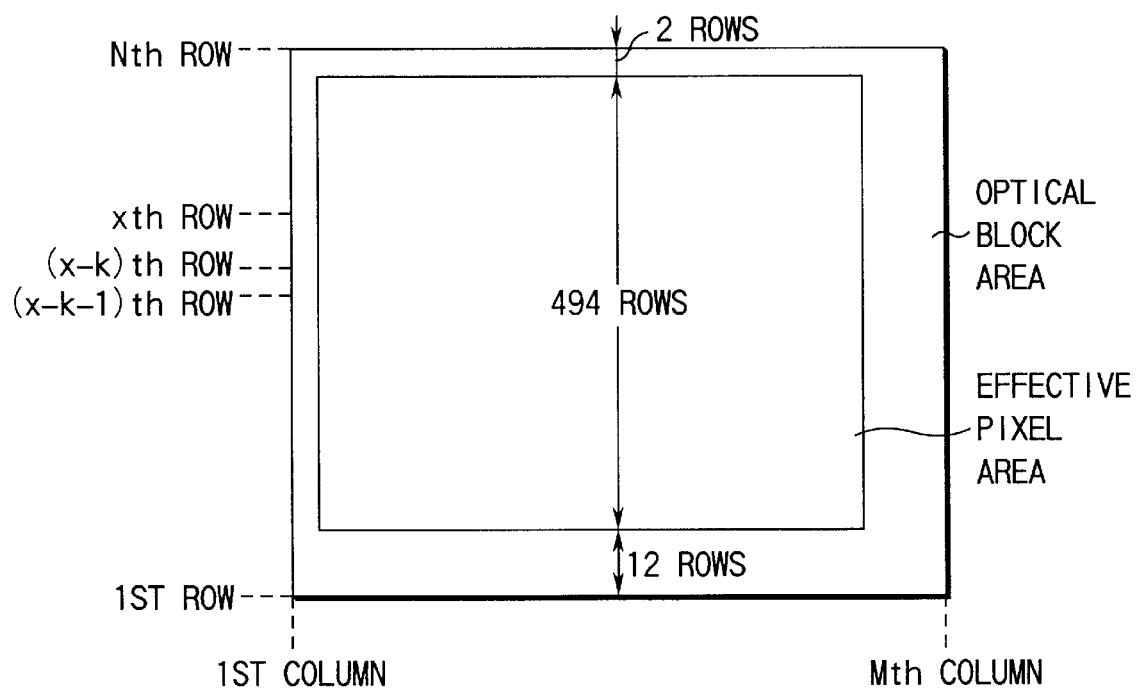
FIG. 21 is an explanatory diagram of an example of the configuration of the imaging area corresponding to the imaging section shown in FIG. 19.

FIG. 18 shows the interlace operation of a conventional CMOS image sensor. It is assumed that the sensor has an imaging area as shown in FIG. 21. In the figure, FI indicates a field index, VD a vertical synchronizing signal, HD a horizontal synchronizing signal, and BLK a vertical blanking period.

In a conventional CMOS image sensor, the electric signal corresponding to the signal charge stored in the photodiodes is read in an even-numbered field as shown in FIG. 18 in this order: (the second row+the third row in the vertical optical black area), (the fourth row+the fifth row in the vertical optical black area), (the sixth row+the seventh row in the vertical optical black area), . . . In addition, the electric signal corresponding to the signal charge stored in the photodiodes is read in an odd-numbered field in this order: (the first row+the second row in the vertical optical black area), (the third row+the fourth row in the vertical optical black area), (the fifth row+the sixth row in the vertical optical black area), . . .

Therefore, as shown in FIG. 18, the storage period for the second row is 262.5H−α (H is one horizontal period and α is the value dependent on the read timing in a horizontal blanking period) and the storage period for the third row is 263.5H−α (262.5H+1H−α) in an odd-numbered field. The storage period for the second row is 262.5H+α and the storage period for the third row is 261.5H+α (262.5H−1H+α) in an even-numbered field.

Specifically, even in the same field, the storage period for an even-numbered row differs from that for an odd-numbered row. Moreover, even in the same row, the storage period for an even-numbered field differs from that for an odd-numbered field. A sensor featuring simultaneousness, such as a CCD image sensor, has not such a problem. In the case of a line read-out type sensor without simultaneousness, such as a CMOS image sensor, when interlace scanning is done, such a non-uniform storage period problem arises. When the storage period is long, such a non-uniform storage period does not have a great effect on the picture quality. However, when the storage period is short (for example, when the storage period is short as a result of the variable electronic shutter operation of picking up a bright image), such a non-uniform storage period has a great effect on the picture quality.

On the other hand, when a CMOS image sensor is used under a fluorescent lamp, the flicker of the fluorescent lamp in a period different from the vertical scanning period can have adverse effect on the picture quality. The flicker problem can be encountered in not only interlace scanning but also progressive scanning by which one frame of signals is read sequentially.

To overcome these problems, an embodiment will be explained which eliminates adverse effect on the picture quality caused by a difference in the storage time of the photoelectrically converted signal charge between an even-numbered row and an odd-numbered row or between an even-numbered field and an odd-numbered field which is a drawback of a conventional CMOS solid-state imaging device when an interlace operation is carried out, or caused by a flicker in a period different from the vertical scanning period (the period of one frame or one field).

Figure 19:
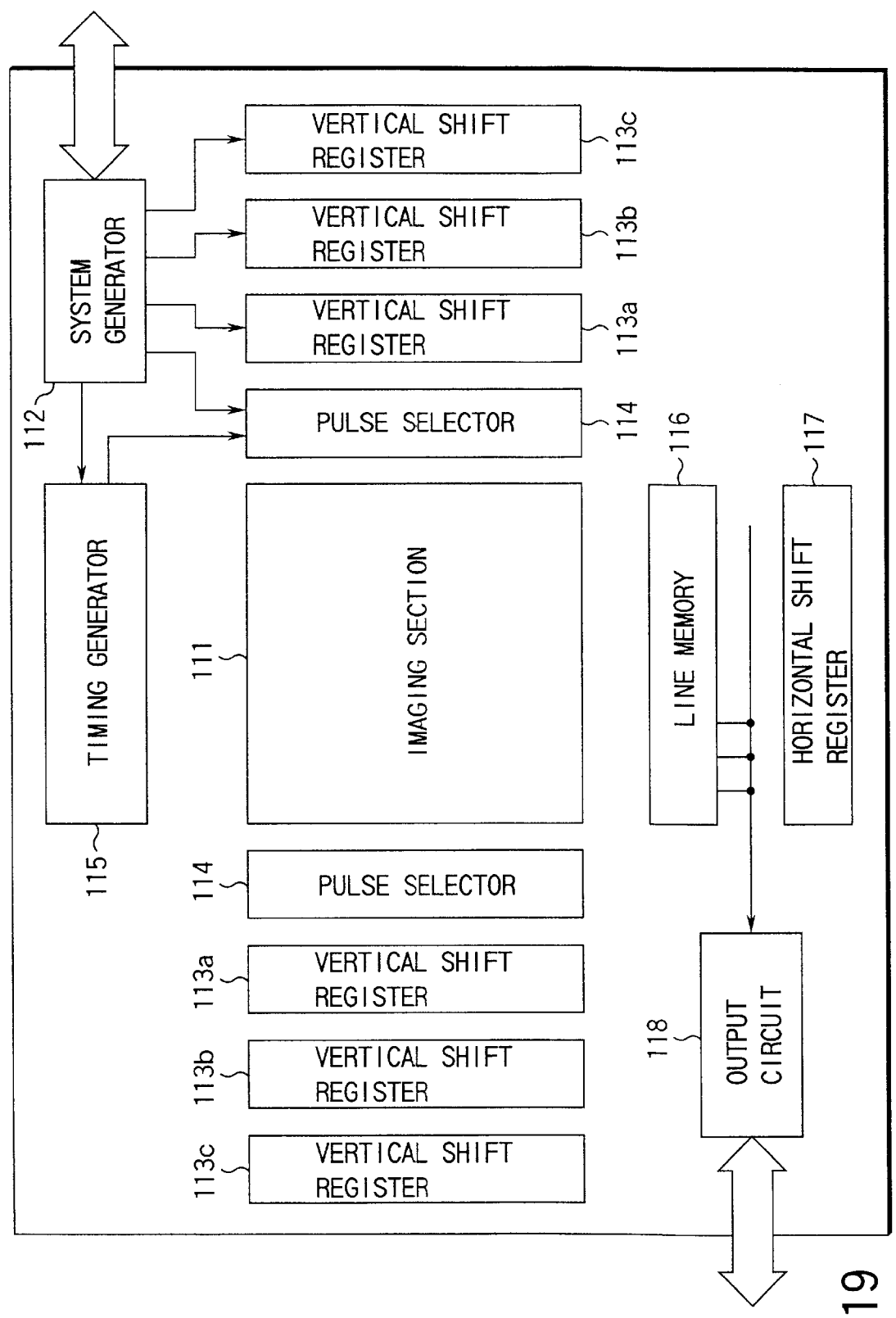
FIG. 19 is a block diagram of an example of,the overall configuration of a CMOS image sensor according to a fifth embodiment of the present invention.

FIG. 19 is a block diagram showing an overall configuration of a CMOS image sensor according to a fifth embodiment of the present invention.

The fifth embodiment is mainly composed of an imaging section 111, a system generator 112, vertical shift registers 113a to 113c, a pulse selector 114, a timing generator 115, a line memory 116, a horizontal shift register 117, and an output circuit 118. These individual elements are formed on the same semiconductor substrate (e.g., a silicon substrate). The timing generator 115 and system generator 112 correspond to the timing generator 10a of the third embodiment.

Figure 20:
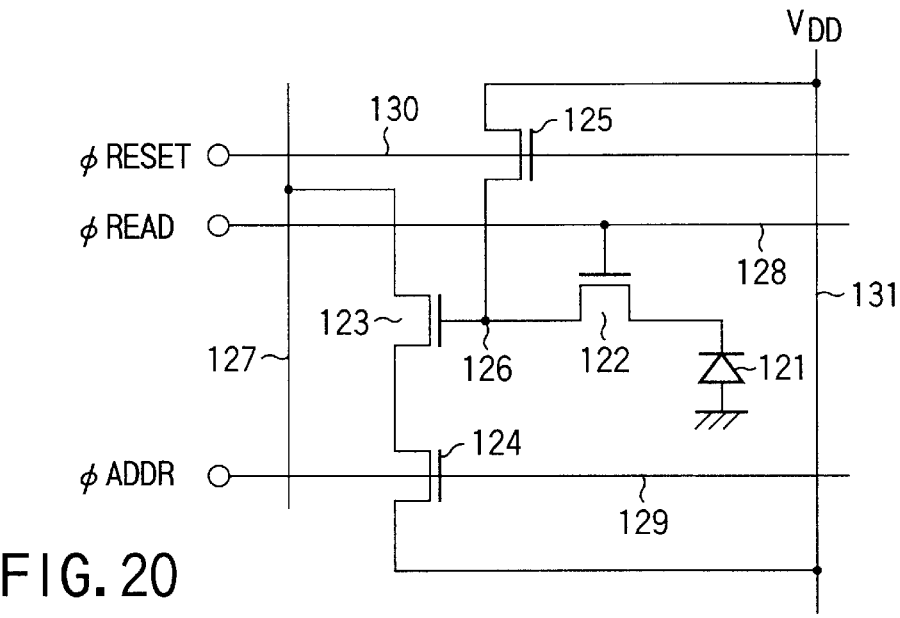
FIG. 20 is an electric circuit diagram showing an example of the configuration of a unit cell constituting one of the main component parts of the imaging section in FIG. 19.

The imaging section 111 is composed of a large number of unit cells and others arranged in the directions of row and column two-dimensionally. FIG. 20 shows the configuration of a unit cell. Each unit cell is composed of a photodiode 121 acting as a photoelectric conversion section, a read transistor 122, an amplification transistor 123, an address transistor 124, a reset transistor 125, a sense node 126, and others.

A common vertical signal line 127 is connected to the individual amplification transistors 123 in each unit cell arranged in the direction of column. The electric signal corresponding to the signal charge stored in the photodiode 121 is read onto the vertical signal line 127. A common read control line (φREAD) 128, an address control line (φADDR) 129, and a reset control line (φRESET) 130 are connected to the individual read transistors 122, address transistors 124, and reset transistors 125 in each unit cell arranged in the direction of row. Additionally, a common power-supply line 131 is connected to the individual address transistors 124 and reset transistors 125 in each unit cell arranged in the direction of column.

Various types of control signals are externally supplied to the system generator 112. They includes a vertical synchronizing signal, a horizontal synchronizing signal, an interlace scanning/progressive scanning selection signal, a field index signal (FI signal) for switching between an even-numbered field and an odd-numbered field, an address signal in random accessing, and an electronic shutter control signal. These control signals are used to control the operation of the CMOS image sensor.

The vertical shift register 113a is used to select the individual unit cells arranged in the direction of row in the imaging section 111 with specific timing. The electric signal corresponding to the signal charge stored in the photodiode 121 in each selected unit cell is read onto the vertical signal line 127.

The vertical shift registers 113b and 113c are also used to select the individual unit cells arranged in the direction of row in the imaging section 111 with specific timing. They discharge the unnecessary charge stored in the photodiode 121 in each selected unit cell, thereby resetting the photodiode 121 to the initial state. The reason why two shift registers 113b, 113c for setting the photodiode 121 in the initial state are provided is that the initial state setting timing for an even-numbered field differs from that for an odd-numbered field in interlace scanning.

When the timing for setting the initial state is adjusted field by field and row by row, this enables the output signals of the vertical shift registers 113a, 113b, and 113c to make the storage time of the signal charge in each photodiode 121 constant for each field and for each row.

The pulse selector 114 supplies a selection signal to the row specified by the vertical shift registers 113a, 113b, 113c. Specifically, receiving the timing signal from the timing generator 115, the pulse selector 114 supplies a control signal to the read control line 128, address control line 129, and reset control line 130 for the selected row with specific timing.

While in the figure, the vertical shift register 113a, 113b, 113c, and pulse selector 114 are provided on both the right side and the left side, they may be provided on only one side, as long as they have sufficient driving capabilities.

The line memory 116 is for storing the electric signal read through the vertical signal line 127. The signal read onto the line memory 116 is outputted sequentially by the horizontal shift register 117 from the output circuit 118 to the outside world.

Next, a first example of the operation of the fifth embodiment will be explained. First, the operating principle will be described by reference to FIG. 21. FIG. 21 shows an imaging area corresponding to the imaging section 111 shown in FIG. 19.

The imaging area has N×M pixels with N rows in the vertical direction and M columns in the horizontal direction. It is composed of an effective pixel area sensitive to light and an OB (optical black) pixel area that is provided outside the effective pixel area and outputs a black signal. Specifically, the first twelve rows in the vertical direction and the last two rows make the OB pixel area and the remaining 494 rows make the effective pixel area. In the horizontal direction, too, the first specific number of columns and the last specific number of columns make the OB pixel area and the remaining columns make the effective pixel area.

In the this embodiment, in horizontal blanking periods corresponding to read-out periods for reading out the signal of the x-th row, the (x−k)-th row is brought in the initial state in an odd-numbered field and the (x−k−1)-th row is placed in the initial state in an even-numbered field. By carrying out a read-out operation and initializing operation in each horizontal blanking period this way, the storage time of the photodiode provided in each row for an even-numbered field can be made equal to that for an odd-numbered field.

As described above, when the storage period is particularly short (for example, when the storage period is shortened by an electronic shutter operation in picking up a bright image), the non-uniformity of the storage period has adverse effect on the picture quality. With the fifth embodiment, however, the picture quality is improved by making the storage period constant.

Next, the first example of operation will be described by reference to the timing chart of FIG. 22.

Figure 22:
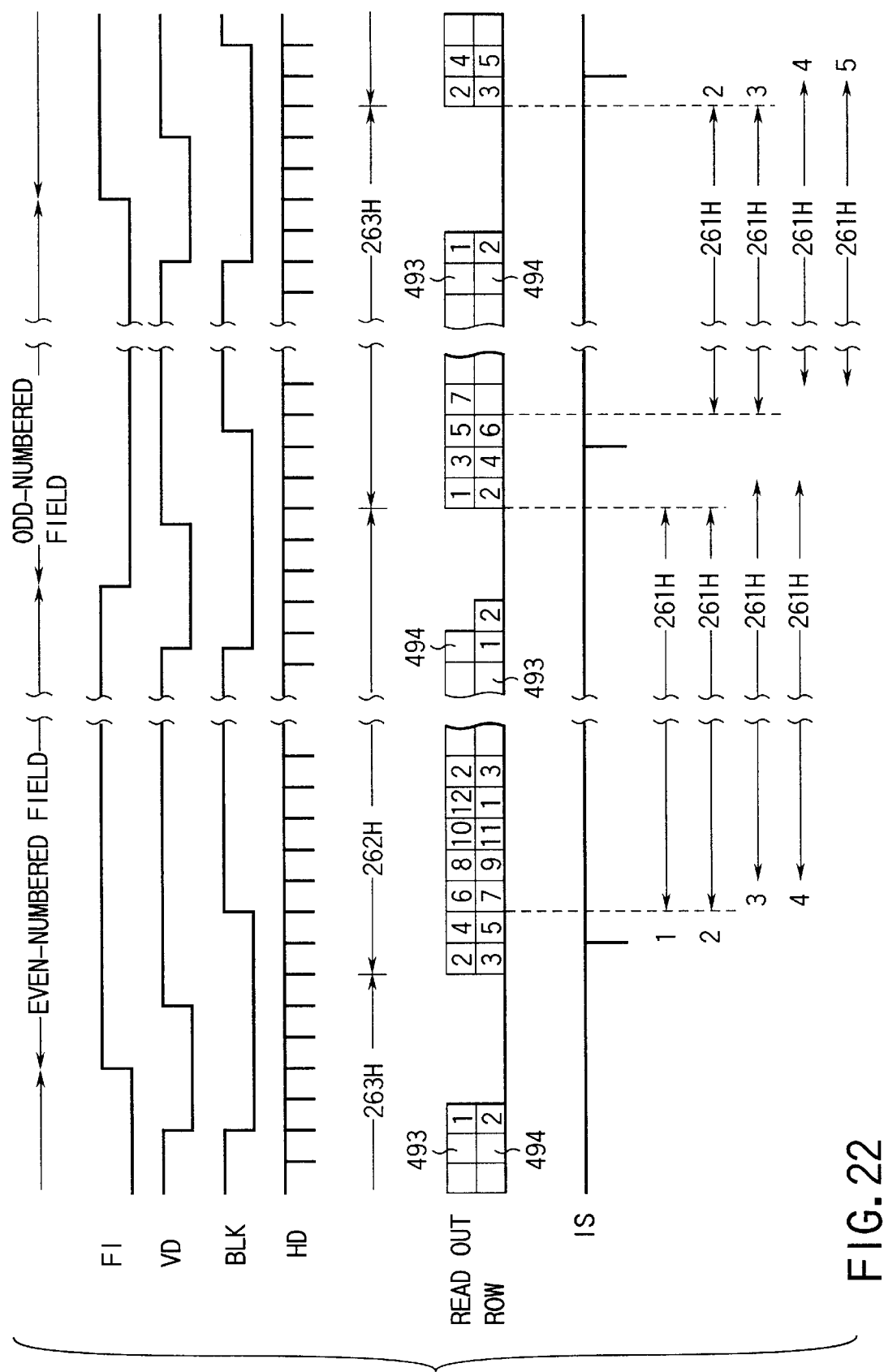
FIG. 22 is a timing chart for a first example of a flicker correction operation of the fifth embodiment.

In FIG. 22, FI indicates a field index, VD a vertical synchronizing signal, HD a horizontal synchronizing signal, BLK a vertical blanking period, and IS an initializing start signal. IN interlace scanning, the electric signal corresponding to the signal charge stored in the photodiode in an even-numbered field is read out in this order: (the second row+the third row in the vertical optical black area), (the fourth row+the fifth row in the vertical optical black area), (the sixth row+the seventh row in the vertical optical black area), . . . Additionally, in an odd-numbered field, the electric signal corresponding to the signal charge stored in the photodiode is read out in this order: (the first row+the second row in the vertical optical black area), (the third row+the fourth row in the vertical optical black area), (the fifth row+the sixth row in the vertical optical black area), . . .

The vertical synchronizing signal VD, horizontal synchronizing signal HD, field index signal FI, and other signals are externally supplied to the system generator 112 of FIG. 19. Depending on whether the field index signal FI is high (corresponding to an even-numbered field) or low (corresponding to an odd-numbered field), the system generator 112 changes the initialization start signal IS supplied to the electronic shutter vertical shift registers 113b and 113c by one horizontal period for every field. Specifically, the occurrence time of the initialization start signal IS with respect to the vertical synchronizing signal VD for an even-numbered field is made different from that for an odd-numbered field. As a result, the storage period for each row is 261 horizontal periods (261H) for both an even-numbered field and an odd-numbered field.

Hereinafter, a concrete operation will be explained in further detail.

In an even-numbered field, a read operation is started from (the second row+the third row in the vertical optical black area). In an odd-numbered field 261 horizontal periods ahead of the even-numbered field, an initialization start signal IS for the second row and third row is generated, which initializes the individual photodiodes in the second and third rows. Similarly, for (the fourth row+the fifth row in the vertical optical black area) and later, an initialization start signal IS is generated 261 horizontal periods ahead of the read operation, which initializes the photodiodes as described above (an initialization start signal IS is not shown for (the fourth row+the fifth row) and later).

In an odd-numbered field, a read operation is started from (the first row+the second row in the vertical optical black area). In an even-numbered field 261 horizontal periods ahead of the odd-numbered field, an initialization start signal IS for the first row and second row is generated, which initializes the individual photodiodes in the first and second rows. Similarly, for (the third row+the fourth row in the vertical optical black area) and later, an initialization start signal IS is generated 261 horizontal periods ahead of the read operation, which initializes the photodiodes as described above (an initialization start signal IS is not shown for (the third row+the fourth row) and later).

When in an even-numbered field, the reading of, for example, (the second row+the third row in the vertical optical black area) is effected, the reading of the second row is effected in the first half of the horizontal blanking period on the basis of the signals from the vertical shift register 113a and others shown in FIG. 19. Then, in the second half of the horizontal blanking period, the reading of the third row is done.

In the first half of the horizontal blanking period, the address transistor 124 provided for each unit cell (see FIG. 20) in the second row is turned on. Furthermore, the reset transistor 125 is turned on, thereby resetting the potential at the sense node 126 to a specific potential. Then, the read transistor 122 is turned on, permitting the voltage at the sense node 126 to vary in accordance with the charge stored in the parasitic capacitance of the photodiode 121. The signal voltage at the sense node 126 is read onto the vertical signal line 127 via the amplification transistor 123. In the second half of the horizontal blanking period, the same operation is carried out for each unit cell in the third row.

The signals of two rows read onto the vertical signal line 127 in the first and second halves of the horizontal blanking period are added in the line memory 116. The added signal is outputted to the outside via the output circuit 118.

The initialization of (the second row+the third row) is effected in the horizontal blanking period 261 horizontal periods ahead of the reading of (the second row+the third row). In initialization, the system generator 112 of FIG. 19 supplies an initialization start signal IS to the vertical shift register 113b. On the basis of the initialization start signal IS, the read transistor 122 provided for each unit cell (see FIG. 20) in the second row is turned on in the first half of the horizontal blanking period and the read transistor 122 provided for each unit cell in the third row is turned on in the second half of the horizontal blanking period. This causes the unnecessary charge stored in each photodiode 121 in the second and third rows to be discharged in the first and second halves of the horizontal blanking period, which initializes each photodiode 121.

Since a read-out operation and an initializing operation are carried out in each horizontal blanking period, there are rows to be read out and rows to be initialized in the same horizontal blanking period.

The same basically holds true for the reading of, for example, (the first row+the second row) and the initialization of (the first row+the second row) in an odd-numbered field. In initialization, the system generator 112 supplies the initialization start signal IS to the vertical shift register 113c.

Figure 23:
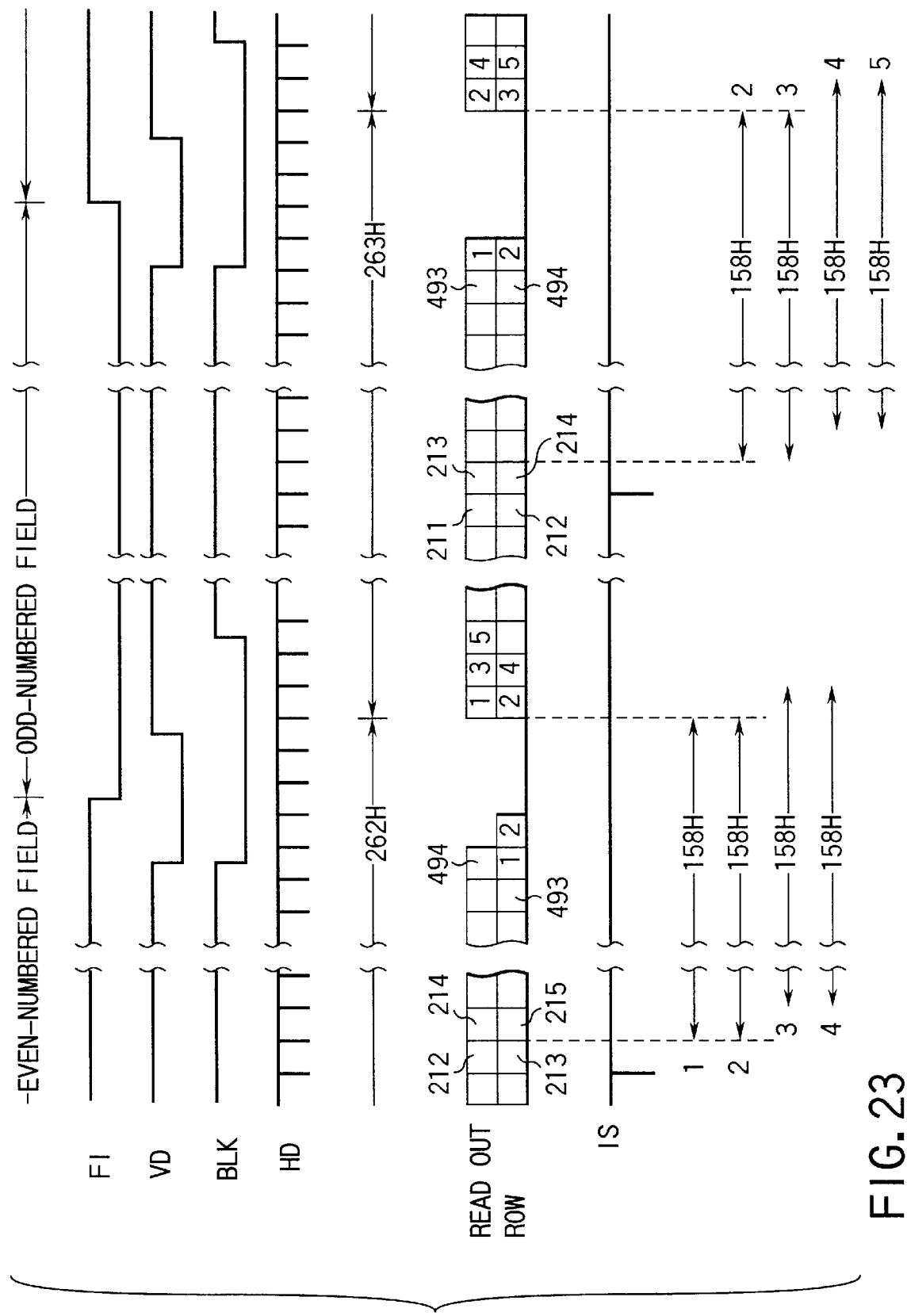
FIG. 23 is a timing chart for a second example of the operation of the fifth embodiment.

Next, a second example of operation of the fifth embodiment will be described by reference to the timing chart of FIG. 23.

In the second example of operation, when interlace scanning is effected, the storage period for each row is made equal and the degradation of picture quality from the flicker of a fluorescent lamp is alleviated. To suppress the effect of the flicker of a fluorescent lamp, the storage period is so set that it corresponds to the period of the flicker. The overall configuration and basic operation are the same as those in the first example of operation explained above.

While in the first example of operation, the occurrence time of the initialization start signal IS is so set that each storage period is equal to 261 horizontal periods, in the second example, however, the occurrence time of the initialization start signal IS is so set that each storage period is equal to 158 horizontal periods (158H), thereby suppressing the effect of the flicker of a 100-Hz fluorescent lamp. Since (60/100) is almost equal to (158/262.5), the storage period is made equal to 158 horizontal periods, which enables the flicker of a 100-Hz fluorescent lamp to be decreased.

The frequency of the flicker may be different from, 100 Hz. According to the frequency of the flicker, the storage period, or the occurrence time of the initial start signal IS, may be changed suitably.

Next, a third example of operation of the fifth embodiment will be described by reference to the timing chart of FIG. 24.

In the third example of operation, when progressive scanning is effected, the storage period for each row is made equal and the degradation of picture quality from the flicker of a fluorescent lamp is alleviated. To suppress the effect of the flicker of a fluorescent lamp, the storage period is so set that it corresponds to the period of flicker. The overall configuration and basic operation are the same as those in the first example of operation explained above.

Figure 24:
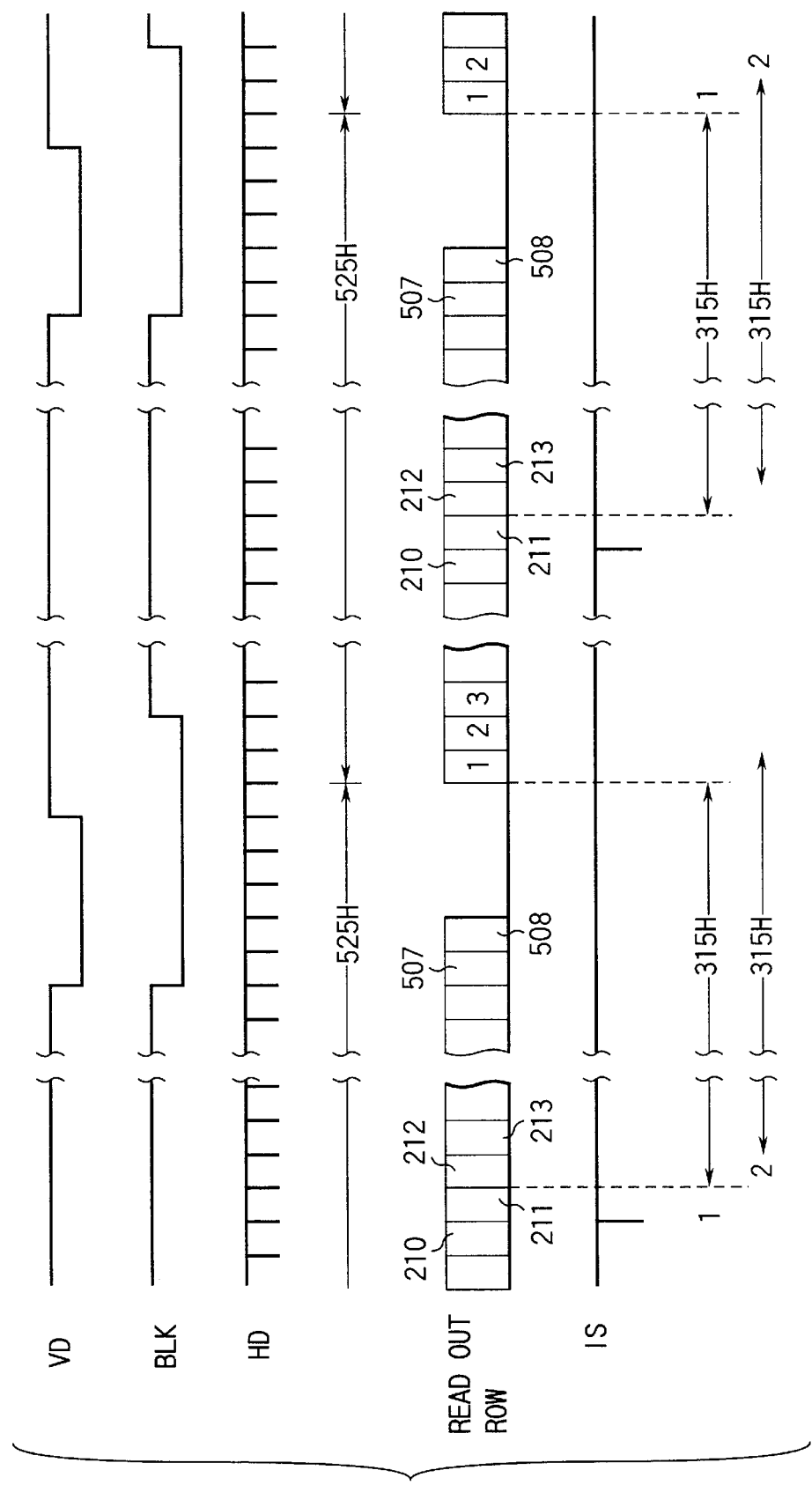
FIG. 24 is a timing chart for a third example of the operation of the fifth embodiment.
Figure 25:
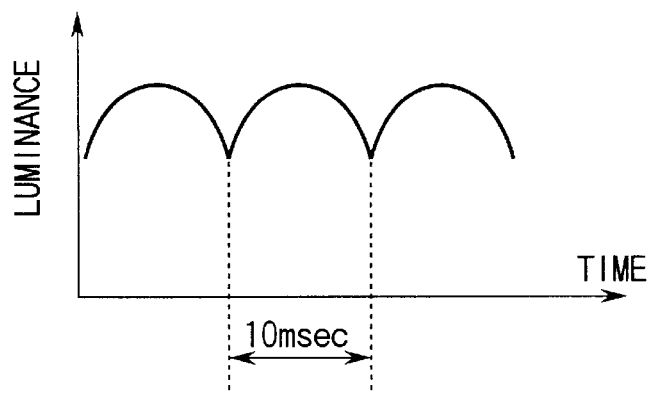
FIG. 25 shows the flickering period of a conventional fluorescent lamp that attributes to the occurrence of a flicker.

Since the third example is based on progressive scanning, one frame contains 525 horizontal periods as shown in FIG. 24. In each horizontal period, the image signal is read line by line. The occurrence time of an initialization start signal IS is so set that, of the 525 horizontal periods in one frame, 315 horizontal periods are assigned to the storage period, thereby suppressing the effect of the flicker of a 100-Hz fluorescent lamp. Since (315/525) is almost equal to (60/100), the storage period is made equal to 315 horizontal periods, which enables the flicker of a 100-Hz fluorescent lamp to be decreased.

The frequency of the flicker may be different from, 100 Hz. According to the frequency of the flicker, the storage period, or the occurrence time of the initial start signal IS, may be changed suitably.

Typical ones of the interlace scanning system are the NTSC/PAL system and the DV system and a typical progressive scanning system is the ATV system. The present invention is applicable to those systems.

With the fifth embodiment, the initialization of each photoelectric conversion section before a read operation prevents the picture quality from deteriorating due to the non-uniformity of the storage periods or due to a flicker.

In an imaging device which comprises photoelectric conversion sections that are arranged in the directions of row and column two-dimensionally and generate charge corresponding to the amount of incident light and vertical signal lines that are provided so as to correspond to the photoelectric conversion sections arranged in the direction of column and receive the read-out electric signals corresponding to the signal charge stored in the individual photoelectric conversion sections, the reading of the electric signal corresponding to the signal charge onto the vertical signal lines being effected by interlace scanning, the fifth embodiment is characterized by initializing each photoelectric conversion section before the read operation and performing control so that the time from the initializing operation to the read operation may be constant for each row.

With the fifth embodiment, each photoelectric conversion section is initialized before a read operation, thereby equalizing the time from the initializing operation to the read operation for the individual rows. As a result, the storage time of the signal charge in each photoelectric conversion section is equal between different fields (an even-numbered field and an odd-numbered field) and between different rows (an even-numbered row and an odd-numbered row), preventing the picture quality from deteriorating due to the non-uniformity of the storage periods.

In an imaging device which comprises photoelectric conversion sections that are arranged in the directions of row and column two-dimensionally and generate charge corresponding to the amount of incident light and vertical signal lines that are provided so as to correspond to the photoelectric conversion sections arranged in the direction of column and receive the read-out electric signals corresponding to the signal charge stored in the individual photoelectric conversion sections, the fifth embodiment is characterized by initializing each photoelectric conversion section before the read operation and performing control so that the time from the initializing operation to the read operation may correspond to the period of the flicker of ambient light.

With the fifth embodiment, each photoelectric conversion section is initialized before a read operation, thereby causing the time from the initializing operation to the read operation to correspond to the period of the flicker of ambient light. As a result, the effect of a flicker on each storage period is equalized, which prevents the picture quality from deteriorating due to the period of a flicker different from the vertical scanning period (the period of one frame or one field).

Sixth Embodiment

In the fifth embodiment, the initialization of each photoelectric conversion section before a read operation prevents the picture quality from deteriorating due to the non-uniformity of the storage periods or due to a flicker. A sixth embodiment of the present invention makes flicker correction on another principle. First, the principle of a flicker will be explained.

Figure 26:
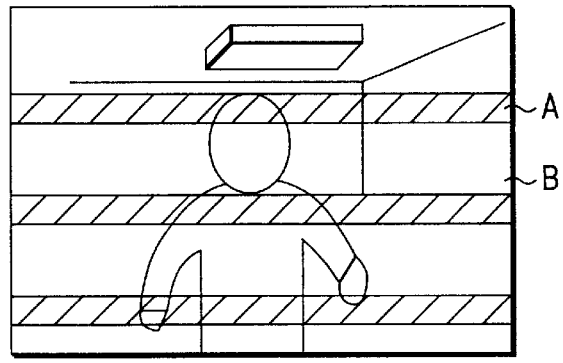
FIG. 26 shows a picture picked up under a fluorescent lamp by a conventional CMOS image sensor.

When a CMOS image sensor is operated under the illumination of a fluorescent lamp, light and dark lateral-stripe flickers occur because the CMOS image sensor differs from the CCD image sensor in terms of operation. It is known that the light-emitting intensity of a fluorescent lamp varies in the period twice the frequency of the power supply. Consequently, the period of flickering is 100 Hz in a 50-Hz power supply area and 120 Hz in a 60-Hz power supply area. When a MOS image sensor is operated at a frame rate of 30 frames/second (that is, a vertical frequency of 30 Hz) under such a fluorescent lamp, light and dark lateral stripes (what is called, flicker) occur as shown in FIG. 26. In FIG. 26, area A indicates darkness and area B indicates lightness.

Figure 27:
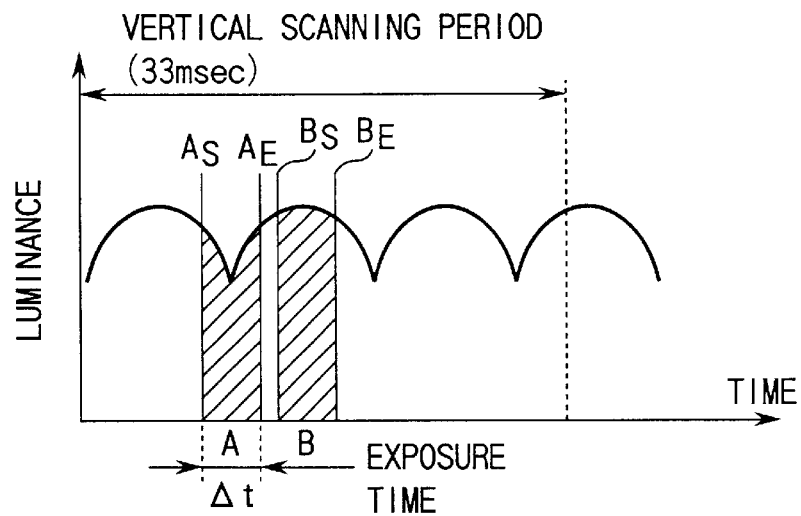
FIG. 27 is a diagram to help explain the cause of the occurrence of a flicker in a conventional CMOS image sensor.

The mechanism of the generation of lightness and darkness will be explained using the diagram of FIG. 27. The vertical scanning period (33 msec) in FIG. 27 is the time required to read the unit cells from the top row to the bottom row. The signal read (start) time in area A in FIG. 26 is $A_E$, and the signal read (start) time in area B is $B_E$. In this case, if an exposure time of $\Delta t$ shown in FIG. 27 is set, the exposure start time is $A_S$ in area A and $B_S$ in area B. The shaded areas in FIG. 27 represent the total amount of exposure in area A and area B. It can be seen that the total amount of exposure in area A is smaller than that in area B. When the vertical scanning period is not an integral multiple of the flickering frequency of a fluorescent lamp, light and dark lateral stripes flow in the vertical direction, making the deterioration of picture quality conspicuous.

To cause light and dark lateral stripes to disappear, the signal output level theoretically has only to be adjusted by a variable amplifier in the vertical direction on the screen. Actually, however, the following problem exists and there has been no concrete means that has solved the problem.

(1) Since light and dark lateral stripes generally flow in the vertical direction, the amount of gain adjustment is not constant even in the same place on a horizontal line.

As explained in the fifth embodiment, when the read time for one screen is set at an integral multiple of the flickering frequency of a fluorescent lamp, the positions of light and dark lateral stripes do not flow, which does not necessarily synchronize with the frequency of the power supply. Since a shift in the frequency drifts the positions of light and dark lateral stripes, the positions must be sensed in this case, too.

(2) When the lateral-stripe components a pattern has are mixed with lateral stripes caused by the flicker of a fluorescent lamp, it is difficult to accurately sense the signal level change in only the light and dark lateral stripe portion to be corrected.

When an CMOS image sensor is used under a fluorescent lamp, the flicker of a fluorescent lamp (light and dark lateral stripes) occurs, impairing the picture quality. There is no effective compensating means to overcome this problem.

A sixth embodiment of the present invention will be explained which suppresses the occurrence of light and dark lateral stripes in the vertical direction of an image, thereby improving the picture quality.

Sixth Embodiment

Figure 28:
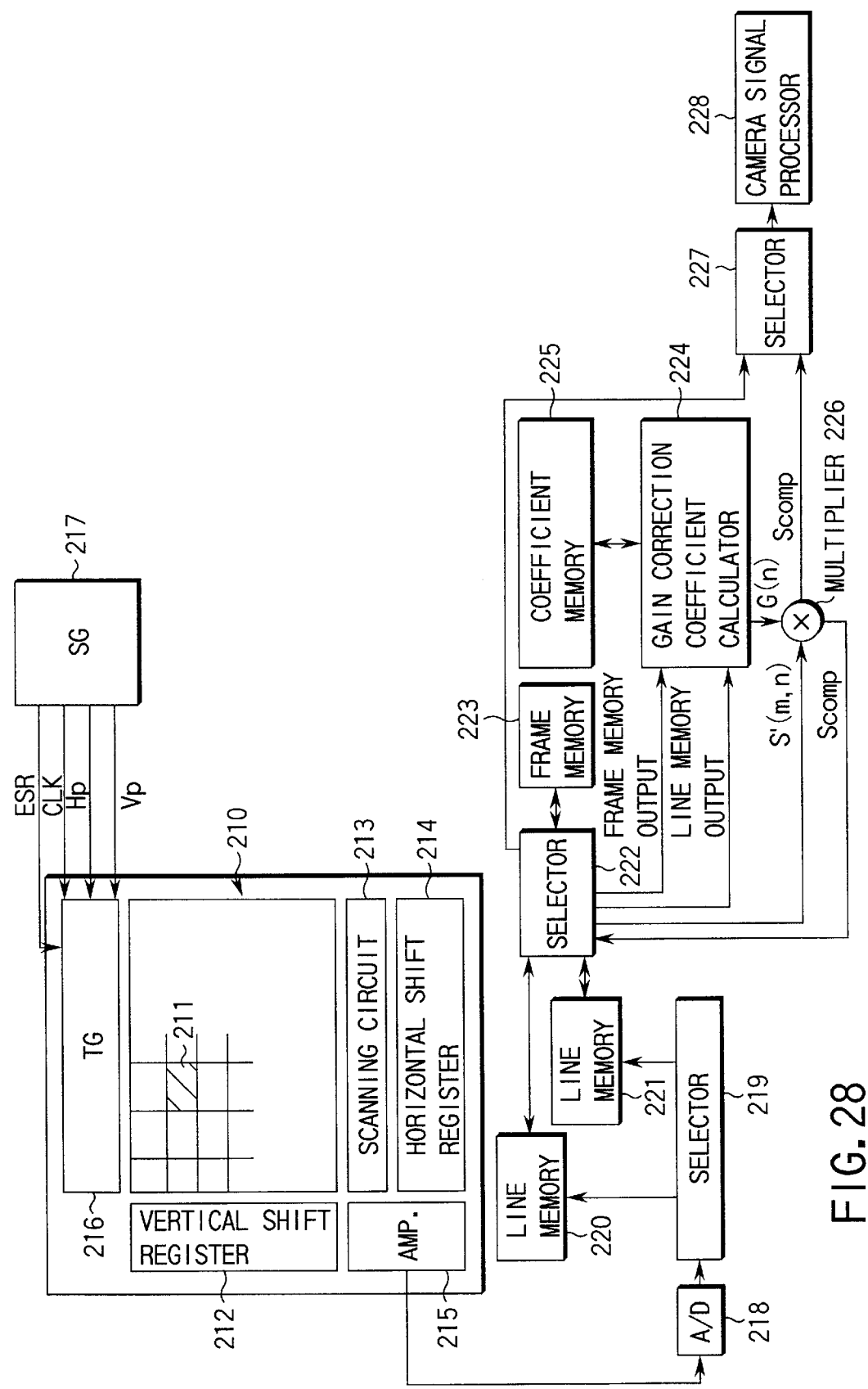
FIG. 28 is a block diagram showing a schematic configuration of a CMOS image sensor according to a sixth embodiment of the present invention.

FIG. 28 is a block diagram showing a schematic configuration of a CMOS image sensor according to the sixth embodiment of the present invention.

An image sensor section 210 is composed of unit cells 211 arranged in the directions of row and column. Each unit cell has the same configuration as that of the unit cell in the fifth embodiment of FIG. 20. A vertical shift register 212 is connected to the image sensor section 210. The vertical shift register 212 sequentially selects the unit cell 211 (horizontal line) groups arranged in the direction of column and controls the transfer of the electric signal from the selected unit cell 211 to a vertical signal line explained later. Cells with two pixels/unit in the fourth embodiment of FIG. 15 may be used as the unit cells.

A scanning circuit 213 for sample-holding the image signals of the unit cell 211 group selected by the vertical shift register 212 is connected to the image sensor section 210. There is provided a horizontal shift register 214 for reading the image signals of the unit cells 211 in the horizontal line held by the scanning circuit 213. An amplifier 215 for amplifying an image signal is connected to the horizontal shift register 214.

The vertical shift register 212 and horizontal shift register 214 are driven by the pulse supplied from a timing generator 216. The image sensor section 210, unit cells 211, vertical shift register 212, scanning circuit 213, horizontal shift register 214, amplifier 215, and timing generator 216 are all formed on a single semiconductor substrate.

A system generator 217 supplies a clock CLK, a horizontal read reference pulse HP, a vertical read reference pulse VP, and an electronic shutter pulse ESR to the timing generator 216.

The electronic shutter pulse ESR is a pulse to set the exposure time for each unit cell 211 so as to prevent the signal from a pixel from being saturated when light striking the image sensor section 210 is strong. A value common to each pixel in one frame is set as the exposure time.

An A/D converter 218 for converting the analog signal amplified by the amplifier 215 into a digital signal is connected to the amplifier 215. A first line memory 220 and a second line memory 221 are connected to the A/D converter 218 via a first selector 219. A frame memory 223, a gain correction factor calculator 224, a multiplier 226, and a third selector 227 are connected to the first and second line memories 220, 221 via a second selector 222. A factor memory 225 is connected to the gain correction factor calculator 224. A camera signal processor 228 is connected to the third selector 227.

The unit cell 211 has the same structure as that shown in FIG. 20.

A read operation will be explained briefly. Light gathered by a lens (not shown) is incident on the photodiodes 121 (see FIG. 20), which photoelectrically convert the light into electron charge (or hole charge) according to the amount of light incident. When a read pulse φREAD is applied to a transfer gate 122, the electron charge Q stored for a determined storage time (shutter time) is read out to the sense node 126 via the transfer gate 122 and converted into a voltage signal Vsig by a parasitic capacitance of C at the sense node 126. An address select pulse φADDR is applied to the address line 129, thereby turning on the address transistor 124, which allows the signal vsig to be read onto the vertical signal line 127. The signal charge is stored during one frame period and the reading of the signal is done in the horizontal blanking period. The potential of the sense node 126 is reset to an external voltage of VDD by the reset transistor 125 before or after the reading to generate a specific reference voltage.

Figure 29:
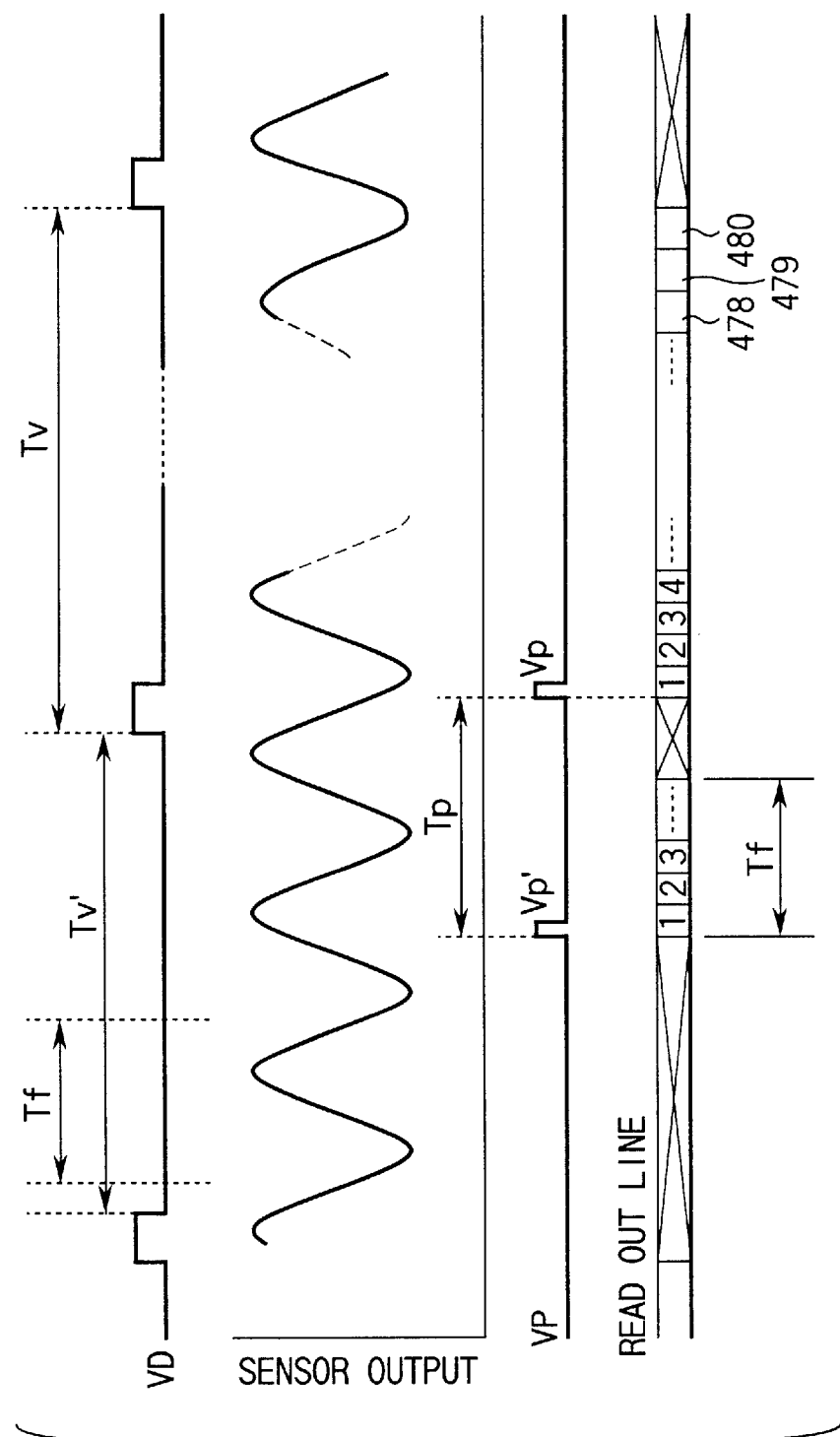
FIG. 29 is a timing chart to help explain the principle of the sixth embodiment.

Before explaining the operation of the sixth embodiment in detail, the principle of the signal processing method of the sixth embodiment will be described by reference to FIG. 29. FIG. 29 shows the timing for the reading of the CMOS image sensor according to the sixth embodiment.

In FIG. 29, VD indicates a vertical synchronizing signal and its period is represented by $T_V$. In addition, VP indicates a vertical read reference pulse for the sensor. In a normal read operation, the reference pulse is so set that it is active within the vertical synchronizing period VD.

In the sensor output under the illumination of a fluorescent lamp, there appears a sinusoidal fluctuation in the amplitude as shown in the FIG. 29. If the frequency of the flicker of a fluorescent lamp is $T_f$, this gives $T_f=10$ ms with a 50-Hz power supply and $T_f=$about 8.3 ms with a 60-Hz power supply.

The sixth embodiment is characterized by providing a vertical synchronizing period $T_V$, that allows a comparison vertical read reference pulse Vp' whose position has been shifted to be generated during an adjacent regular vertical read reference pulse Vp and starts the reading of the sensor. The timing for generating the comparison vertical read reference pulse Vp' is so determined that the next regular vertical read reference pulse Vp and the period Tp substantially meet the following equation:

$$Tp=(2N+1)\times Tf/2 \tag{1}$$

where N is an integer.

FIG. 29 shows a comparison vertical read reference pulse Vp' for N=1. The sensor read line starts at the comparison vertical read reference pulse Vp', counting up 1, 2, 3, ... The reading time of the output Xi of the i-th line read at the comparison vertical read reference pulse Vp' is shifted time Tp from that of the output Yi of the i-th line read at the regular vertical read reference pulse Vp. As a result, the output Xi and output Yi have the same absolute value but differ in sign.

Therefore, when Zi=(Yi+Xi)/2 is calculated, the value of change in the sensor output due to a change in the illuminance of a fluorescent lamp is offset, which provides the net subject signal when the subject remains stationary.

Next, concrete calculations will be explained below. The signal level $S_{real}(m,n)$ of the pixel in the m-th place in the horizontal direction and the n-th place in the vertical direction under stationary illumination is determined as follows:

$$S_{real}(m,n) = \int_{t+\Delta t}^{t} P\,dt$$
$$= P\Delta t$$

Since P is a constant independent of time, $$S_{real}(m,n) = P\int_{t+\Delta t}^{t} P\,dt \tag{2}$$
$$= P\Delta t$$

where $\Delta t$ is the shutter time and P is the amount of energy (constant) given to a pixel (m,n) by the subject every unit hour.

The signal level received by a pixel when a sinusoidal vertical illuminance change is given will be explained. When there is a sinusoidal illuminance change, since the energy of light is proportional to the square of the amplitude of light, the signal given by the subject to a pixel at time t is:

$$P\cdot\sin^2(2\pi t/Tf) \tag{3}$$

Accordingly, the sensor output signal S(m,n) outputted from the pixel (m,n) in a state where a sinusoidal illuminance exists is as follows:

$$S(m,n) = \int_{t_n-\Delta t}^{t_n} P\cdot\sin^2\frac{2\pi}{T_f}t\,dt \tag{4}$$

-continued $$= P\left[t - \frac{T_f}{2\pi}\sin\frac{2\pi}{T_f}t\right]_{t_n-\Delta t}^{t_n}$$

$$= P\left\{\Delta t - \frac{T_f}{2\pi}\sin\frac{2\pi}{T_f}t_n + \frac{T_f}{2\pi}\sin\frac{2\pi}{T_f}(t_n - \Delta t)\right\}$$

$$= P\left\{\Delta t - \frac{T_f}{\pi}\sin\frac{\pi}{T_f}\Delta t \cdot \cos\frac{2\pi}{T_f}\left(t_n - \frac{\Delta t}{2}\right)\right\}$$

$$= S_{real}(m, n) - P\frac{T_f}{\pi}\sin\frac{\pi}{T_f}\Delta t \cdot \cos\frac{2\pi}{T_f}\left(t_n - \frac{\Delta t}{2}\right)$$

Since the pixels in the horizontal direction are read out from simultaneously, there is no effect of changes in the illuminance caused by the fluorescent lamp.

The comparison sensor output signal T(m,n) outputted from the pixel (m,n) at time $t'_n$ shifted $(2N+1)T_f/2$ (=tp) from time $t_n$ is as follows:

$$T(m, n) = \int_{t'_n-\Delta t}^{t'_n} P \cdot \sin^2\frac{2\pi}{T_f}t\, dt$$

$$= S_{real}(m, n) - P\frac{T_f}{\pi}\sin\frac{\pi}{T_f}\Delta t \cdot \cos\frac{2\pi}{T_f}\left(t'_n - \frac{\Delta t}{2}\right)$$

Since $$t'_n = t_n - \frac{2N+1}{2}T_f, \quad (5)$$

$$T(m, n) = S_{real}(m, n) -$$

$$P\frac{T_f}{\pi}\sin\frac{\pi}{T_f}\Delta t \cdot \cos\frac{2\pi}{T_f}\left(t_n - \frac{2N+1}{2}T_f - \frac{\Delta t}{2}\right)$$

$$= S_{real}(m, n) + P\frac{T_f}{\pi}\sin\frac{\pi}{T_f}\Delta t \cdot \cos\frac{2\pi}{T_f}\left(t_n - \frac{\Delta t}{2}\right)$$

Then, the arithmetic means $S_A$ of S(m,n) and T(m,n) is given by:

$$S_A(m,n)=(S(m,n)+t(m,n))/2=S_{real}(m,n) \quad (6)$$

Therefore, it is seen that calculating the arithmetic means $S_A$ of S(m,n) and T(m,n) gives a signal $S_{real}(m,n)$ which is not affected by changes in the illuminance caused by the fluorescent lamp.

From equation (6), it seems that taking the average gives a signal without changes in the illuminance. When the subject is moving, however, the signal level varies even with the same pixel, causing a blur problem. In addition, the average value is calculated during only the time Tf for one period of a change in the illuminance.

To overcome this problem, a gain correction factor obtained by taking the average for each horizontal line during the time Tf equivalent to one period of a change in the illuminance is calculated and the gain for each horizontal line is corrected in every an illuminance change period.

The gain correction factor G(n) for the n-th line is defined as:

$$G(n) = \frac{1}{m_e} \times \sum_{m=1}^{m_e} SA(m, n)/S(m, n) \quad (7)$$

where $m_e$ is the number of pixels in the horizontal direction. Then, the following equation is calculated to determine a correction output $S_{comp}(m,n)$:

$$S_{comp}(m,n)=S(m,n)\cdot G(n) \quad (8)$$

When S(m,n) and T(m,n) are independent of m and constant, this gives:

$$G(n)=S_A(m,n)/S(m,n) \quad (9)$$

Then, $$S_{comp}(n)=S_A(m,n) \quad (10)$$

Figure 30:
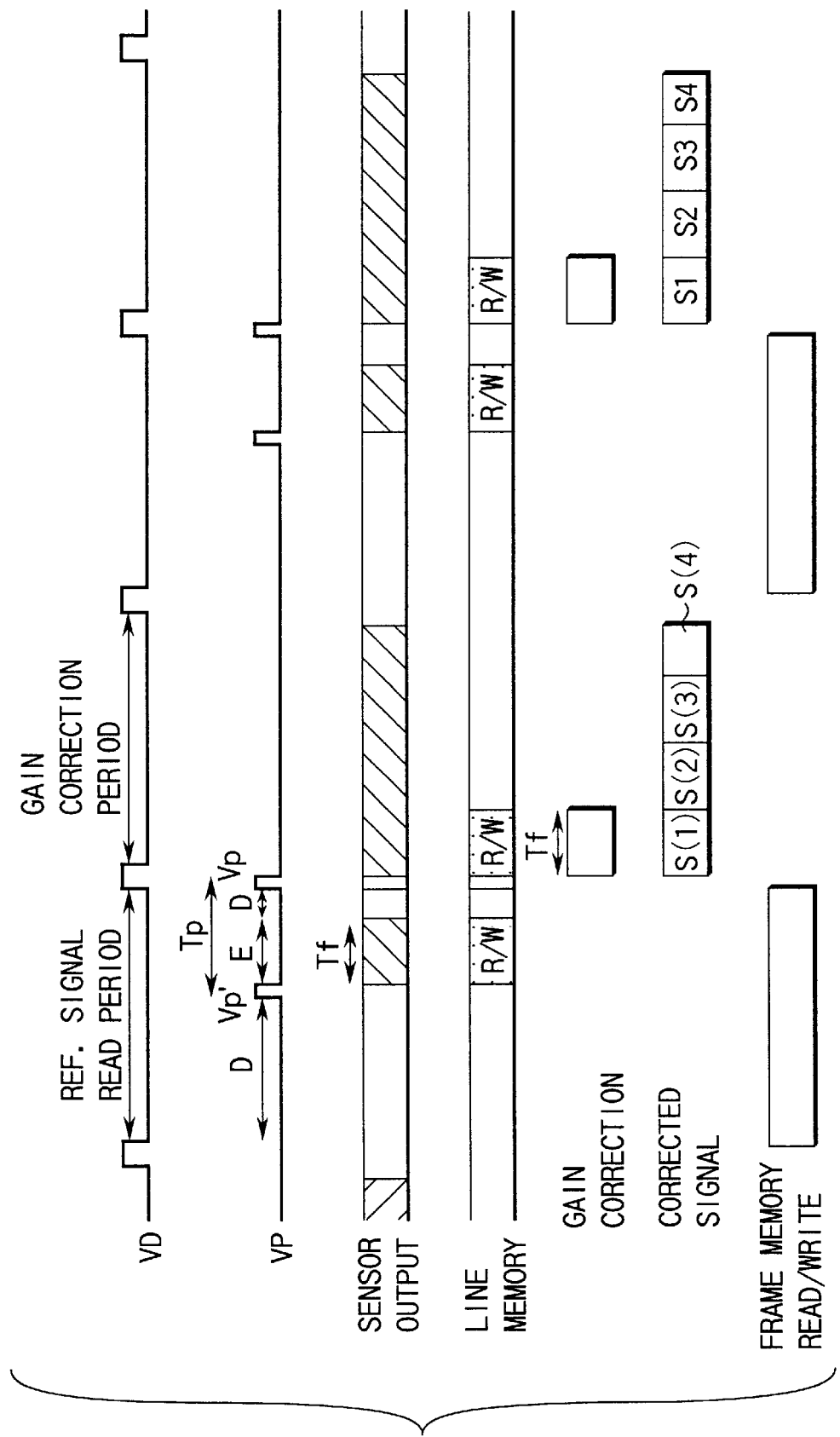
FIG. 30 is a timing chart to help explain a flicker correction operation of the CMOS image sensor according to the sixth embodiment.
Figure 31:
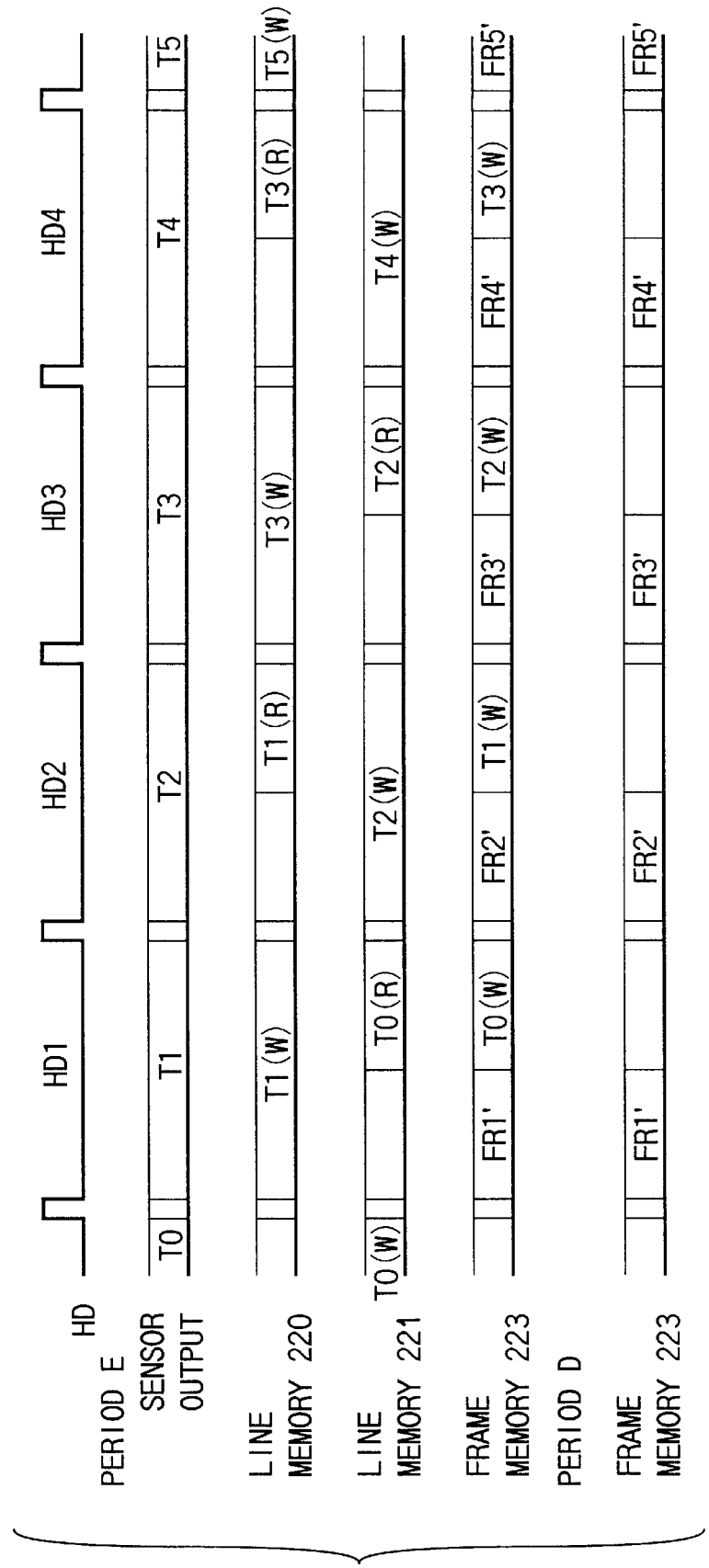
FIG. 31 is a timing chart to help explain the flicker correction operation of the CMOS image sensor according to the sixth embodiment.
Figure 32:
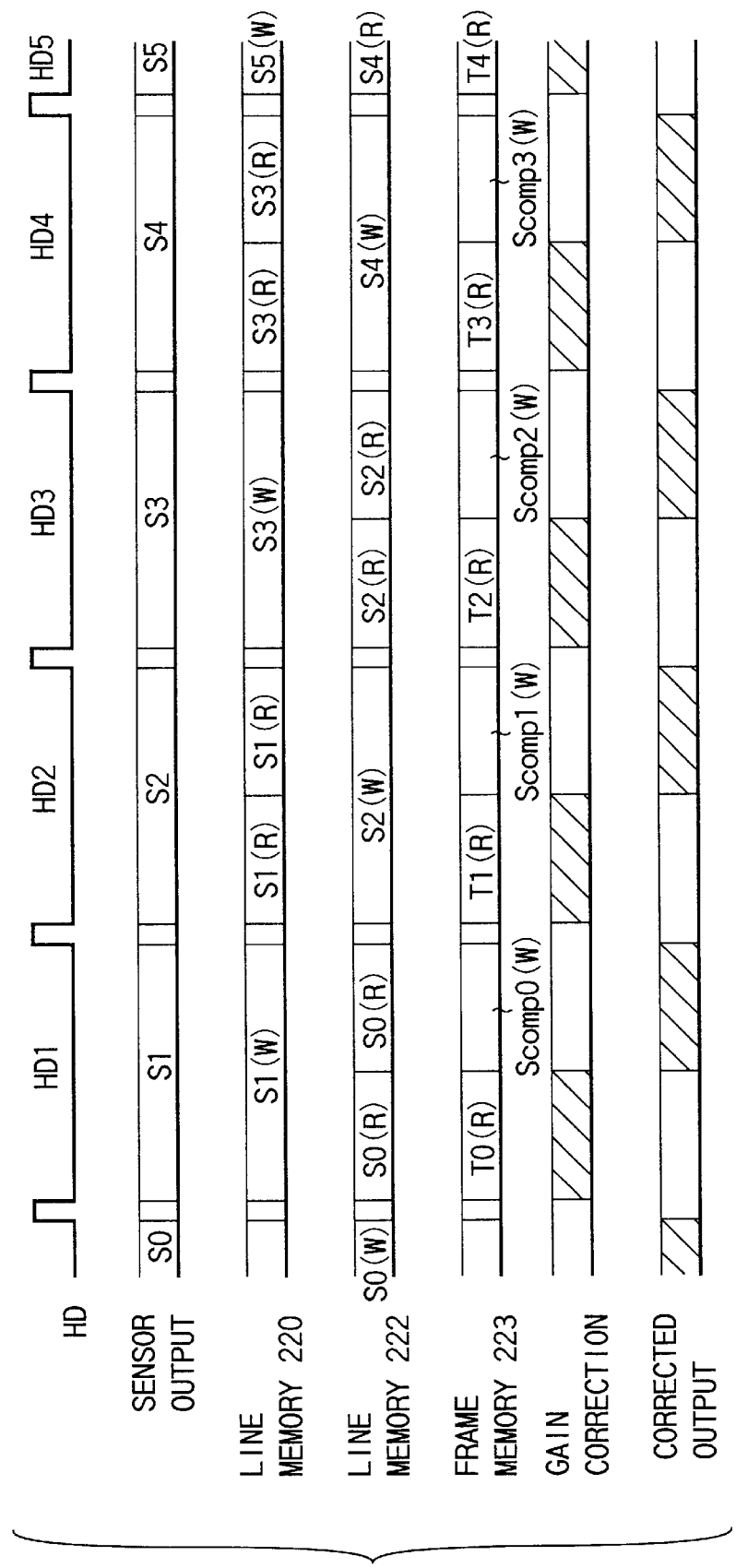
FIG. 32 is a timing chart to help explain the flicker correction operation of the CMOS image sensor according to the sixth embodiment.

Next, the operation of the image sensor of the sixth embodiment will be explained by reference to FIGS. 30 to 32. FIG. 30 is a timing chart in units of vertical scanning, and FIGS. 31 and 32 are timing charts in units of horizontal scanning. Specifically, FIG. 31 is a timing chart in units of horizontal scanning period HD in a vertical scanning period VD in which the aforementioned comparison sensor output signal T is read by the comparison vertical read reference pulse Vp' ahead of the regular vertical read reference pulse Vp. FIG. 32 is a timing chart in units of horizontal scanning period HD in a vertical scanning period VD in which the sensor output signal S is read by the regular vertical read reference pulse Vp.

In the explanation below, in the comparison sensor output signals T(m,n), the signals from all the unit cells in the n-the line are generally called comparison sensor output signals $T_n$. In the aforementioned sensor output signals S'(m,n), the signals from all the unit cells in the n-th line are generally called S' n. The aforementioned signal $S_A$(m,n) is indicated by $S_{comp}$(m,n) and the corrected signals of all the pixels in the n-th line are generally called $S_{comp}$n.

In the timing charts of FIGS. 30, 31, and 32, the writing and reading of signal $S_x$ into and from the first and second line memories 220, 221, or frame memory 223 are represented by $S_x$(W) and $S_x$(R).

First, the system generator 217 generates a comparison vertical read reference pulse $V_{p'}$ time Tp earlier than the regular read time and starts the reading of the comparison sensor output signal T. The comparison sensor output signal T from the image sensor section 210 is converted into a digital signal sequentially. Then, the digitized comparison sensor output signal T is supplied alternately via the first selector 219 to the first line memory 220 and second line memory 221, thereby recording one horizontal scan of signals into the first line memory 220 and second line memory 221 alternately. In the timing chart of FIG. 30, the part indicated by section E corresponds to the period for the reading (R)/writing (W) of the input/output of the comparison sensor output signal T into/from the first and second line memories 220, 221.

In FIG. 31, section E of FIG. 30 is represented in units of horizontal synchronizing. Using the timing chart of FIG. 31, the taking in of the comparison sensor output signal T will be explained in further detail. First, in the horizontal synchronizing period $HD_1$ of the horizontal synchronizing signal HD, the first selector 219 connects the A/D converter 218 to the first line memory 220, thereby writing the A/D converted comparison sensor output signal T(m,l) into the first line memory 220 sequentially. This causes the comparison sensor output signals $T_1$ from the pixel sensors in the first line to be written into the first line memory 220.

Furthermore, in the second half of the horizontal synchronizing period $HD_1$, the second selector 222 connects the second line memory 221 to the frame memory 223, thereby writing the comparison sensor output $T_0$ written in the second line memory 221 into the frame memory 223.

In the horizontal synchronizing period $HD_2$ of the next horizontal synchronizing signal HD, the first selector 219 connects the A/D converter 218 to the second line memory 221, thereby writing the comparison sensor output signal $T_2$ in the second line into the second line memory 221 as is the comparison sensor output signal $T_1$.

Furthermore, in the second half of the horizontal synchronizing period $HD_2$, the second selector 222 connects the first line memory 220 to the frame memory 223, thereby writing the comparison sensor output $T_1$ written in the first line memory 220 into the frame memory 223.

Specifically, in the horizontal scanning period $HD_n$, the first selector 219 connects the first line memory 220 to the A/D converter 218 when n is an odd number, and the second line memory 221 to the A/D converter 218 when n is an even number, thereby writing the digitized comparison sensor output signal $T_n$ into the first line memory 220 (odd-numbered line) or the second line memory 221 (even-numbered line). In parallel with the writing of the comparison sensor output signal $T_n$ into the first line memory 220 or the second line memory 221, the second selector 222 connects the second line memory 221 to the frame memory 223 when n is an odd number, and the first line memory 220 to the frame memory 223 when u is an even number, thereby writing the comparison sensor output signal $T_{n-1}$ written in the first line memory 220 or second line memory 221 into the frame memory 223.

Then, similar operations are carried out sequentially, thereby writing the comparison sensor outputs $T_n$ in the first to $N_f$-th lines into the frame memory 223. Here, $N_f$ is the number of lines in the vertical direction read out from during the flickering period $T_f$.

Thereafter, the operation goes into a vertical synchronizing period in which output gain correction is effected at the next regular vertical read reference pulse $V_p$. The operation in a vertical synchronizing period in which output gain correction is effected will be described by reference to FIG. 32. In the output correction period of FIG. 30, the individual flickering periods Tf are indicated by S(1), S(2), S(3), and S(4).

First, in the horizontal synchronizing period $HD_1$, the first selector 219 connects the first line memory 220 to the AID converter 218, thereby writing the A/D converted sensor output signal S(m,l) into the first line memory 220 sequentially. This causes the sensor output signal $S_1$ from the first line into the first line memory 220.

Furthermore, in the first half of the horizontal synchronizing period $HD_1$, the second selector 222 connects the gain correction factor calculator 224 to the frame memory 223 and second line memory 221, thereby transferring the comparison sensor output signal $T_0$ written in the frame memory 223 and the sensor output signal $S_0$ written in the second line memory 221 to the gain correction factor calculator 224, with the horizontal pixel positions being synchronized (the read clock is doubled).

Then, the gain correction factor calculator 224 calculates T(m,0)/S(m,0) from the comparison sensor output signal T(m,0) read with the horizontal pixel position synchronized and the sensor output signal S(m,0). After calculating T(m,0)/S(m,0) for all the horizontal pixel sensors, the calculator 224 calculates the gain correction factor $G_{(0)}$ using equation (7) and stores the calculated gain correction factor $G_{(0)}$ into a factor memory 225.

Next, in the second half of the horizontal synchronizing period $HD_1$, the second selector 222 connects the second line memory 221 to the gain correction factor calculator 224, thereby reading the sensor output signal $S_0$ and also the gain correction factor $G_{(0)}$ from the factor memory 225. The multiplier 226 multiplies the sensor output signal S(m,0) by the gain correction factor $G_{(0)}$ to produce a corrected sensor output signal $S_{comp}$(m,0). Then, the multiplier 226 transfers the corrected sensor output signal $S_{comp}$(m,0) sequentially via the third selector 227 to the camera signal processor 228. At the same time, the multiplier 226 writes the corrected sensor output signal $S_{comp}$(m,0) into the frame memory 223 sequentially via the second selector 222.

Then, in the next horizontal synchronizing period $HD_2$, the first selector 219 connects the second line memory 221 to the A/D converter 218, thereby writing the sensor output signal $S_2$ from the second line into the second line memory as the sensor output signal $S_1$ is written.

Furthermore, in the first half of the horizontal synchronizing period $HD_2$, the second selector 222 connects the gain correction factor calculator 224 to the frame memory 223 and first line memory 220, thereby transferring the sensor output signal S(m,l) and the comparison sensor output signal T(m,l) to the gain correction factor calculator 224, with the horizontal pixel positions being synchronized.

Then, the gain correction factor calculator 224 calculates T(m,l)/S(m,l) from the comparison sensor output signal $T_{(m,l)}$ and the sensor output signal $S_{(m,l)}$ of the same pixel. After calculating T(m,l)/S(m,l) for all the horizontal pixels, the calculator 224 calculates the gain correction factor G(1) using equation (7) and stores the calculated gain correction factor G(1) into the factor memory 225.

Furthermore, in the second half of the horizontal synchronizing period $HD_2$, the second selector 222 connects the first line memory 220 to the gain correction factor calculator 224, thereby reading the sensor output signal $S_1$ and also the gain correction factor G(1) from the factor memory 225. The multiplier 226 multiplies the sensor output signal $S_1$ by the gain correction factor G(1) to produce a corrected sensor output signal $S_{comp}$(m,l). Then, the multiplier 226 transfers the corrected sensor output signal $S_{comp}$(m,l) via the third selector 227 to the camera signal processor 228. At the same time, the multiplier 226 writes the corrected sensor output signal $S_{comp}$(m,l) into the frame memory 223 sequentially via the second selector 222.

Then, similar operations are carried out to produce the corrected output signals $S_{comp}$(m,n). Specifically, in the horizontal scanning period $HD_n$, the first selector 219 connects the A/D converter 218 to the first line memory 220 when n is an odd number, and the A/D converter 218 to the second line memory 221 when n is an even number, thereby writing the A/D converted sensor output signals $S_n$ into the first line memory 220 (odd-numbered line) or the second line memory 221 (even-numbered line).

Then, in the first half of the horizontal synchronizing period $HD_n$, the second selector 222 connects the gain correction factor calculator 224 to the frame memory 223 and second line memory 221 when n is an odd number, and the gain correction factor calculator 224 to the frame memory 223 and first line memory 220 when n is an even number, thereby transferring the sensor output signal $S_{n-1}$ and comparison sensor output signal $T_{n-1}$ to the gain correction factor calculator 224, with the horizontal pixel position being synchronized. Then, the gain correction factor calculator 224 calculates a gain correction factor $G_{(n-1)}$, and stores the calculated gain correction factor $G_{(n-1)}$ into the factor memory 225.

Next, in the second half of the horizontal synchronizing period $HD_n$, the second selector 222 connects the second line memory 221 to the gain correction factor calculator 224 when n is an odd number, and the first line memory 220 to the gain correction factor calculator 224 when n is an even number, thereby reading the sensor output signal $S_{n-1}$ and also the gain correction factor $G_{(n-1)}$ from the factor memory 225. The multiplier 226 multiplies the sensor output signal $S_{n-1}$ by the gain correction factor $G_{(n-1)}$ to produce the corrected signal output $S_{comp}n-1$.

Then, the comparison sensor output signal $T_n$ in the frame memory is read for the time Tf of one period of changes in the illuminance, that is, in section S(1) to determine a correction factor $G_{(n)}$.

Thereafter, in sections S(2), S(3), and S(4), the sensor output signal Sn is read at double speed from the first and second line memories 220, 221 in the second half of the horizontal scanning period. At the same time, the corresponding correction factor $G_{(n)}$ is read out from the factor memory 225. Then, the multiplier 226 produces a corrected signal $S_{comp}n$. Then, the obtained gain corrected signal $S_{comp}n$ is transferred to the camera signal processor 228 via the third selector 227 and to the frame memory 223 via the second selector 222.

The gain corrected signal $S_{comp}n$ written in the frame memory 223 is read at $FR_1$, $FR_2$, $FR_3$, and $FR_4$ in the timing for the frame memory of FIG. 32 in the first half of each horizontal synchronizing period HD in section E and section D during the time when the gain correction comparison output is being taken in FIG. 30. This operation enables the gain corrected signal in the preceding vertical synchronizing period to be taken out even in the period for taking in a gain correction comparison output.

In the above operations, the frame memory 233 is written into and read out from at a speed twice the reference data rate. When there is a restriction on the cycle time of the frame memory 223, making the data in two pixels parallel (for example, turning the eight-bit width into a 16-bit width) for access eliminates the need to double the speed.

As explained above, with the CMOS image sensor of the sixth embodiment, use of one frame memory and two line memories enables the sensor output where changes in the illuminance of a fluorescent lamp have been corrected to be taken out in both of the vertical synchronizing period in which a comparison sensor output is obtained before the timing for generating a vertical read reference pulse $V_p$ and the vertical synchronizing period with the regular vertical read reference pulse $V_p$.

Since the line memories can be incorporated easily into an IC, the configuration with a single frame memory is favorable in terms of cost. However, the output appears at a double data rate only in only the first or second half of the horizontal period. In most cases, however, since the camera signal processor has a color separation line memory therein, it is easy to return the data rate to the original value and supply the final image output continuously.

In use for compressing the moving picture of a camera and transferring the compressed moving picture, a frame memory is used as a rate buffer because of restrictions on the transfer rate. The aforementioned frame memory may also be used as a rate buffer.

Seventh Embodiment

Use of two frame memories enables a write operation and a read operation to be carried out simultaneously, which eliminates not only the need for a line memory but also the need to write the signal into and read the signal from the frame memory at double speed. A CMOS image sensor with two frame memories according to a seventh embodiment of the present invention will be explained by reference to FIGS. 33 and 34.

Figure 33:
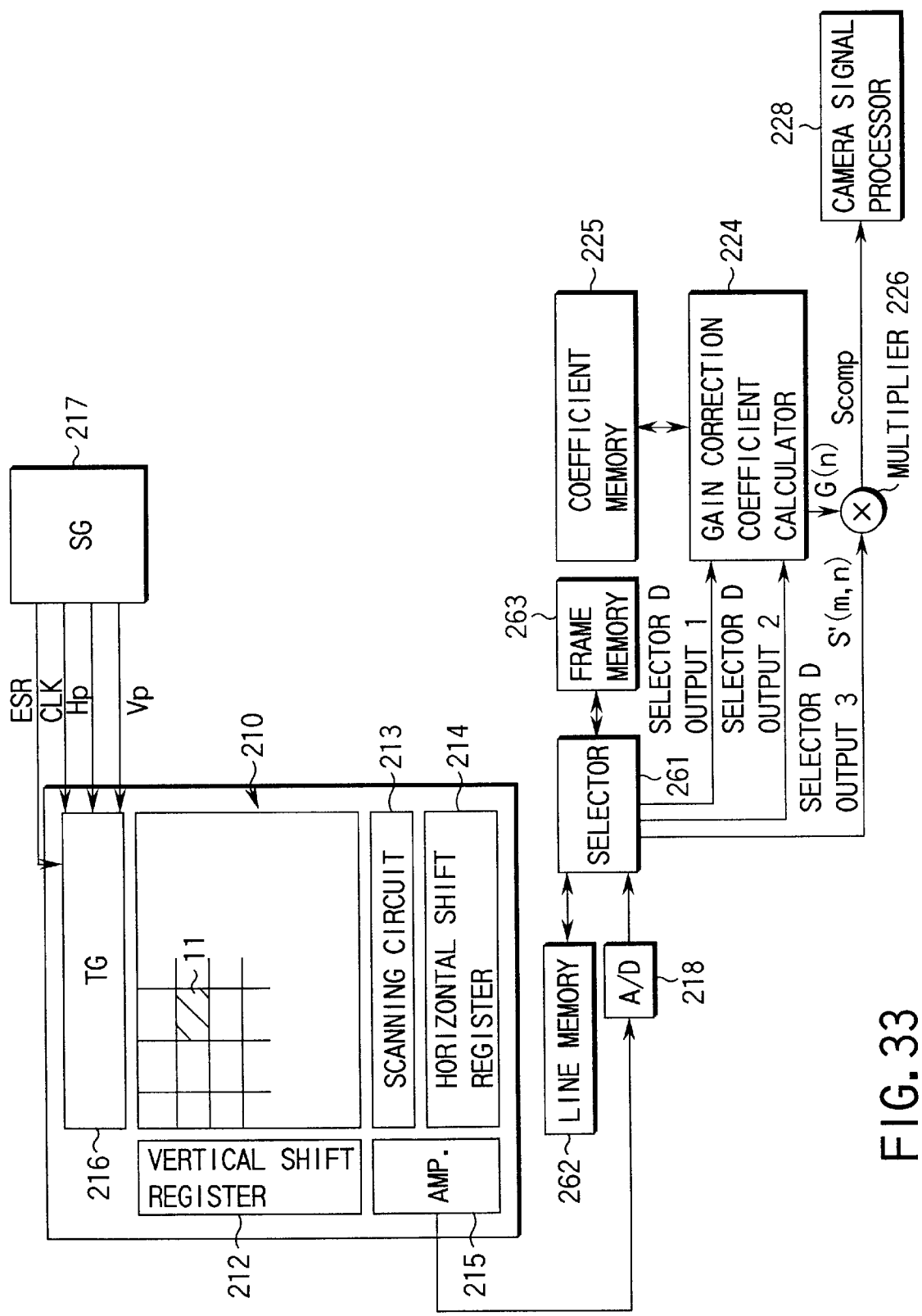
FIG. 33 is a block diagram showing a schematic configuration of a CMOS image sensor according to a seventh embodiment of the present invention.
Figure 34:
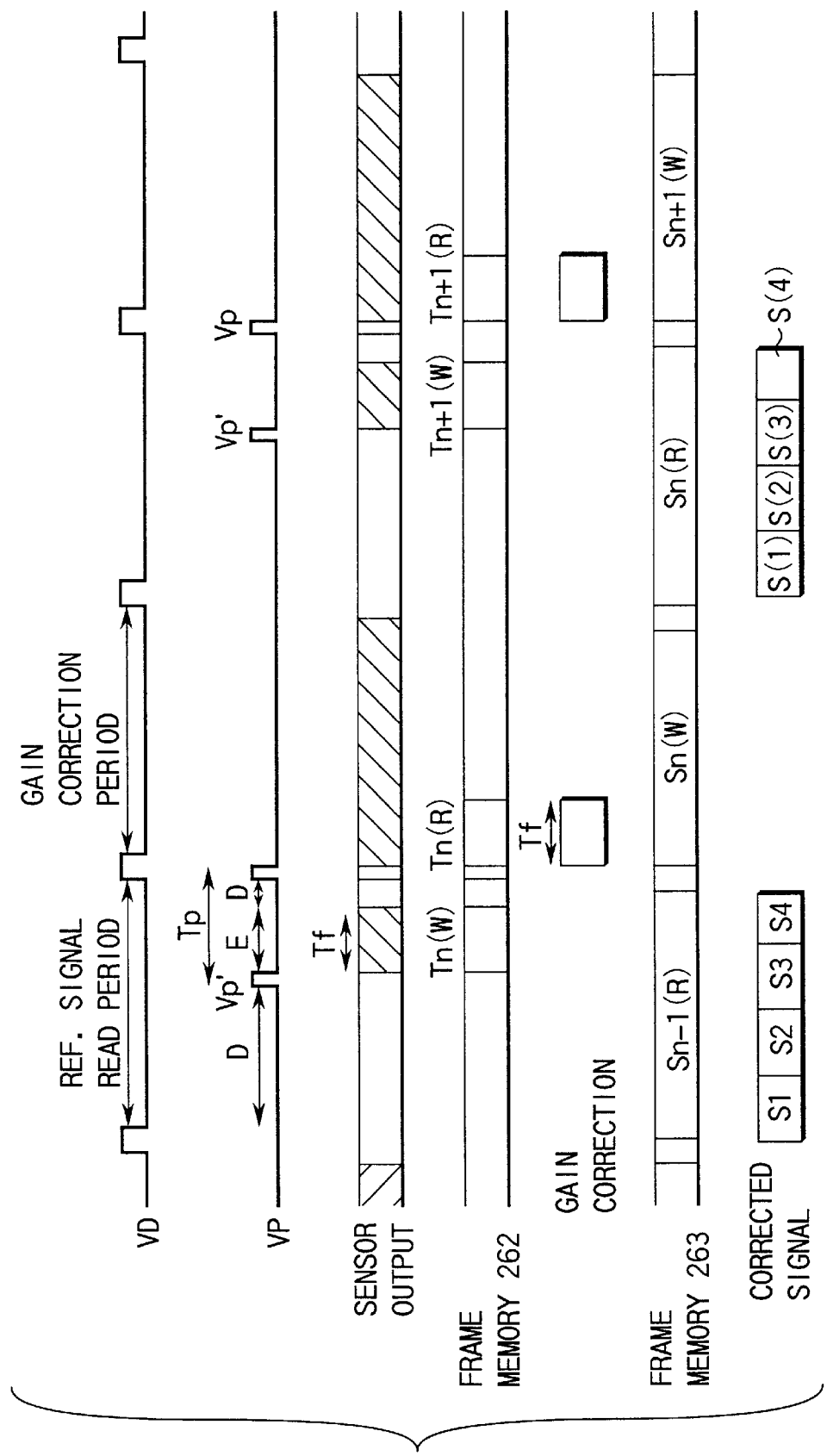
FIG. 34 is a timing chart to help explain the flicker correction operation of the CMOS image sensor according to the seventh embodiment.

FIG. 33 is a block diagram showing a schematic configuration of the CMOS image sensor with two frame memories 262, 263. In FIG. 33, the same parts as those in FIG. 28 are indicated by the same reference symbols and a detailed explanation of them will not be given. FIG. 34 is a timing chart to help explain the operation of the image sensor of FIG. 33.

The A/D converter 281, a first frame memory 262, a second frame memory 263, the gain correction factor calculator 224, and the multiplier 226 are connected to a selector 261. The selector 261 switches the connection of the A/D converter 218 between the first frame memory 262 and the second frame memory 263.

In the timing chart in a vertical synchronizing period shown in FIG. 34, the comparison sensor output $T_n$ from the A/D converter 218 is written into the first frame memory 262 via the selector 261 in a correction sensor output taking-in period. Then, in the output gain correction period, the sensor output signal $S_n$ is written into the second frame memory 263 via the selector 261 and at the same time, transferred to the gain correction factor calculator 224.

In synchronization with the transfer of the sensor output signal $S_n$ to the gain correction factor calculator 224, the first frame memory 262 transfers the corresponding comparison sensor output signal $T_n$ via the selector 261 to the gain correction factor calculator 224, which calculates a gain correction factor $G_{(n)}$ and stores it into the factor memory 255.

In the next gain correction comparison output taking-in period, the sensor output signal $S_n$ written in the second frame memory 263 is transferred to the multiplier 226 via the selector 261. At the same time, the corresponding gain correction factor $G_{(n)}$ is read. Then, the multiplier 226 multiplies the sensor output signal $S_n$ by the gain correction factor $G_{(n)}$ to produce a gain corrected signal Scompn where fluctuations in the output due to the flicker of a fluorescent lamp have been corrected. The obtained gain corrected signal $Scomp_n$ is transferred to the camera signal processor 228.

When the first and second frame memories 262, 263 are provided, the second frame memory 263 is written into and read out from alternately each time a vertical scanning period starts as shown in the timing chart of FIG. 34. Therefore, the gain corrected signal $Scomp_n$ is intermittently outputted at intervals of a vertical scanning period. If frame skipping is supposed to be done to compress moving pictures, such intermittent outputs may be acceptable. To obtain continues outputs, however, it is necessary to use a dual port product as a frame memory or add still another frame memory.

Eighth Embodiment

An embodiment explained below is related to a system not requiring the image output to be supplied every frame, for example, a case where moving pictures are transferred at a low rate of 15 frames/second or less, not 30 frames/second in real time.

Figure 35:
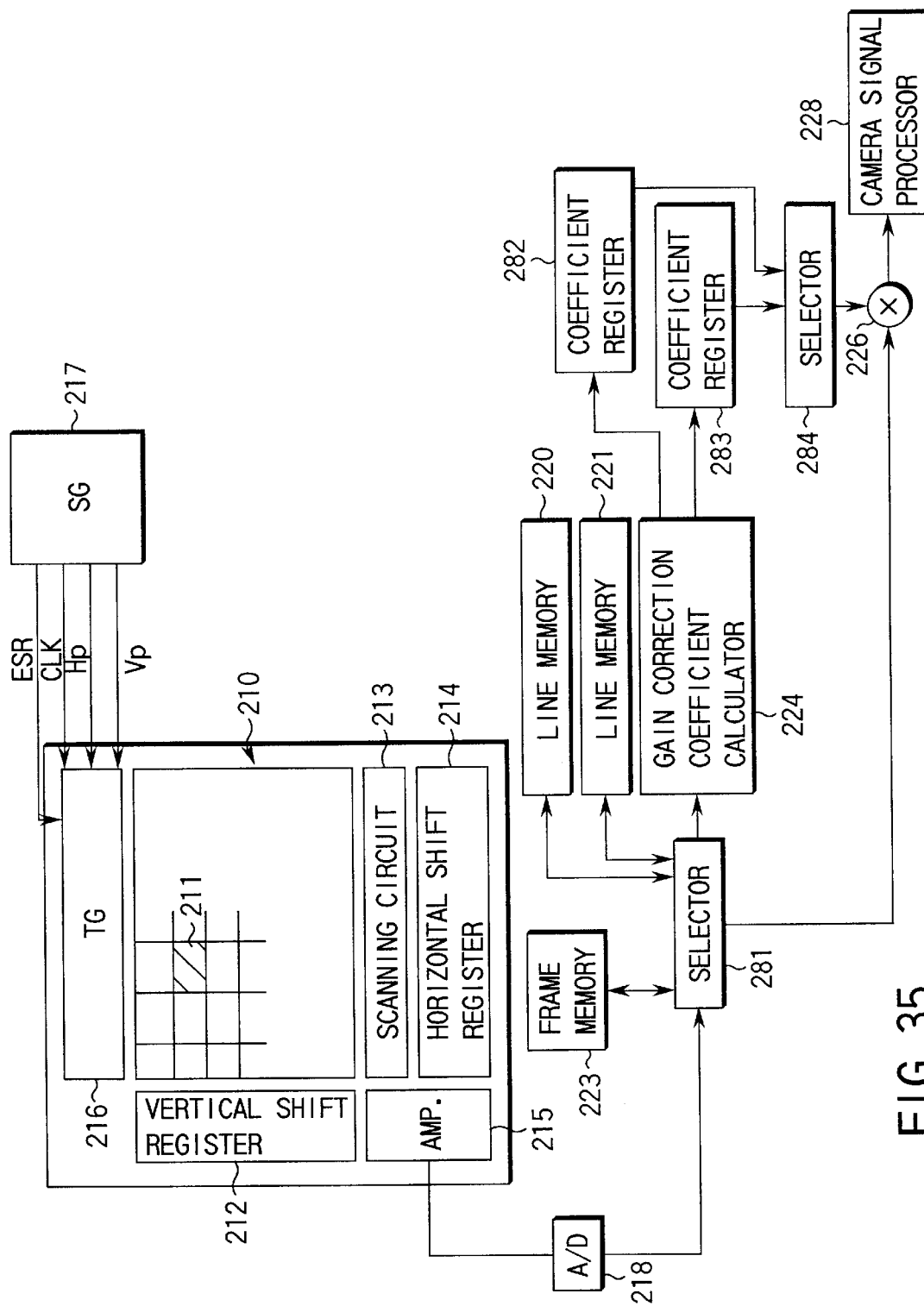
FIG. 35 is a block diagram showing a schematic configuration of a CMOS image sensor according to an eighth embodiment of the present invention.

FIG. 35 is a block diagram of the configuration of the main part of a CMOS image sensor according to an eighth embodiment of the present invention. In FIG. 35, the same parts as those in FIG. 28 are indicated by the same reference symbols and a detailed explanation of them will not be given.

In the operation of the eighth embodiment, the signals from the image sensor section are read in frames in this order: $S_n$, $S_{n+1}$, every other frame. In the interval frame, a comparison sensor output signal T is read and written into the frame memory 223. When the comparison sensor output signal T is read, the signals are read out from all the lines, not from part of the lines as in the preceding embodiment.

Using the timing chart of FIG. 37, the operation of a signal related to the sensor output signal $S_{n+1}$ will be explained. The sensor output signal $S_{n+1}$ is written into the second line memory 221 via the selector 281. At the same time, the gain correction factor calculator 224 calculates a correction factor from the sensor output $S_{n+1}$ and the comparison sensor output $T_2$ of the same pixel read out from the frame memory 223.

When color filters are placed on the surface of unit cells, the gain correction factor must be calculated for each color filter pixel, since different color filters on a horizontal line have different amounts of change of the signal level due to the flicker of a fluorescent lamp, resulting from the nonuniform distribution of the spectral of a fluorescent lamp. To do this, the image sensor of the eighth embodiment calculates the gain correction factor for each color filter pixel and writes the result into a first factor register 282 or a second factor register 283. In the RGB bayer arrangement, a widely used color filter arrangement, there are two types of arrangement in a horizontal line: one is a line where R (red) and G (green) are arranged alternately and the other is a line where G (green) and B (blue) are arranged alternately. Therefore, factor registers have only to be provided for two routes.

Next, the sensor output signal $S_2$ is read out from the second line memory 221. According to the colors of pixels, the selector 284 selects the gain factors written in the first factor register 282 and second factor register 283. Then, the multiplier 226 produces a gain corrected signal.

In the seventh and eighth embodiments, the frequency of the flicker of a fluorescent lamp is not an integral multiple of the vertical synchronizing period. Therefore, in each vertical synchronizing period, the comparison sensor output is taken in with each comparison vertical read reference pulse Vp', before the regular vertical synchronizing period in which the output is taken in from the unit cell. When the frequency of the flicker of a fluorescent lamp is set at an integral multiple of the vertical scanning period (for example, a flickering frequency of 10 ms and a vertical synchronizing period of 30 ms), the comparison sensor output where the vertical read reference pulse $V_p$ position is shifted, for example, once in ten times, has only to be taken in, since slow changes in the light and dark position due to the drift of the frequency are coped with.

Ninth Embodiment

In the seventh and eighth embodiments, the correction process is carried out, provided that the fluorescent lamp flickering frequency $T_f$ is known. Actually, however, the frequency of power supply is 50 Hz in some areas and 60 Hz in other areas. In this connection, a CMOS image sensor with means for sensing the fluorescent lamp flickering frequency $T_f$ automatically according to a ninth embodiment of the present invention will be explained.

First, the principle of sensing the fluorescent lamp flickering frequency $T_f$ automatically will be explained. The regular read output S(m,n) read at time $t_n$ is calculated using equation (4):

$$S(m, n) = S_{real}(m, n) - P \frac{T_f}{\pi} \sin \frac{\pi}{T_f} \Delta t \cdot \cos \frac{2\pi}{T_f} \left( t_n - \frac{\Delta t}{2} \right) \quad (4)$$

The output S"(m,n) at time $(t_n - t_0)$ obtained by advancing the regular read start time $t_n$ by time $t_0$ is given by:

$$S''(m, n) = S_{real}(m, n) - \quad (11)$$

-continued
$$P \frac{T_f}{\pi} \sin \frac{\pi}{T_f} \Delta t \cdot \cos \frac{2\pi}{T_f} \left( t_n - t_0 - \frac{\Delta t}{2} \right)$$

The difference $\Delta S(m,n)$ between S"(m,n) and S'(m,n) is given by:

$$\Delta S(m, n) = S''(m, n) - S(m, n) \quad (12)$$

$$= P \frac{T_f}{\pi} \sin \frac{\pi}{T_f} \Delta t \cdot \times$$

$$\left\{ \cos \frac{2\pi}{T_f} \left( t_n - t_0 - \frac{\Delta t}{2} \right) - \cos \frac{2\pi}{T_f} \left( t_n - \frac{\Delta t}{2} \right) \right\}$$

$$= 2P \frac{T_f}{\pi} \sin \frac{\pi}{T_f} \Delta t \cdot \sin \frac{\pi t_0}{T_f} \cdot \sin \frac{\pi}{T_f} (2t_n - t_0 - \Delta t)$$

The $\Delta S(m,n)$ has the maximum value when $t_0 = (2N+1)T_f/2$. Then, calculations are made for $t_0$(50 Hz)=10 ms (in the case of 50 Hz) and for $t_0$(60 Hz)=8.3 ms (in the case of 60 Hz) in accordance with the following equation.

$$\Delta S_{Ave.} = \frac{1}{N_0 m_e \sum_{n=1}^{N_0} \sum_{m=1}^{m_e} \Delta S(m, n)} \quad (13)$$

Here, $N_f$ is the number of horizontal lines read during the flickering period $T_f$.

Then, $\Delta S_{AVE(50\ Hz)}$ is compared with $\Delta S_{AVE(60\ Hz)}$. For example, if $\Delta S_{AVE(50\ Hz)} > \Delta S_{AVE(60\ Hz)}$ it is determined that the frequency of the power supply is 50 Hz.

Figure 38:
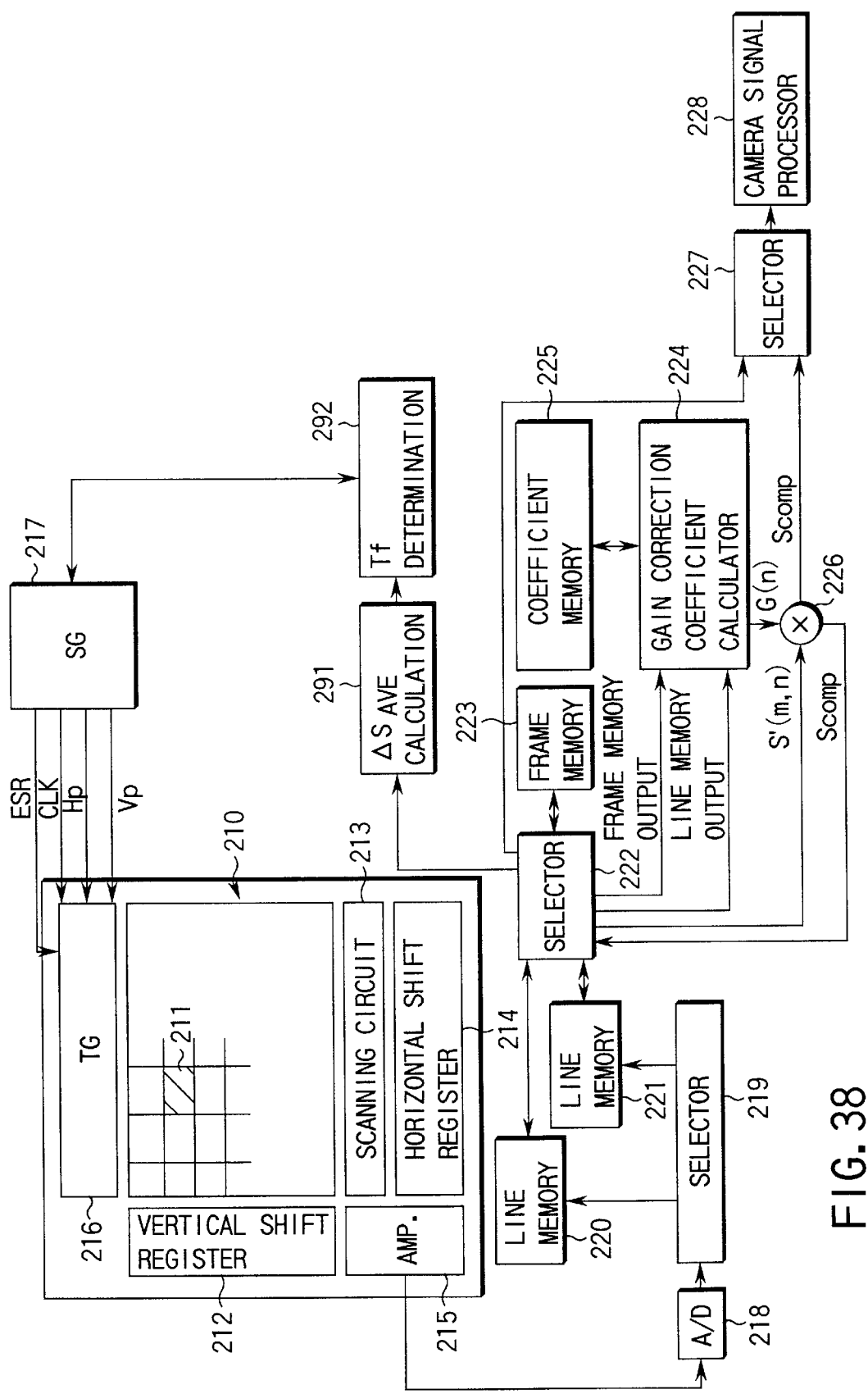
FIG. 38 is a block diagram showing a schematic configuration of a CMOS image sensor according to a ninth embodiment of the present invention.

Next, a device with means for sensing the frequency of the flickering period will be explained. FIG. 38 is a block diagram showing a schematic configuration of a CMOS image sensor according to the ninth embodiment of the present invention. In FIG. 38, the same parts as those in FIG. 28 are indicated by the same reference symbols and a detailed explanation of them will not be given.

The system generator 217 sets the time difference between the comparison pulse $V_{p'}$ and the regular read reference pulse $V_p$ at $t_{0(50\ Hz)}$ and sends the respective signals to the timing generator 216. Then, the comparison sensor output signal S"(m,n) and sensor output signal S(m,n) are transferred to a $\Delta S_{AVE}$ calculating section 291. From the comparison sensor output signal S"(m,n) and sensor output signal S(m,n), the $\Delta S_{AVE}$ calculating section 291 calculates $\Delta S_{AVE(50\ Hz)}$ using equation (13) and sends the result to a $T_f$ determination section 292. Next, the system generator 217 sets the time difference between the comparison pulse $V_{p'}$ and the regular read reference pulse $V_p$ at $t_{0(60\ Hz)}$ and sends the respective signals to the timing generator 216. The $\Delta S_{AVE}$ calculating section 291 calculates $\Delta S_{AVE(50\ Hz)}$ in a similar manner and sends the result to the $T_f$ determination section 292.

On the basis of the transferred $\Delta S_{AVE}$ and time difference $t_0$, the $T_f$ determination section 292 compares $\Delta S_{AVE(50\ Hz)}$ with $\Delta S_{AVE(60\ Hz)}$. For example, if $\Delta S_{AVE(50\ Hz)} > \Delta S_{AVE(60\ Hz)}$, the $T_f$ determination section 292 determines that the frequency of the power supply is 50 Hz.

As explained above, with the ninth embodiment, the flickering frequency can be sensed automatically and the frequency of the power supply need not be inputted.

In a method of processing the signals from a solid-state imaging device according to the sixth to ninth embodiments provided with photoelectric conversion sections which are arranged in the directions of row and column two-dimensionally and generate an electric signal according to the amount of incident light, vertical signal lines onto which the electric signals from the photoelectric conversion sections are read column by column, a vertical control section for controlling the reading of the electric signals generated at the photoelectric conversion sections onto the vertical signal lines, and a horizontal control section for controlling the transfer in the horizontal direction of the electric signals read by the vertical control section onto the vertical signal lines, the method of processing the signals from a solid-state imaging device is characterized by comprising the step of calculating a gain correction factor for fluctuations in luminance in the amount of incident light to the photoelectric conversion sections provided in the direction of row on the basis of a first electric signal read out from the photoelectric conversion sections and a second electric signal read out from the photoelectric conversion sections time $\Delta t$ later than the reading time of the first electric signal and the step of compensating for the second electric signal on the basis of the gain correction factor.

The time $\Delta t$ is determined by the step of calculating differences $\Delta S$ between the first signal S read out from the photoelectric conversion section and the second signal S" obtained by reading the first signal S from the photoelectric conversion section time $\Delta t'$ later than the reading time of the first signal S, while changing time $\Delta t'$, and the step of calculating the period of fluctuations in luminance by comparing the plural $\Delta S$ calculated while changing the time $\Delta t'$.

In a solid-state imaging device provided with photoelectric conversion sections which are arranged in the directions of row and column two-dimensionally and generate an electric signal according to the amount of incident light, vertical signal lines onto which the electric signals from the photoelectric conversion sections are read column by column, a vertical control section for controlling the reading of the electric signals generated at the photoelectric conversion sections onto the vertical signal lines, and a horizontal control section for controlling the transfer in the horizontal direction of the electric signals read by the vertical control section onto the vertical signal lines, the solid-state imaging device according to the sixth to ninth embodiments is characterized by comprising gain correction factor calculating section for calculating a gain correction factor for fluctuations in luminance in the amount of incident light to the photoelectric conversion sections provided in the direction of row on the basis of a first electric signal read out from the photoelectric conversion sections and a second electric signal read out from the photoelectric conversion sections time $\Delta t$ later than the reading time of the first electric signal and correction section for compensating for the second electric signal on the basis of the calculated gain correction factor.

In a solid-state imaging device according to the sixth to ninth embodiments provided with photoelectric conversion sections which are arranged in the directions of row and column two-dimensionally and generate an electric signal according to the amount of incident light, vertical signal lines onto which the electric signals from the photoelectric conversion sections are read column by column, a vertical control section for controlling the reading of the electric signals generated at the photoelectric conversion sections onto the vertical signal lines, and a horizontal control section for controlling the transfer in the horizontal direction of the electric signals read by the vertical control section onto the vertical signal lines, the solid-state imaging device is characterized by comprising a calculation element for calculating differences $\Delta S$ between the first signal S read out from the photoelectric conversion section and the second signal S" obtained by reading the first signal S from the photoelectric conversion section time $\Delta t'$ later than the reading time of the first signal S, while changing time $\Delta t'$, and a determination element for determining the period $\Delta t$ of fluctuations in luminance by comparing the plural $\Delta S$ calculated while changing the time $\Delta t'$. Her, the time $\Delta t$ is the time obtained by multiplying the flickering period $T_f$ by $(2N+1)/2$ (N is an integer).

With the above-described configuration, the sixth to ninth embodiments produce the following effects.

Fluctuations in luminance in the amount of incident light can be suppressed by calculating a gain correction factor for fluctuations in luminance in the amount of incident light to the photoelectric conversion sections provided in the direction of row on the basis of the first electric signal and the second electric signal read out from the photoelectric conversion sections a specific time later than the reading time of the first electric signal and compensating for the second electric signal on the basis of the calculated gain correction factor.

In addition, the period of fluctuations in luminance can be sensed by calculating differences $\Delta S$ between the first signal S read out from the photoelectric conversion section and the second signal S" obtained by reading the first signal S from the photoelectric conversion section time $\Delta t'$ later than the reading time of the first signal S, while changing time $\Delta t'$, and comparing the plural $\Delta S$ calculated while changing the time $\Delta t'$.

As described above, with the sixth to ninth embodiments, fluctuations in luminance in the amount of incident light can be suppressed by calculating a gain correction factor for fluctuations in luminance in the amount of incident light to the photoelectric conversion sections provided in the direction of row on the basis of the first electric signal (comparison sensor output signal) and the second electric signal (sensor output signal) read out from the photoelectric conversion sections a specific time later than the reading time of the first electric signal and compensating the second electric signal by an arithmetic operation circuit, such as a multiplier, on the basis of the calculated gain correction factor.

As described earlier, CMOS image sensors, which feature less power consumption, are going to be employed in PC cameras capable of dealing with moving picture information, digital cameras required to provide high picture quality, DV cameras, and ATV cameras. In general, the NTC system, DVC (digital videocamcorder), and ATV (advanced TV) cameras have employed hand shake correction techniques. In hand shake correction, the slight movement of the hand at low frequencies (about 5 Hz) during taking a picture is sensed, then the amount of the shift is sensed, and a feedback is applied to the camera system. To correct the hand shake, it is necessary to arrange more pixels on the chip than the pixels actually displayed on the screen and cut out only the area displayed on the screed in order to change the display area according to the amount of the hand shake. Although hand shake correction techniques for CCD image sensors have been considered, no effective hand shake correction techniques for CMOS image sensors have been proposed.

In CCD image sensors, an arbitrary pixel cannot be specified (or accessed at random) because of its operating principle, and therefore, all the pixels must be accessed in a read operation. As a result, when hand shake is corrected using a CCD image sensor, the electric charge stored in the pixels in the vertical direction not shown on the screen is discarded, and all the pixels in the horizontal direction are read out from. Thereafter, the image signals in the area to be displayed on the screen are taken out.

On the other hand, the CMOS image sensor has not only the feature that enables random access but also the feature of a line-reading sensor for reading line by line in each horizontal period. Thus, the CMOS image sensor has the quite different features from those of the CCD image sensor. It is undesirable that a hand shake correction technique similar to that used in CCD image sensors be used directly in correcting a hand shake in the CMOS image sensor.

As described above, a method of effectively correcting the hand shake of a camera using a CMOS image sensor has not be considered. Moreover, it has not been an effective method that the hand shake correction technique used for CCD image sensors is applied directly to CMOS image sensors.

Next, an embodiment of the present invention capable of correcting a hand shake effectively in using an amplification type solid-state image pick-up device will be explained.

Tenth Embodiment

The entire configuration of a tenth embodiment of the present invention is the same as that of the fifth embodiment of FIG. 19 and therefore is not shown.

Figure 39:
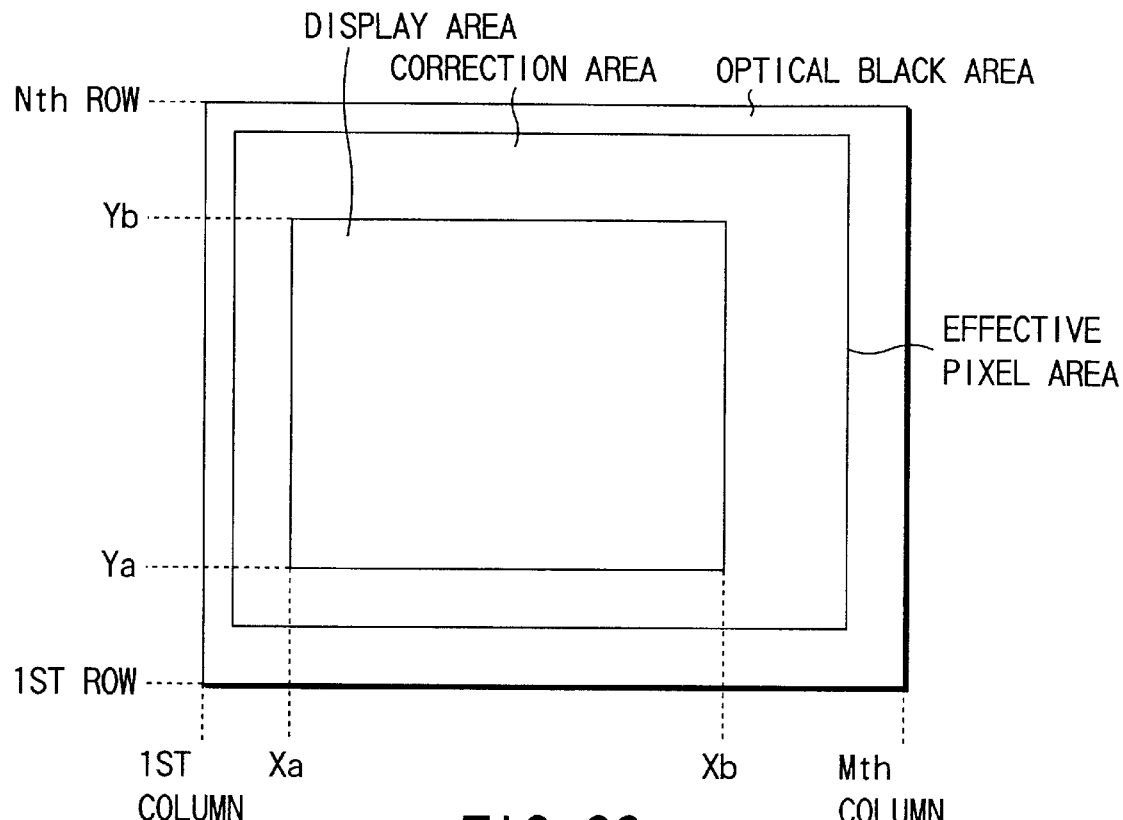
FIG. 39 schematically shows an example of the configuration of the imaging area corresponding to the imaging section of the sensor block in a CMOS image sensor according to a tenth embodiment of the present invention.

FIG. 39 shows the imaging area corresponding to the imaging section 111 of FIG. 19. The imaging area is composed of N×M pixels with N rows in the vertical direction and M columns in the horizontal direction. In the imaging area, a specific outer area makes an OB (optical black) pixel area that outputs a black signal. The area surrounded by the OB pixel area makes an effective pixel area that is sensitive to light. The area actually displayed on the screen of a CRT or an LCD makes an actually effective pixel area smaller than the effective pixel area. The outside of the actually effective pixel area (the inside of the effective pixel area) makes a correction pixel area for hand shake correction. The position of the actually effective pixel area moves within the effective pixel area according to hand shake correction information. As the actually effective pixel area moves, the correction pixel area moves accordingly.

In the tenth embodiment, on the basis of hand shake information obtained from a hand shake sensor or the like, the actually effective pixel area (the area ranging from Xa to Xb columns and from Ya to Yb rows) of FIG. 39 is specified and image signals are selectively read out from the unit pixels included in the actually effective pixel area specified.

Specifically, when the actually effective pixel area has been determined on the basis of the hand shake correction information, address information on each of the vertical direction and horizontal direction is given to the system generator 112 of FIG. 19. The address information may include only the start address or both the start address and the stop address. For example, when the start address (Xa column, Ya row) is given to the system generator 112, the address corresponding to column Ya is set as the start address for the vertical shift register 113a in the vertical direction. The image signal is read out from the row corresponding to the start address. In the horizontal direction, the address corresponding to column Xa is set as the start address for the horizontal shift register 117. The image information in the line memory 116 is read sequentially, starting at the location in which the image information on the column corresponding to the start address is stored.

Figure 40:
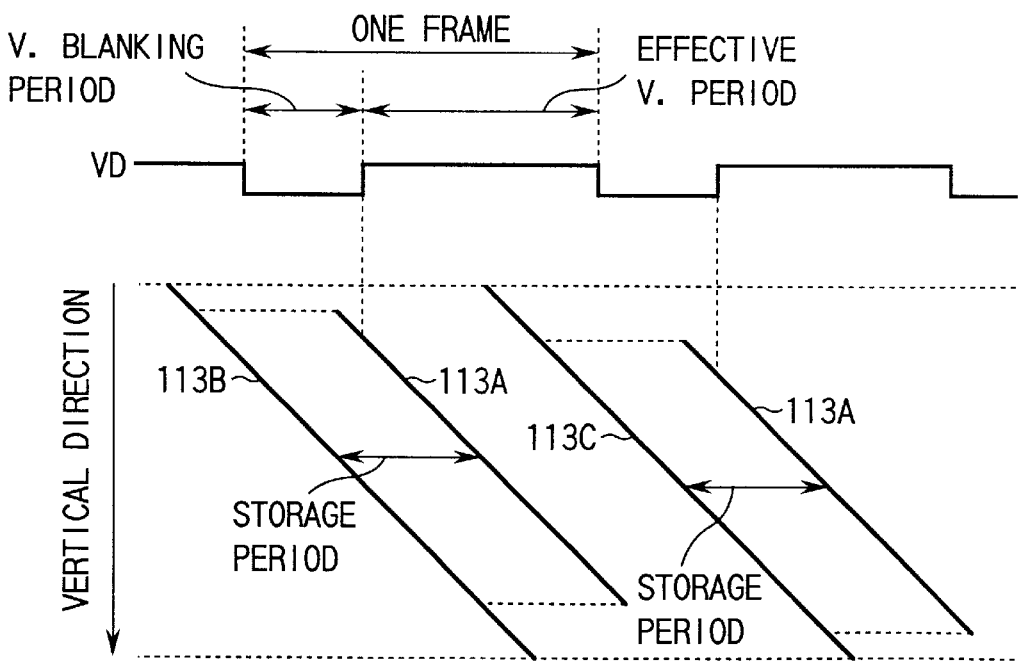
FIG. 40 is an explanatory diagram for a first example of the hand shake correction operation in the vertical direction in the tenth embodiment.

FIG. 40 diagrammatically shows the operation of the vertical shift registers 113a to 113c in a first example of the operation of the tenth embodiment.

In FIG. 40, the horizontal axis is the time axis and the vertical axis indicates the pixel position in the vertical direction. Namely, FIG. 40 illustrates how pixels in the vertical direction (rows in the vertical direction) are selected as time elapses. The operation of each of the vertical shift registers 113a, 113b, and 113c corresponds to 113A, 113B, and 113C of FIG. 40, respectively. Reference symbol VD indicates a vertical synchronizing signal. One frame (in progressive scanning) or one field (in interlace scanning) is composed of a vertical blanking period and a vertical effective period. FIG. 40 shows the operation in only two frames (or two fields). In the tenth embodiment, explanation will be given mainly on the basis of progressive scanning.

When the actually effective pixel area (cutout area) has been specified on the basis of the hand shake information sensed by an external sensor (not shown) and supplied to the system generator 112, the start address for the random-access vertical shift register 113a is determined according to the actually effective pixel area. The image signal is read sequentially from the row corresponding to the start address (corresponding to line 113A in FIG. 40).

The vertical shift register 113b or 113c selects each row (the vertical shift register 113b alternates with the vertical shift register 113c at intervals of a frame) a specific time earlier than the reading of each row, thereby discharging the unnecessary charge stored in the photodiodes in the selected row to return the photodiodes to the initial state. The initializing operation is shown by lines 113B and 113C in FIG. 40. The storage period from an initializing operation to a read operation is constant in each row and each frame (each field in interlace scanning). This makes the sensitivity in each row constant even when hand shake correction is performed, which prevents the picture quality from deteriorating.

In the tenth embodiment, it is assumed that neither the vertical shift register 113b nor 113c is of the random access type. Thus, the vertical shift registers 113b and 113c select all the rows. As a result, the time required for the vertical shift registers 113b and 113c to initialize all the rows is longer than one frame period.

Figure 41:
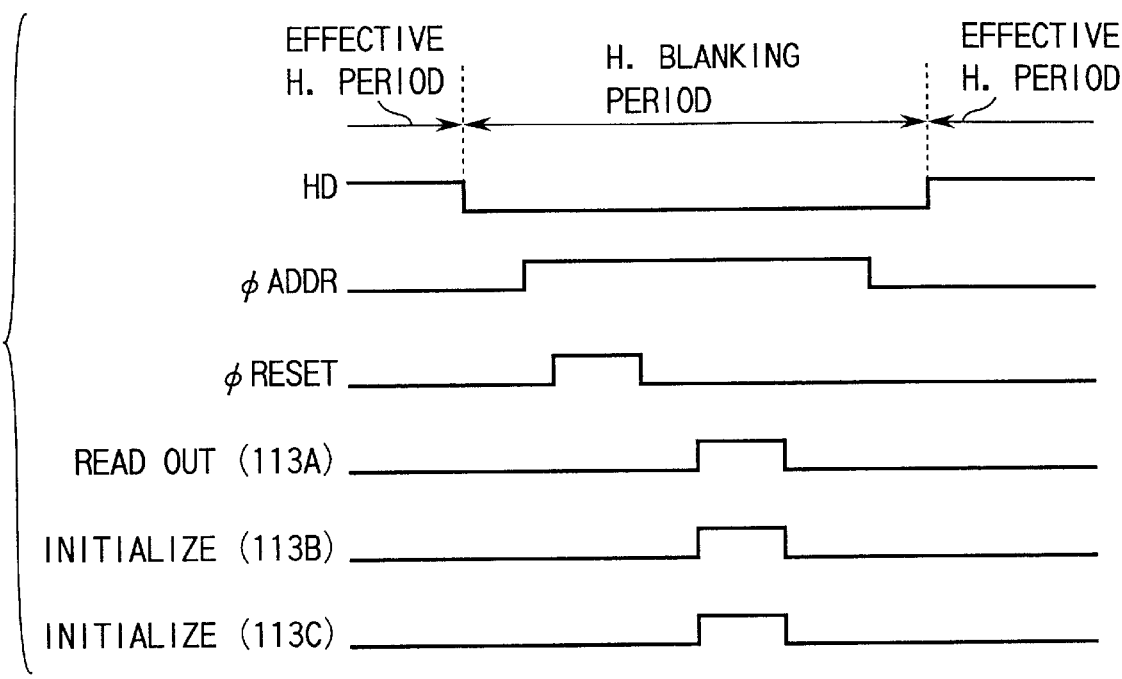
FIG. 41 is a timing chart for an example of the hand shake correction operation of the horizontal blanking period in the tenth embodiment.

The read operation and initializing operation shown in FIG. 40 are carried out in a horizontal blanking period. FIG. 41 is a timing chart to help explain the horizontal blanking period.

In the horizontal blanking period, the address register 124 (φADDR) (see FIG. 20) for each pixel in the row to be read out from is turned on. Then, the reset transistor 125 (φRESET) is turned on, thereby resetting the potential at the sense node 126 to a specific potential. Thereafter, the read transistor 122 is turned on, allowing the voltage at the sense node 126 to change according to the charge stored in the parasitic capacitance at the photodiode 121. The signal voltage at the sense node 126 is read onto the vertical signal line 127 via the amplification transistor 123.

On the other hand, the read transistor 122 of each pixel in the row to be initialized is also turned on with the same timing as that for the read transistors 122 in the row to be read. This brings each photodiode 121 in the row to be initialized into the initial state. Specifically, as shown in FIG. 40, there is a period during which the read operation (corresponding to line 113A) overlaps with the initializing operation (corresponding to lines 113B and 113C) in time. FIG. 41 shows a case where they overlaps with each other in each of the periods shown by lines 113A, 113B, and 113C of FIG. 40.

By setting the timing for the initializing operation suitably, an electronic shutter operation can be carried out with the storage period of each row made constant. Furthermore, the deterioration of the picture quality due to a flicker can be prevented by causing the storage period to correspond to the period of the flicker of a fluorescent lamp.

Figure 42:
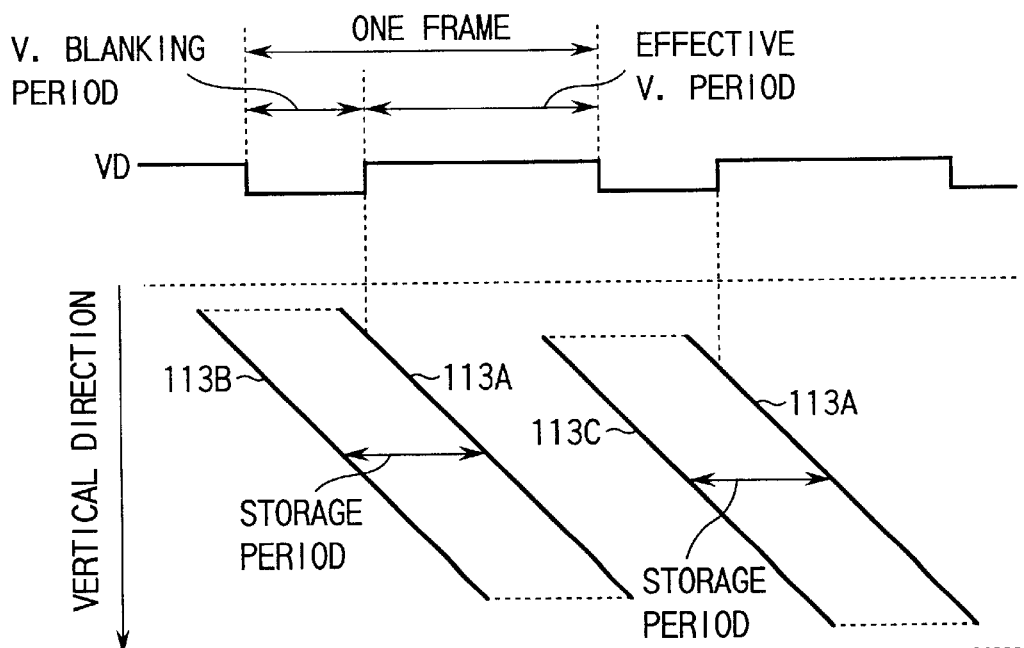
FIG. 42 is an explanatory diagram for a second example of the hand shake correction operation in the vertical direction in the tenth embodiment.

FIG. 42 diagrammatically shows the operation of the vertical shift registers 113a to 113c in a second example of the operation of the tenth embodiment as in the first example of FIG. 40. The basic operation of the second example is the same as that of the first example explained using FIGS. 40 and 41. Explanation of the characteristic operation of the second example will be given.

In the example of FIG. 40, it has been assumed that the read-out vertical shift register 113a is of the random access type and neither the read-out vertical shift registers 113b nor 113c is of the random access type. In the second example of FIG. 42, however, it is assumed that not only the vertical shift register 113a but also the vertical shift registers 113b and 113c are of the random access type. With both the vertical shift registers 113b and 113c being of the random access type, only the rows corresponding to the actually effective pixel area (cutout area) specified on the basis of the hand shake information have to be initialized.

In the second example, too, the storage time from the initializing operation to the read operation is equal for each row and each frame, making the sensitivity of each row constant even when the hand shake is corrected, which prevents the picture quality from deteriorating.

Figure 43:
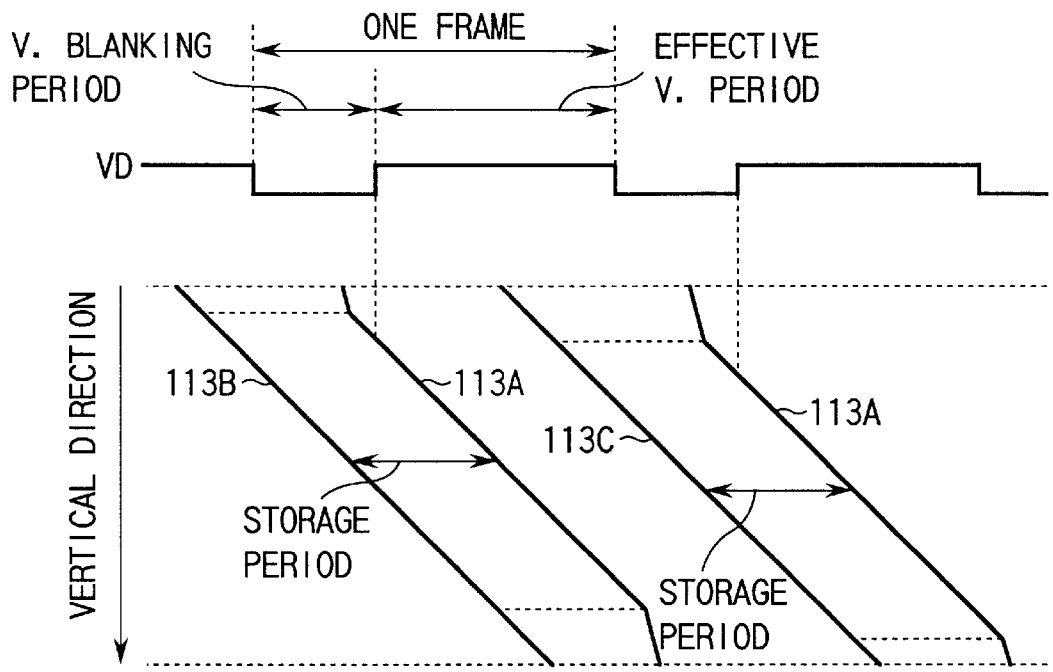
FIG. 43 is an explanatory diagram for a third example of the hand shake correction operation in the vertical direction in the tenth embodiment.

FIG. 43 diagrammatically shows the operation of the vertical shift registers 113a to 113c in a third example of the operation of the tenth embodiment as in the first example of FIG. 40. The basic operation of the third example is the same as that of the first example explained using FIGS. 40 and 41. Explanation of the characteristic operation of the third example will be given.

In the example of FIG. 40, it has been assumed that the read-out vertical shift register 113a is of the random access type and neither the initialization vertical shift registers 113b nor 113c is of the random access type. In the third example of FIG. 43, however, it is assumed that none of the vertical shift registers 113a, 113b and 113c are of the random access type.

Since the read-out vertical shift register 113a is not of the random access type, the vertical shift register 113a accesses all the rows. In the third example, the vertical shift register 113a is operated at high speed for the rows except for the rows corresponding to the actually effective pixel area (cutout area) specified on the basis of the hand shake information, that is, for the rows actually not displayed on the screen. The actually effective pixel area is the same as that shown in FIG. 40. The storage time from the initializing operation to the read operation is equal for each row and each frame, making the sensitivity of each row constant even when the hand shake is corrected, which prevents the picture quality from deteriorating as in the example of FIG. 40.

Figure 44:
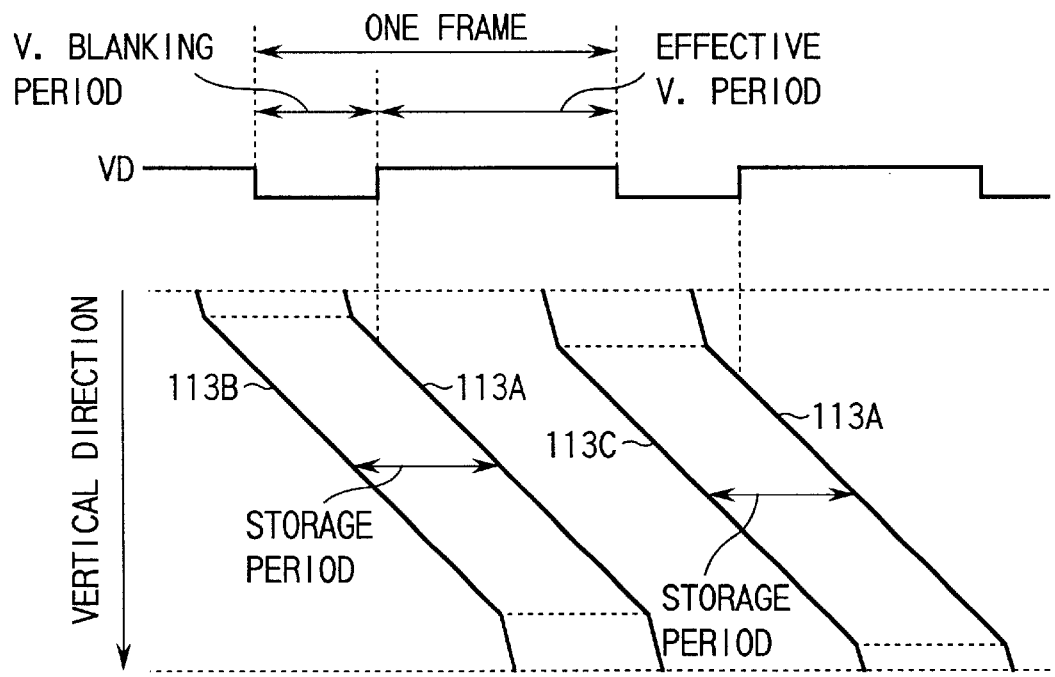
FIG. 44 is an explanatory diagram for a fourth example of the hand shake correction operation in the vertical direction in the tenth embodiment.

FIG. 44 diagrammatically shows the operation of the vertical shift registers 113a to 113c in a fourth example of the operation of the tenth embodiment as in the first example of FIG. 40. The basic operation of the fourth example is the same as that of the first example explained using FIGS. 40 and 41. Explanation of the characteristic operation of the fourth example will be given.

As in the third example of FIG. 43, in the fourth example, it is assumed that none of the vertical shift registers 113a, 113b and 113c are of the random access type. In the third example of FIG. 43, only the vertical shift register 113a is operated at high speed for the rows (the rows actually not displayed on the screen) except for the rows corresponding to the actually effective pixel area specified on the basis of the hand shake information. In the fourth example, however, not only the vertical shift register 113a but also the vertical shift registers 113b and 113c are operated at high speed for the rows except for the rows corresponding to the actually effective pixel area.

In the fourth example, too, the storage time from the initializing operation to the read operation is equal for each row and each frame, making the sensitivity of each row constant even when the hand shake is corrected, which prevents the picture quality from deteriorating as in the examples of FIGS. 40, 42, and 43.

According to the examples shown in FIGS. 40–44, it is possible to make equal a master clock Cl used in the camera system (or data rate D1 of signal processing in the system) to a master clock C2 (or data rate D2 of signal reading in the system). This prevents a noise due to an interference between the internal clock and the external clock of the system from being generated.

Though the examples shown in FIGS. 40–44 use the one read-out shift register and two electronic shutter shift registers, it is possible to operate the shift registers at high speed if two read-out shift registers and two electronic shutter shift registers are used. The two shift registers are alternately operated for every frame or field.

Figure 45:
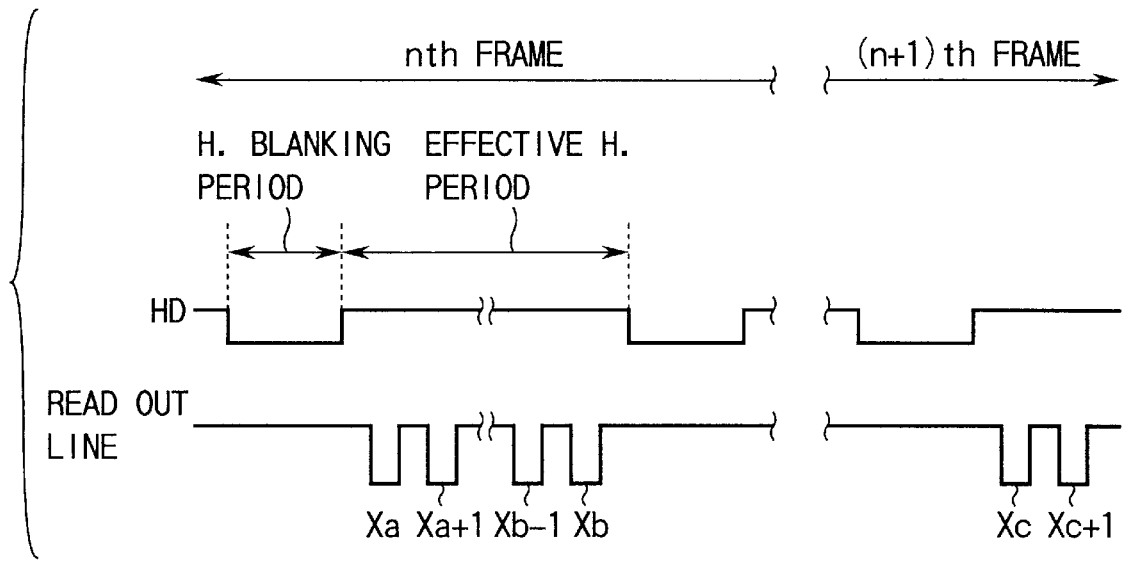
FIG. 45 is an explanatory diagram for an example of the hand shake correction operation in the horizontal direction in the tenth embodiment.

FIG. 45 shows a read operation in the horizontal direction, which is applicable to any of the first to fourth examples of the tenth embodiment.

As described earlier, the image signal photoelectrically converted by each pixel is read onto a vertical signal line during a horizontal blanking period. The signal read onto the vertical signal line is stored temporarily in the line memory 116 of FIG. 19 and then read sequentially by the horizontal shift register 117 into the output circuit 118.

When the actually effective area (cutout area) is specified on the basis of the hand shake information, the start address for the random-access horizontal shift register 117 is determined according to the actually effective area. Using the column corresponding to the start address as the start address, each image signal is read sequentially from the line memory 116. In the example of FIG. 45, the image signal in column Xa is read sequentially during each horizontal effective period in the n-th frame. In the next (n+1)-th frame, the image signal in column Xc is read sequentially during each horizontal effective period. In this way, only the image signal in the column corresponding to the actually effective pixel area can be selectively read by changing the start address of the horizontal shift register 117 in each frame according to the hand shake information.

As described above, in the tenth embodiment, the image signal is selectively read out from only the pixels included in the actually effective pixel area specified on the basis of the hand shake information. This is because, unlike the CCD image sensor, the CMOS image sensor enables any row and column to be specified by random access.

In CCD image sensors, random accessing cannot be done because of its operating principle, and therefore, all the pixels must be accessed in a read operation. As a result, when a hand shake is corrected, the electric charge stored in the pixels in the vertical direction except for the pixels in the actually effective pixel area that actually displays on the screen is discarded. In the horizontal direction, all the pixels are read out from. Thereafter, only the image signals in the actually effective area are taken out.

Therefore, when a hand shake is corrected using the CCD image sensor, the read rate must be made higher than when a hand shake is not corrected, in a case where the number of actually effective pixels in the horizontal direction is made constant. The number of the effective pixels in the horizontal direction must be smaller than when a hand shake is not corrected, in a case where the read rate is made constant.

In contrast, in the tenth embodiment, the image signal is selectively read out from only the pixels included in the actually effective pixel area, using the random access function of the CMOS image sensor.

Therefore, as compared with a case where a hand shake is corrected using the CCD image sensor, the read rate can be made low when the number of actually effective pixels in the horizontal direction is constant, or the number of actually effective pixels in the horizontal direction can be increased (the resolution in the horizontal direction can be increased) when the read rate is made constant. In other words, with the tenth embodiment, when the image signal can be read at the data rate equal to the data rate at the time when a hand shake is not corrected.

Described will be a modification of the tenth embodiment in which the high speed operations of FIGS. 43 and 44 are performed. The configuration of the modification is the same as that of the tenth embodiment shown in FIG. 19. In the tenth embodiment, the timing generator 115 and system generator 112 of FIG. 19 control the vertical shift registers 113a, 113b, 113c, pulse selector 114, and horizontal shift register 117 so as to perform a read operation in the horizontal direction shown in FIG. 45. If the timing generator 115 and system generator 112 control the vertical shift registers 113a, 113b, 113c, pulse selector 114, and horizontal shift register 117 so as to omit the sequential reading operation of the image signal in each column (the operation in the effective horizontal period of FIG. 45) for the area ranging from the first row to (Ya−1)th row and from (Yb+1)th row to Nth row, it is possible to realize the high speed operations of FIGS. 43 and 44. That is, after the image signals of one row are read onto the vertical signal lines, the image signals of adjacent row are read onto the vertical signal lines without sequentially reading out the image signals of the previous row. Then, the high speed operations shown in FIGS. 43 and 44 are possible. Even if the image signals of (Ya−1)th row are present on the vertical signal lines at the time of reading the image signals of Ya-th row, the image signals of the Ya-th row can be correctly read out since the reset transistor Tc resets the charges on the vertical signal lines before the image signals of each row are read onto the vertical signal lines.

Figure 46:
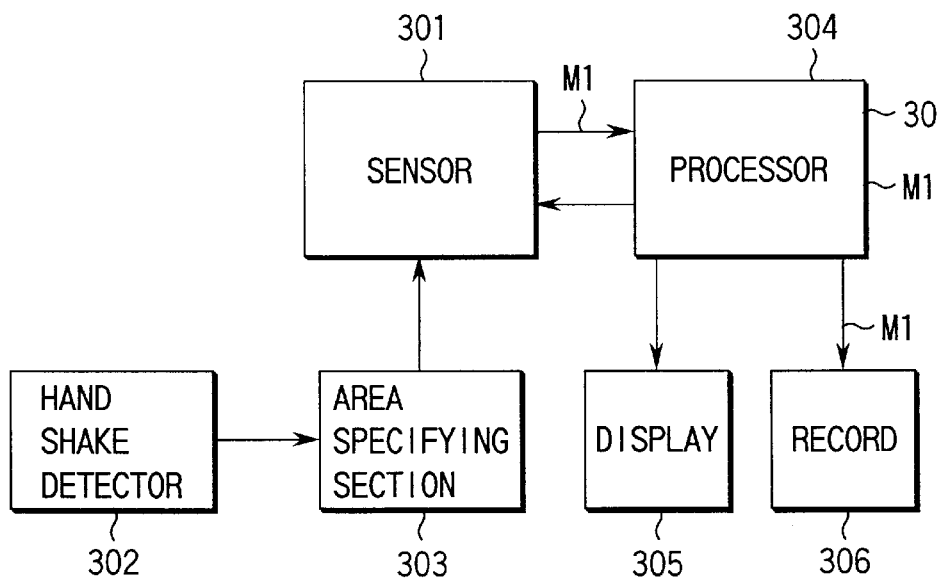
FIG. 46 is a block diagram of an example of the configuration of the main part of the system in the tenth embodiment.

FIG. 46 is a block diagram showing a configuration of the main part of the camera system using the CMOS image sensor of FIG. 19.

The camera system is, for example, of the three-plate type. Light passing through a lens system is color-separated by a prism into RGB. The color-separated light is photoelectrically converted by the imaging section 111 (having the same configuration as that of the CMOS image sensor of FIG. 19) of an image sensor 301. The configuration and operation of the image sensor 301 are as explained above.

A hand shake (a shake at low frequency (about 5 Hz) in taking pictures) is sensed by a hand shake detector 302. For example, angular velocity sensors are used as hand shake sensors used in the hand shake detector 302. The angular velocity sensors are placed in the vertical and horizontal directions to sense a hand shake. The hand shake information from the hand shake detector 302 is sent to an area specifying section 303. The area specifying section 303 specifies a specific area (actually effective pixel area) of the imaging section in the image sensor 301 for each frame according to the amount of the hand shake detected by the hand shake detector 302. Specifically, as explained earlier, for example, the start address (column Xa, row Ya) is given as address information in each of the vertical and horizontal directions to the system generator 112 of FIG. 19. This causes the image information to be read out from only the specific area of the imaging section 111.

The image information read out from the image sensor 301 is inputted to a processor 304 composed of DSP and others. Receiving the signals from the output circuit 118 (composed of a CDS circuit, an AGC circuit, an A/D converter circuit, and others as shown in FIG. 19), the processor 304 performs various signal processes (AE (autoexposure) process, AF (autofocus) process, AWB (autowhitebalance) process, color signal process, and others). The processor 304 also controls not only the interface with a display section 305 (display monitor and others) but also the interface with a recording section 306 (for such a recording medium as an EEPROM, an MD, a DVD, or an HDD). The processor 304 sends a control signal and other signals to the image sensor 301.

As described above, with the tenth embodiment, the image signal is read out from only the pixels included in the actually effective pixel area, using the random accessing function of the CMOS image sensor. This makes it possible to read the image signal at the same data rate as when a hand shake is not corrected. As a result, the camera system of FIG. 46 can be constructed using only a single master clock, which enables the system to be simplified and consume less power. Specifically, any of the data rate at which the image signal is read out from the image sensor 301 into the processor 304 (corresponding to the data rate at which the image signal is read out from the line memory 116 of FIG. 19), the data rate at which the processor 304 processes the signal, and the data rate at which the image signal is written into the recording section 306 can be set to data rate M1 (for example, 13.5 MHz).

While in the example of FIG. 46, the image sensor 301 and processor 304 are composed of separate IC chips, the image sensor 301 and processor 304 may be integrated into the same IC chip.

The tenth embodiment is applicable to not only the NTSC/PAL system and DV system that carry out an interlace operation but also an ATV, known as a next-generation TV, that performs a progressive operation.

Eleventh Embodiment

Hereinafter, an eleventh embodiment of the present invention will be explained.

The basic configuration of the sensor block in a CMOS image sensor is the same as that of FIG. 19. The configuration of a unit cell and others constituting the imaging section in the sensor block is the same as that of FIG. 20. The structure of the imaging area corresponding to the imaging section shown in FIG. 19 is the same as that shown in FIG. 39. For a detailed explanation of those, reference will be made to the tenth embodiment and explanation of them will not be given here.

In the eleventh embodiment, the image signals are read out from all the pixels included in at least the effective pixel area of the imaging area shown in FIG. 39. Usually, the image signals are read out from all of the (N×M) pixels included in the imaging area. Reading is done within one frame period at rate M2 (e.g., 18.0 MHz) higher than reading rate M1 (e.g., 13.5 MHz) without hand shake correction. The image information for all the pixels read out from is stored into a buffer memory.

Thereafter, the actually effective pixel area (the area ranging from columns Xa to Xb and from rows Ya to Yb shown in FIG. 39) is specified on the basis of the hand shake information obtained by the hand shake sensor and others.

Then, the image signals stored in the addresses of the buffer memory corresponding to the specified area are read out. This causes only the actually effective pixel area corresponding to the hand shake information to be displayed on the screen.

Figure 47:
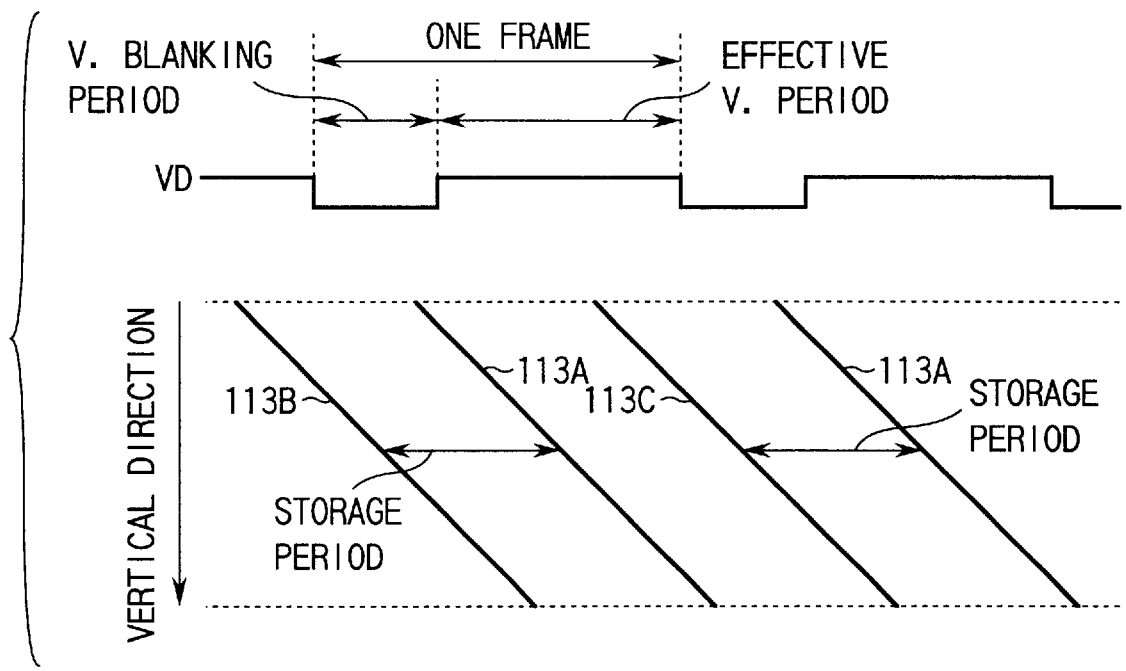
FIG. 47 is an explanatory diagram for an example of the hand shake correction operation in the vertical direction in a CMOS image sensor according to an eleventh embodiment of the present invention.

FIG. 47 diagrammatically shows the operation of the vertical shift registers 113a to 113c in a first example of the operation of the eleventh embodiment.

In FIG. 47, the horizontal axis is the time axis and the vertical axis indicates the pixel position in the vertical direction. Namely, FIG. 47 illustrates how pixels in the vertical direction (rows in the vertical direction) are selected as time elapses. The operation of each of the vertical shift registers 113a, 113b, and 113c corresponds to lines 113A, 113B, and 113C of FIG. 47, respectively. Reference symbol VD indicates the vertical synchronizing signal. One frame (in progressive scanning) or one field (in interlace scanning) is composed of a vertical blanking period and a vertical effective period. FIG. 47 shows the operation in only two frames (or two fields). In the eleventh embodiment, too, explanation will be given mainly on the basis of progressive scanning.

In the eleventh embodiment, the image signals are read out from all of the (N×M) pixels included in the imaging area at reading rate M2 (e.g., 18.0 MHz). Furthermore, the vertical shift register 113b or 113c selects each row (the vertical shift register 113b is alternated with the vertical shift register 113c every frame) a specific time earlier than the reading of each row, thereby discharging the unnecessary charge stored in the photodiodes in the selected row to return the photodiodes to the initial state. The initializing operation is shown by lines 113B and 113C in FIG. 47. The storage period from an initializing operation to a read operation is constant in each row and each frame (each field in interlace scanning). This makes the sensitivity in each row constant even when hand shake correction have been performed, which prevents the picture quality from deteriorating.

By setting the timing for the initializing operation suitably, an electronic shutter operation can be carried out with the storage period of each row made equal. Furthermore, the deterioration of the picture quality due to a flicker can be prevented by causing the storage period to correspond to the period of the flicker of a fluorescent lamp.

A read operation and an initializing operation are carried out during a horizontal blanking period. Those operations are basically the same as the operation of FIG. 41 explained in the tenth embodiment and an explanation of those operation will not be given.

One line of individual image signals (image signal from the first column to the M-th column) read onto the vertical signal line during the horizontal blanking period are stored temporarily into the line memory 116 of FIG. 19. Thereafter, the signals are read by the horizontal shift register 117 sequentially into the output circuit 118 during the horizontal effective period. The output circuit 118 stores the signals into the buffer memory.

Figure 48:
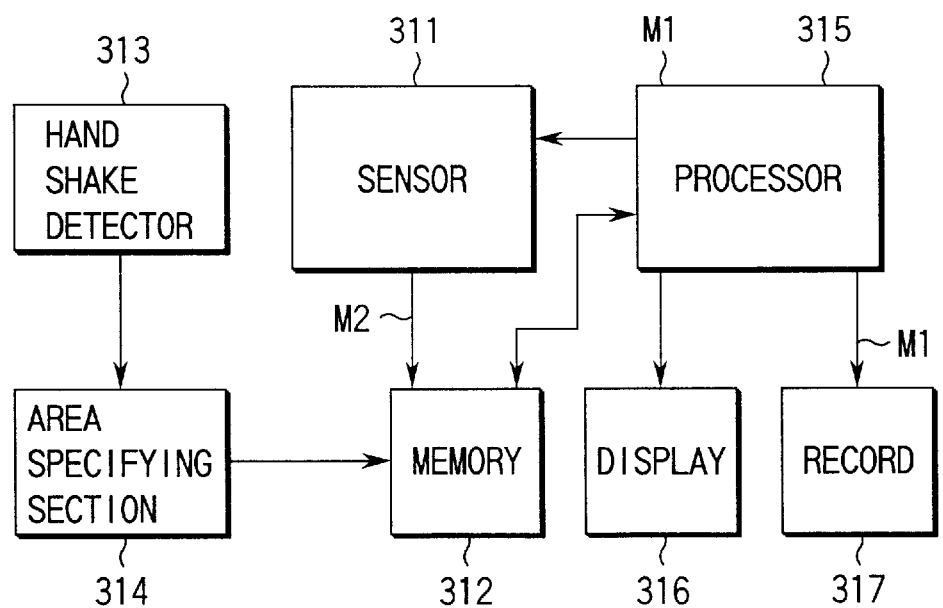
FIG. 48 is a block diagram of an example of the configuration of the main part of the system in the eleventh embodiment.

FIG. 48 is a block diagram showing a configuration of the main part of a first example of a camera system using the sensor of the eleventh embodiment.

The camera system is, for example, of the three-plate type. Light passing through a lens system is color-separated by a prism into RGB. The color-separated light is photoelectrically converted by the imaging section 111 of an image sensor 311 (having the same configuration as that of the CMOS image sensor of FIG. 19). The configuration and operation of the image sensor 311 are as explained above.

The signal from the output circuit 118 (the output circuit 118 composed of a CDS circuit, an AGC circuit, an A/D converter circuit, and others as shown in FIG. 19) of the image sensor 311 is sent to a memory section (buffer memory) 312, in which the image information in all the area (all the pixels) in the imaging section are stored. The data rate (corresponding to the data rate at which the image signals are read out from the line memory of FIG. 19) at which the image signals are written from the image sensor 311 into the memory section 312 at data rate M2 higher than data rate M1 without hand shake correction.

A hand shake is sensed by a hand shake detector 313. For example, angular velocity sensors are used as hand shake sensors used in the a hand shake detector 313. The angular velocity sensors are placed in the vertical and horizontal directions to sense a hand shake.

The hand shake information from the a hand shake detector 313 is sent to an area specifying section 314. The area specifying section 314 specifies an actually effective pixel area according to the amount of the hand shake detected by the a hand shake detector 313 and specifies a storage area in the memory section 312 corresponding to the determined actually effective pixel area. Specifically, of the image signals from all the pixels stored in the memory section 312, only the image signals from the individual pixels included in the actually effective pixel area are selectively read for each frame on the basis of the information from the area specifying section 314. This causes only the effective pixel area according to the hand shake information to be displayed on the screen.

The image information read out from the memory section 312 is inputted to a processor 315 composed of DSP and others. The data rate at which the memory section 312 is read out from may be at M1 or M2. Receiving the signals from the memory section 312, the processor 315 performs various signal processes (including an AE (autoexposure) process, AF (autofocus) process, AWB (autowhitebalance) process, and color signal process). The processor 315 also controls not only the interface with a display section 316 (display monitor and others) but also the interface with a recording section 317 (for such a recording medium as an EEPROM, an MD, a DVD, or an HDD). The processor 315 sends a control signal and other signals to the image sensor 311. The data rate at which the processor 315 carries out a signal process is M1 and the data rate at which the recording section 317 writes the image signal onto a recording medium is also M1.

As described above, with the eleventh embodiment, the image signals read out from the imaging section are stored temporarily into the memory section. At the same time, an actually effective pixel area is determined according to the hand shake information. Only the image information on the determined actually effective pixel area is selectively read out from the memory section. As described above, when a hand shake is corrected after the image information has been read out, use of the line reading of the CMOS image sensor, one of its features, enables the hand shake to be corrected at higher speed than the CCD image sensor.

Specifically, since the CMOS image sensor is of the line reading type, a row read out from in the second half of one frame includes the movement information of the subject. Therefore, for example, when a screen for one frame is divided into 8×8 pieces or 64 divisions and motion vectors are sensed, the second half is allowed to include motion vectors. Thus, with the CMOS image sensor, the image processing of the first frame (or filed) can be carried out during the readout of the second frame (or field) and the hand shake-corrected image be displayed as the third frame (or field). In contrast, since the CCD image sensor is not of the line reading type, motion vectors can be sensed only when the image information has been read onto the first and second screens. As a result, the image processing of the first and second screens is carried out on the third frame (or filed) and the hand shake-corrected image is displayed on the third frame (or field).

For this reason, when a hand shake is corrected after the image information has been read out, use of the line reading of the CMOS image sensor, one of its features, enables the hand shake to be corrected at higher speed than the CCD image sensor.

Figure 49:
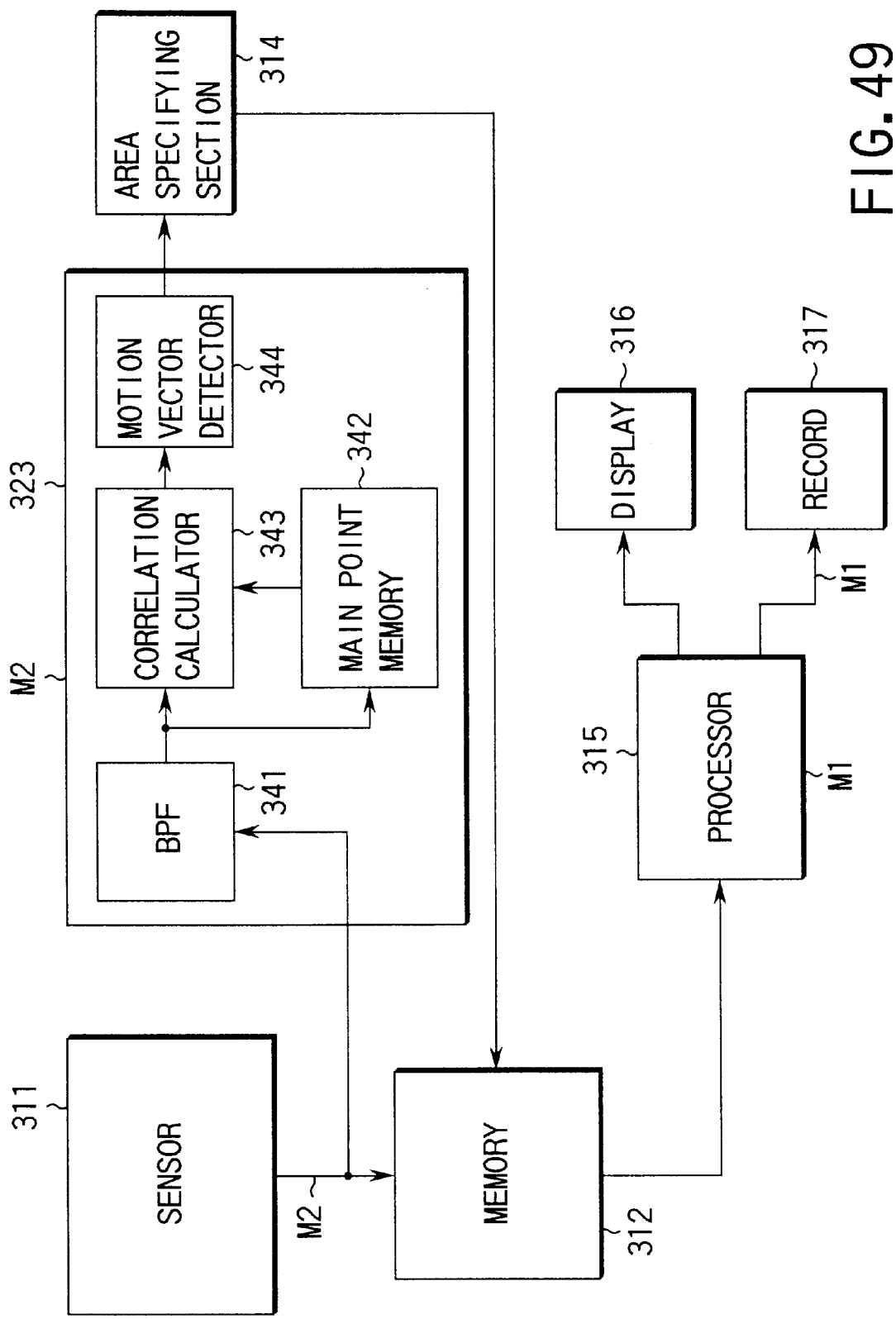
FIG. 49 is a block diagram of another example of the configuration of the main part of the system in the eleventh embodiment.

FIG. 49 is a block diagram showing a configuration of the main part of a second example of a camera system using the sensor of the eleventh embodiment.

In the second example, a hand shake detector 323 is composed of a movement sensing LSI instead of an angular velocity sensor or the like. A hand shake is sensed by the movement sensing LSI.

The image signal from the image sensor 311 is inputted to not only the memory section 312 but also the movement sensing LSI constituting the hand shake sensing section 323. A BPF (band pass filter) 341 extracts the necessary frequency components for sensing motion vectors from the image signal inputted to the movement sensing LSI 323. The output of the BPF 341 is inputted to both a representative point memory 342 and a correlation calculating section 343. The output of the correlation calculating section 343 is inputted to a motion vector detector 344. Moving vectors are sensed by a representative point matching method. The basic operations from this point on are the same as shown in FIG. 48.

In the second example, the data rate at which the image signal is written from the image sensor 311 into the memory section 312 and the data rate in the movement sensing LSI 323 are M2. The data rate at which the processor 315 carries out a signal process and the data rate at which the recording section 317 writes the image signal onto a recording medium are M1.

As described above, with the eleventh embodiment, since the image information has been read beforehand from the area greater than the area determined by the area specifying section, the hand shake information and others can be acquired using the read-out information, which enables a hand shake to be corrected effectively even if a hand shake sensor, such as an angular velocity sensor, is not used.

Figure 50:
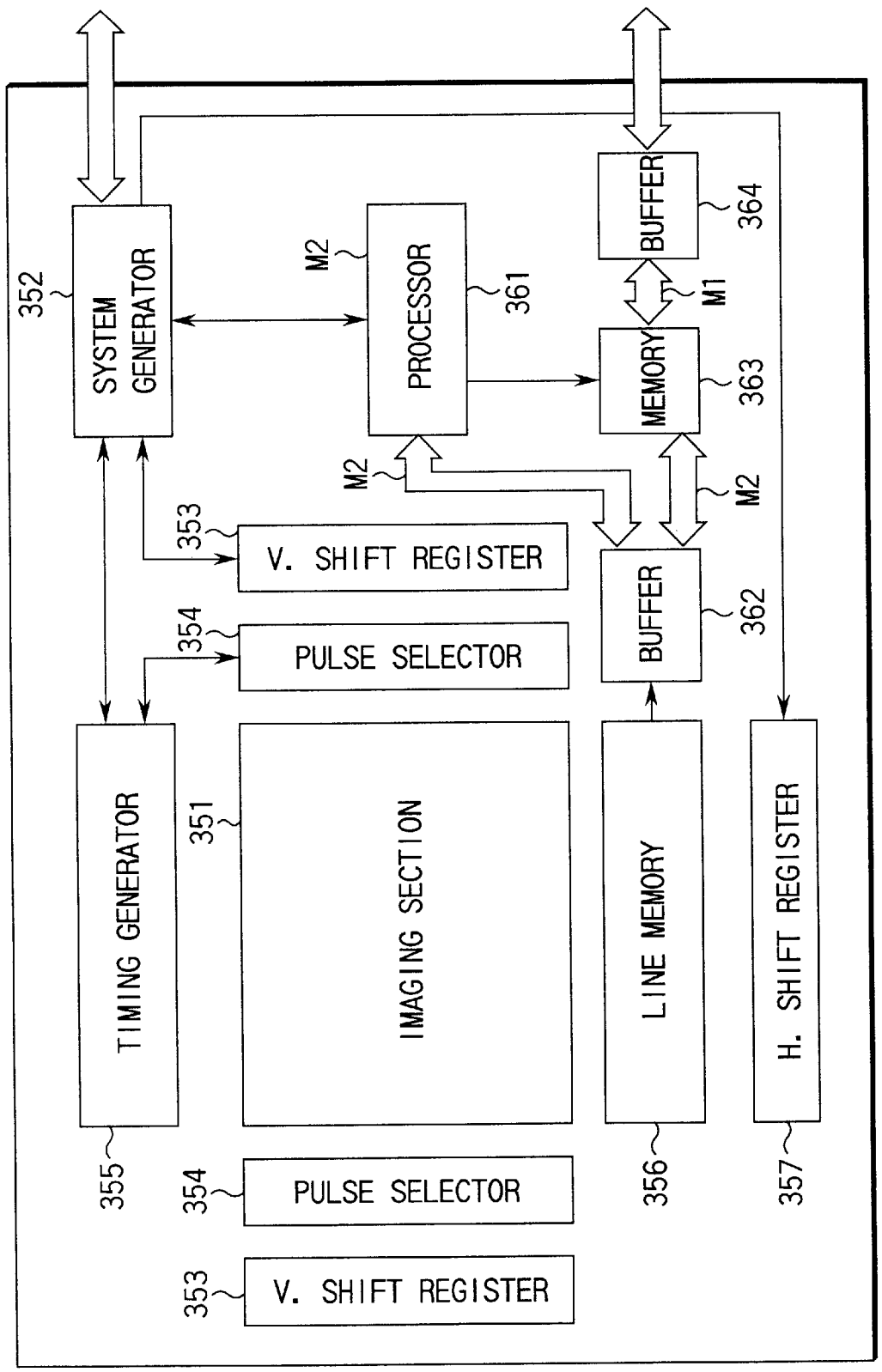
FIG. 50 is a block diagram of an example of the imaging section, its peripheral circuits, processing blocks, and others being integrated into one chip in the eleventh embodiment.

FIG. 50 shows a case where the imaging section, its peripheral circuits, processing block, and others explained earlier are integrated into a single chip.

The basic functions of an imaging section 351, a system generator 352, a vertical shift register 353 (actually composed of a read register and two initialization registers), a pulse selector 354, a timing generator 355, a line memory 356 (or noise canceler and a column A/D circuit), a horizontal shift register 357, and others are almost the same as those of the sensor of the fifth embodiment shown in FIG. 19. A processor 361 (composed of a DSP and others). Its basic function is almost the same as the processor explained earlier. In this example, the processor 361 is further provided with a hand shake sensing function.

In the example, the image signal outputted from the line memory 356 as a digital signal passes through a buffer 362 and is inputted to the processor 361 and a memory 363. The processor 361 do calculations on the basis of several frames of image signals, determines the amount of the hand shake (the amount of the hand shake in the vertical and horizontal directions) on the basis of the result of the calculation, and specified the storage area of the memory 263 on the basis of the determined amount of the hand shake. The image information for all the pixels is stored in the memory. When the processor 361 specifies the storage area, the image information on the actually effective pixel area actually displayed on the screen is outputted via the buffer 364 to the outside.

In the example, the data rate of the image signal outputted from the buffer 362 and the data rate at which the processor 361 carries out a signal process are M2. The data rate of the signal outputted from the memory 363 via the buffer 364 to the outside world is M1.

An image information acquiring device of the tenth and eleventh embodiments is characterized by comprising an imaging section including unit cells which are arranged in the directions of row and column two-dimensionally and have photoelectric conversion sections that generate electric charge according to the amount of incident light and vertical signal lines which are provided so as to correspond to the unit cells arranged in the direction of row and onto which the electric signal corresponding to the signal charge stored in each photoelectric conversion section is read, a hand shake information acquiring section for acquiring hand shake information in taking a picture, an area specifying section for specifying a specific area of the imaging section on the basis of the hand shake information acquired by the hand shake information acquiring section, and a read control section for selectively reading an electric signal from each unit cell included in the area specified by the area specifying means onto the vertical signal lines.

Since the CMOS image sensor enables random access, the image signal can be read out from an arbitrary row and column. With the tenth and eleventh embodiments, a specific area of the imaging section is specified on the basis of the hand shake information, making use of the feature of the CMOS image sensor. The image signal is selectively read out from the specified area. Thus, as compared with a case where the image signal is read out from all of the area of the imaging section, the read rate can be made low, provided that one frame or one field period is kept constant. As a result, it is possible to correct a hand shake effectively using the CMOS image sensor.

The tenth and eleventh embodiments are characterized by comprising an imaging section including unit cells which are arranged in the directions of row and column two-dimensionally and have photoelectric conversion sections that generate electric charge according to the amount of incident light and vertical signal lines which are provided so as to correspond to the unit cells arranged in the direction of row and onto which the electric signal corresponding to the signal charge stored in each photoelectric conversion section is read, a read control section for reading the electric signal from each unit cell in the imaging section onto the vertical signal line, a storage section for storing the signal information corresponding to the electric signal read by the read control section, a hand shake information acquiring section for acquiring hand shake information in taking a picture, and an area specifying section for determining a specific area of the imaging section on the basis of the hand shake information acquired by the hand shake information acquiring section and selectively reading the signal information acquired from each unit cell included in the specified area from the signal information stored in the storage section.

With the tenth and eleventh embodiments, the image information has been read beforehand from the area greater than the area specified by the area specifying section, and a specific area is specified on the basis of the hand shake information. By reading the image information beforehand from the area greater than the specified area, various processes (for example, hand shake information acquisition) can be carried out using the read-out image information. Thus, with the present invention, a hand shake can be corrected effectively using a CMOS image sensor.

The present invention is not limited to the above embodiments and may be practiced and embodied in still other ways without departing from the spirit or essential character thereof. For instance, the unit cells of the fourth embodiment shown in FIG. 15 may be applied to the fifth and later embodiments. The present invention is applicable to not only the NTSC/PAL system and DV system that carry out an interlace operation but also an ATV, known as a next-generation TV, that performs a progressive operation.

The solid-state imaging device of the present invention may be applied to not only the CMOS solid-state imaging device including a read circuit capable of reading a pixel signal pixel by pixel but also the CCD (charge-coupled device) solid-state imaging device which effects reading on a horizontal signal line basis.

The above-described embodiments are not restricted to the aforementioned type of solid-state imaging device and may be applied to the stacked solid-state imaging device where the imaging section is stacked on another circuit section.

According to the present invention, there is provided a solid-state imaging device which prevents the loads on the read-out vertical shift register and electronic shutter shift register from fluctuating when the variable electronic shutter operation is performed, thereby suppressing a lateral stripe noise appeared in the display screen and providing a clear image with high S/N ratio.

By alternatively using the two electronic shutter vertical shift registers for every field, it is possible to realize a variable electronic shutter operation (continuous electronic shutter operation) wherein the signal charge storage time is controlled in unit of field. There is no difference between the signal storage time for every pixel row even if the variable electronic shutter operation is performed, thereby suppressing a lateral stripe noise appeared in the display screen and providing a clear image with high S/N ratio.

According to the present invention, there is provided a solid-state imaging device comprising an image pickup section with a light-receiving surface whose area is greater than an imaging area for outputting an image signal, a vertical register circuit for driving pixel rows in the image pickup section, a horizontal register circuit for driving pixel columns in the image pickup section, and a timing generator for supplying a signal charge time control signal to said vertical register circuit, wherein the vertical register circuit is capable of simultaneously selecting three or more pixel rows during a horizontal blanking period.

In the above described embodiments, there are three vertical shift registers for selecting three or more pixel rows during a horizontal blanking period. However, it is not necessary to provide three vertical shift registers. If a pulse selector includes a multiplexer function, i.e., capable of outputting plural driving signals and shifting the plural driving signals, the present invention can be implemented by using a vertical shift register and the pulse selector.

According to the present invention, there are provided two dummy pixel rows corresponding to two electronic shutter vertical shift registers. Thus, three pixel rows are always driven by the read-out vertical shift register and two electronic shutter vertical shift registers. The loads of the vertical shift registers are made equal, thereby preventing the occurrence of lateral stripes on the display screen caused by fluctuations in the reading level due to whether the selection loads are light or heavy.

The voltage applied to the peripheral wires excluding the read gates adjacent to the photodiodes is made equal during both the activating period of the read pulse signal in the signal read operation and the activating period of the read pulse signal in the electronic shutter operation and the reading of extra charge from the photodiodes through the capacitive coupling with the wires is suppressed, which provides a reproduced image without black collapse.

When the stored charge is read out from the photoelectric conversion elements of two pixels in a unit cell with two pixels/unit in the imaging area, the voltage of the other wires adjacent to the wires for controlling the reading and located in the vicinity of the photoelectric conversion elements are made basically equal in reading each pixel, which makes the effects of the voltages of the other wires almost equal when the signal charge is read out from the photoelectric conversion element of each of the two pixels. As a result, the occurrence of lateral stripes on the display screen is prevented from occurring.

Each photoelectric conversion section is initialized before a read operation, thereby equalizing the time from the initializing operation to the read operation for the individual rows. As a result, the storage time of the signal charge in each photoelectric conversion section is equal between different fields (an even-numbered field and an odd-numbered field) and between different rows (an even-numbered row and an odd-numbered row), preventing the picture quality from deteriorating due to the non-uniformity of the storage periods.

Each photoelectric conversion section is initialized before a read operation, thereby causing the time from the initializing operation to the read operation to correspond to the period of the flicker of ambient light. As a result, the effect of a flicker on each storage period is equalized, which prevents the picture quality from deteriorating due to the period of a flicker different from the vertical scanning period (the period of one frame or one field).

Fluctuations in luminance in the amount of incident light can be suppressed by calculating a gain correction factor for fluctuations in luminance in the amount of incident light to the photoelectric conversion sections provided in the direction of row on the basis of the first electric signal and the second electric signal read out from the photoelectric conversion sections a specific time later than the reading time of the first electric signal and compensating for the second electric signal on the basis of the calculated gain correction factor by an arithmetic operation circuit, such as a multiplier.

A part of the imaging area is specified based on hand shake information and the signal is read out from only the specified part of the imaging area. Therefore, the read rate can be made lower than when the signal is read out from whole imaging area in a case where the frame (or field) period is constant. As a result, it is possible to corrected a hand shake effectively using the solid-state imaging device.

The image information has been read beforehand from the area greater than the area specified by the area specifying section, and a specific area is specified on the basis of the hand shake information. By reading the image information beforehand from the area greater than the specified area, various processes (for example, hand shake information acquisition) can be carried out using the read-out image information. Thus, a hand shake can be corrected effectively using the solid-state imaging device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging device comprising:

an image pickup section with a light-receiving surface whose area is greater than an imaging area for outputting an image signal;

a vertical register circuit configured to drive pixel rows in the image pickup section;

a horizontal register circuit configured to select pixel columns in the image pickup section; and a timing generator configured to control said vertical register circuit to vary a position of the imaging area based on an externally supplied control signal, wherein the externally supplied control signal comprises an externally supplied hand shake correction address information, said vertical register circuit comprises first and second vertical shift registers for an electronic shutter and a third vertical shift register for a read operation, and said timing generator operates the first and second vertical shift registers alternately at intervals of at least one of one frame and one field and carries out an electronic shutter operation.

2. The solid-state imaging device according to claim 1, wherein said timing generator causes said first and second vertical shift registers to perform an initialize operation at intervals of more than at least one frame and one field.

3. A solid-state imaging device comprising:

an imaging area including unit cells arranged on a semiconductor substrate two-dimensionally to form pixel rows, each of the unit cells being composed of a photoelectric converting element configured to photoelectrically convert incident light on a pixel and to store charge, and read sections configured to read a stored charge to a sense node;

read lines, which are provided in a horizontal direction so as to correspond to the pixel rows, respectively, in the imaging area, configured to transfer a read driving signal for driving the read sections of the unit cells in the corresponding pixel rows;

vertical selection lines, which are provided in a horizontal direction so as to correspond to the pixel rows, respectively, in the imaging area, configured to transfer a row selection driving signal configured to drive vertical selection elements of the unit cells in the corresponding pixel rows;

a vertical driving circuit configured to selectively supply the read driving signal to said read lines to drive the read sections and configured to selectively supply the row selection driving signal to the vertical selection lines to drive the vertical selection elements;

a row selection circuit configured to control the vertical driving circuit in such a manner that the read sections in each pixel row in the imaging area are driven with desired signal storage timing and with signal read timing in that order, the row selection circuit including a first row selector configured to cause the vertical driving circuit to drive the read sections in each pixel row with the signal read timing and at least two second row selectors configured to cause the vertical driving circuit to drive the read sections in each pixel row with the signal storage timing; and vertical signal lines, which are provided so as to correspond to the pixel columns, respectively, in the imaging area, configured to transfer in a vertical direction a signal outputted from each unit cell in the pixel rows sequentially driven by the vertical driving circuit, wherein said imaging area includes at least three dummy pixel rows in addition to the pixel rows configured to read signals;

said first row selector causes the vertical driving circuit to drive one of the dummy pixel rows; and said at least two second row selectors cause the vertical driving circuit to drive the remaining at least two of the dummy pixel rows respectively.

4. The solid-state imaging device according to claim 3, wherein said row selection circuit changes a signal storage timing within one field period at intervals of one field.

5. The solid-state imaging device according to claim 4, wherein said at least two second row selectors cause the vertical driving circuit to drive the read sections with the signal storage timing made relatively different from the signal read timing, and a control operation of the vertical driving circuit by said at least two second row selectors is switched at intervals of one field.

6. The solid-state imaging device according to claim 3, wherein said first row selector includes a read-out vertical shift register configured to control a start time at which signals are read out from the unit cells, and said at least two second row selectors include a first electronic shutter vertical shift register configured to control the start time of a signal storage in the unit cells in a first field period and a second electronic shutter vertical shift register configured to control the start time of the signal storage in the unit cells in a second field period alternated with the first field period.

7. The solid-state imaging device according to claim 3, wherein said row selection circuit controls the vertical driving circuit in such a manner that, when the read sections in each pixel row in the imaging area are driven twice with the signal storage timing and with the signal read timing, a voltage of an other wire adjacent to each read line near the photoelectric converting element is substantially equal when driven twice.

8. The solid-state imaging device according to claim 7, wherein the other wire is one of the vertical selection lines.

9. A solid-state imaging device including an imaging area formed of unit cells each having two pixels and two-dimensionally arranged on a semiconductor substrate, wherein charges stored in the two pixels are sequentially read out and a voltage of an other wire adjacent to a read control wire near a photoelectric converting element when the charge stored in one of the two pixels is read out is substantially equal to a voltage when a charge stored in an other of the two pixels is read out, wherein each of said unit cells comprises:

two photodiodes, anodes of which are grounded, constituting two pixels;

two read-out transistors, one end of each of which is connected to a cathode of each of said two photodiodes and gates of which are connected to two read lines;

an amplification transistor, a gate of which is connected to an other end of each of said two read-out transistors and one end of which is connected to a vertical signal line;

a vertical selection transistor, one end of which is connected to the other end of said amplification transistor and gate of which is connected to a vertical selection line;

a power-supply line connected to the other end of said vertical selection transistor; and a reset transistor which is connected between the gate of said amplification transistor and said power-supply line and gate of which is connected to a reset line, and wherein a signal is read out from photodiodes by setting the gates of said two read-out transistors at a high level and setting the gates of said vertical selection transistor at a low level.

10. A solid-state imaging device comprising:

an imaging area including unit cells arranged on a semiconductor substrate two-dimensionally to form pixel rows, each of the unit cells being composed of a photoelectric converting element configured to photoelectrically convert incident light on a pixel and to store charge, and a read section configured to read a stored charge to a sense node, the imaging area including plural pixel rows for reading signals and at least two dummy pixel rows;

read lines, which are provided in a horizontal direction so as to correspond to the pixel rows, respectively, in the imaging area, configured to transfer a read driving signal configured to drive the read sections of the unit cells in the corresponding pixel rows;

vertical selection lines, which are provided in a horizontal direction so as to correspond to the pixel rows. respectively, in the imaging area, configured to transfer a row selection driving signal configured to drive vertical selection elements of the unit cells in corresponding pixel rows;

a vertical driving circuit configured to selectively supply the read driving signal to said read lines to drive the read sections and configured to selectively supply the row selection driving signal to the vertical selection lines to drive the vertical selection elements;

a row selection circuit configured to control the vertical driving circuit in such a manner that the read sections in each pixel row in the imaging area are driven with desired signal storage timing and with signal read timing in that order; and vertical signal lines, which are provided so as to correspond to pixel columns, respectively, in the imaging area, configured to transfer in a vertical direction a signal outputted from each unit cell in the pixel rows sequentially driven by the vertical driving circuit, wherein said row selection circuit controls the vertical driving circuit in such a manner that after the stored charge is read out with the signal read timing from the unit cells of the plural pixel rows, one of said at least two dummy pixel rows is driven, and after a charge is stored in the unit cells of the plural pixel rows the other of said at least two dummy pixel rows is driven.

11. The solid-state imaging device according to claim 10, wherein said row selection circuit comprises an electronic shutter vertical shift register configured to control a start time of a charge storage and a read-out vertical shift register configured to control a start time of a charge read-out, the electronic shutter vertical shift register configured to cause the vertical driving circuit to drive a first dummy pixel row and the read-out vertical shift register configured to cause the vertical driving circuit to drive a second dummy pixel row.

12. A solid-state imaging device comprising:

an image section comprising a matrix of pixels and a row of dummy pixels;

a vertical register circuit configured to drive a row of pixels;

a horizontal register circuit configured to select a column of pixels; and a timing generator configured to supply a signal charge time control signal to said vertical register circuit, wherein said vertical register circuit is configured to drive rows of the pixels in the matrix and the row of the dummy pixels successively, said vertical register circuit comprises first and second vertical shift registers for an electronic shutter and a third vertical shift register for a read operation, and said timing generator operates the first and second vertical shift registers alternately at intervals of at least one of one frame and one field and carries out an electronic shutter operation.

13. A solid-state imaging device comprising:

an image section comprising a matrix of pixels and a row of dummy pixels;

a vertical register circuit configured to drive a row of pixels;

a horizontal register circuit configured to select a column of pixels; and a timing generator configured to supply a signal charge time control signal to said vertical register circuit, wherein said vertical register circuit is configured to drive rows of the pixels in the matrix and the row of the dummy pixels successively, and said timing generator simultaneously selects three or more rows of the pixels including the row of the dummy pixels.

14. A solid-state imaging device comprising:

an image section comprising a matrix of pixels and a row of dummy pixels;

a vertical register circuit configured to drive a row of pixels;

a horizontal register circuit configured to select a column of pixels; and a timing generator configured to supply a signal charge time control signal to said vertical register circuit, wherein said vertical register circuit is configured to drive rows of the pixels in the matrix and the row of the dummy pixels successively, and said timing generator changes a signal storage timing within one field period at intervals of one field.

15. A solid-state imaging device comprising:

an image section comprising a matrix of pixels and a row of dummy pixels;

a vertical register circuit configured to drive a row of pixels;

a horizontal register circuit configured to select a column of pixels; and a timing generator configured to supply a signal charge time control signal to said vertical register circuit, wherein said vertical register circuit is configured to drive rows of the pixels in the matrix and the row of the dummy pixels successively, and said timing generator controls the vertical register circuit with a signal storage timing made relatively different from a signal read timing.

16. A solid-state imaging device comprising:

an image section comprising a matrix of pixels and a row of dummy pixels;

a vertical register circuit configured to drive a row of pixels;

a horizontal register circuit configured to select a column of pixels; and a timing generator configured to supply a signal charge time control signal to said vertical register circuit, wherein said vertical register circuit is configured to drive rows of the pixels in the matrix and the row of the dummy pixels successively, and said vertical register circuit comprises:
- a read-out vertical shift register configured to control a start time at which an image signal is read out from the matrix of the pixels;
- a first electronic shutter vertical shift register configured to control a start time of a signal storage in the matrix of the pixels in a first field period; and
- a second electronic shutter vertical shift register configured to control a start time of the signal storage in the matrix of the pixels in a second field period alternated with the first field period.

17. A solid-state imaging device comprising:

an image section comprising a matrix of pixels and a row of dummy pixels;

a vertical register circuit configured to drive a row of pixels;

a horizontal register circuit configured to select a column of pixels; and a timing generator configured to supply a signal charge time control signal to said vertical register circuit, wherein said vertical register circuit is configured to drive rows of the pixels in the matrix and the row of the dummy pixels successively, and said timing generator controls the vertical register circuit in such a manner that, when each row of pixels in an imaging area is driven twice with a signal storage timing and with a signal read timing, a voltage of another line adjacent to each read line is substantially equal when driven twice.

18. The solid-state imaging device according to claim 17, wherein the another line is one of vertical selection lines.

* * * * *